United States Patent
Reichter et al.

(10) Patent No.: US 10,556,201 B2
(45) Date of Patent: *Feb. 11, 2020

(54) AIR FILTER ARRANGEMENT; ASSEMBLY; AND, METHODS

(71) Applicant: Donaldson Company, Inc., Minneapolis, MN (US)

(72) Inventors: Gregory Reichter, Bloomington, MN (US); Wayne Bishop, St. Louis Park, MN (US); Benny K. Nelson, Waconia, MN (US); Darrel Wegner, Burnsville, MN (US); Bruce Crenshaw, Frankfort, IN (US); Vladimir Kladnitsky, Eagan, MN (US); Thomas Miller, Eagan, MN (US); Donald Mork, Lime Springs, IA (US); Kevin Schrage, Spring Valley, MN (US); Richard Osendorf, St. Paul, MN (US); Bradley Kuempel, Eden, MN (US); Thomas Lundgren, Bloomington, MN (US)

(73) Assignee: Donaldson Company, Inc., Minneapolis, MN (US)

(*) Notice: Subject to any disclaimer, the term of this patent is extended or adjusted under 35 U.S.C. 154(b) by 110 days.

This patent is subject to a terminal disclaimer.

(21) Appl. No.: 15/788,937

(22) Filed: Oct. 20, 2017

(65) Prior Publication Data

US 2018/0099242 A1    Apr. 12, 2018

Related U.S. Application Data

(63) Continuation of application No. 14/563,561, filed on Dec. 8, 2014, now Pat. No. 9,795,911, which is a
(Continued)

(51) Int. Cl.
*B01D 46/52*    (2006.01)
*F02M 35/024*    (2006.01)
*B01D 46/00*    (2006.01)

(52) U.S. Cl.
CPC ....... *B01D 46/526* (2013.01); *B01D 46/0002* (2013.01); *B01D 46/0005* (2013.01);
(Continued)

(58) Field of Classification Search
CPC ................ B01D 46/525; B01D 46/526; B01D 2271/022; B01D 2271/025
See application file for complete search history.

(56) References Cited

U.S. PATENT DOCUMENTS

| | | |
|---|---|---|
| D970,826 | 9/1910 | Hoyt |
| 2,093,877 A | 9/1937 | Pentz |
| (Continued) | | |

FOREIGN PATENT DOCUMENTS

| | | |
|---|---|---|
| CN | 2296402 Y | 11/1998 |
| CN | 2372041 Y | 4/2000 |
| (Continued) | | |

OTHER PUBLICATIONS

U.S. Appl. No. 60/591,280, filed Jul. 26, 2004.
(Continued)

*Primary Examiner* — Robert Clemente
(74) *Attorney, Agent, or Firm* — Merchant & Gould P.C.

(57) ABSTRACT

An air filter arrangement is disclosed. The air filter arrangement includes media comprising corrugated media secured to facing media and defining a media pack having opposite flow faces. Media pack arrangements including such media are described. Also described are filter cartridges including such media packs and air cleaners including the filter cartridges. Advantageous housing seal arrangements having a pinch seal member and forming a trough are described. Methods of assembly and use are also provided. Also, systems of use are described.

19 Claims, 69 Drawing Sheets

Related U.S. Application Data continuation of application No. 13/616,292, filed on Sep. 14, 2012, now Pat. No. 8,906,128, which is a continuation of application No. 11/659,067, filed as application No. PCT/US2005/028002 on Aug. 5, 2005, now Pat. No. 8,277,532.

(60) Provisional application No. 60/599,686, filed on Aug. 6, 2004, provisional application No. 60/600,081, filed on Aug. 9, 2004, provisional application No. 60/602,721, filed on Aug. 18, 2004, provisional application No. 60/616,364, filed on Oct. 5, 2004.

(52) U.S. Cl.
CPC ....... B01D 46/0023 (2013.01); B01D 46/525 (2013.01); F02M 35/024 (2013.01); *B01D 2271/022* (2013.01); *B01D 2271/025* (2013.01)

(56) References Cited

U.S. PATENT DOCUMENTS

| | | |
|---|---|---|
| 2,270,969 A | 1/1942 | Robinson |
| 2,306,325 A | 12/1942 | Allam |
| 2,915,188 A | 12/1959 | Buker |
| 2,955,028 A | 10/1960 | Bevans |
| 3,025,963 A | 3/1962 | Bauer |
| 3,224,592 A | 12/1965 | Burns et al. |
| 3,494,113 A | 2/1970 | Kinney |
| 3,598,738 A | 8/1971 | Biswell et al. |
| 3,645,402 A | 2/1972 | Alexander et al. |
| 3,687,849 A | 8/1972 | Abbott |
| 3,749,247 A | 7/1973 | Rohde |
| 4,014,794 A | 3/1977 | Lewis |
| 4,061,572 A | 12/1977 | Cohen et al. |
| 4,066,559 A | 1/1978 | Rohde |
| 4,075,097 A | 2/1978 | Paul |
| 4,075,098 A | 2/1978 | Paul et al. |
| 4,080,185 A | 3/1978 | Richter et al. |
| 4,144,166 A | 3/1979 | Dejovine |
| 4,144,169 A | 3/1979 | Grueschow |
| 4,324,213 A | 4/1982 | Kasting et al. |
| 4,364,751 A | 12/1982 | Copley |
| 4,402,912 A | 9/1983 | Krueger et al. |
| 4,410,427 A | 10/1983 | Wydeven |
| 4,452,616 A | 6/1984 | Gillingham et al. |
| 4,589,983 A | 5/1986 | Wydevan |
| 4,600,420 A | 7/1986 | Wydeven et al. |
| 4,685,944 A | 8/1987 | Allan et al. |
| 4,738,776 A | 4/1988 | Brown |
| 4,755,289 A | 7/1988 | Villani |
| 4,782,891 A | 11/1988 | Cheadle et al. |
| 4,925,561 A | 5/1990 | Ishii et al. |
| 4,979,969 A | 12/1990 | Sturmon |
| 5,024,268 A | 6/1991 | Cheadle et al. |
| 5,050,549 A | 9/1991 | Herding |
| 5,064,799 A | 11/1991 | Cheadle et al. |
| 5,069,799 A | 12/1991 | Sturmon |
| 5,094,745 A | 3/1992 | Monte et al. |
| 5,222,488 A | 2/1993 | Forsgren et al. |
| 5,213,596 A | 5/1993 | Kume et al. |
| 5,223,011 A | 6/1993 | Hanni |
| 5,225,081 A | 7/1993 | Brownawell et al. |
| 5,258,118 A | 11/1993 | Reynolds |
| 5,292,432 A | 3/1994 | Jainek et al. |
| 5,298,160 A | 3/1994 | Ayers et al. |
| 5,342,511 A | 8/1994 | Brownawell |
| 5,382,355 A | 1/1995 | Arlozynski |
| 5,391,212 A | 2/1995 | Ernst et al. |
| 5,435,346 A | 7/1995 | Tregidgo et al. |
| 5,459,074 A | 10/1995 | Muoni |
| 5,472,379 A | 12/1995 | Andress et al. |
| 5,472,463 A | 12/1995 | Herman et al. |
| 5,494,497 A | 2/1996 | Lee |
| 5,498,332 A | 3/1996 | Handtmann |
| 5,512,074 A | 4/1996 | Hanni et al. |
| 5,517,598 A | 5/1996 | Sirat |
| 5,541,330 A | 7/1996 | Wear et al. |
| 5,556,542 A | 9/1996 | Berman et al. |
| 5,560,330 A | 10/1996 | Andress et al. |
| 5,562,825 A | 10/1996 | Yamada et al. |
| 5,575,826 A | 11/1996 | Gillingham et al. |
| 5,591,330 A | 1/1997 | Lefebvre |
| 5,643,541 A | 7/1997 | Peddicord et al. |
| 5,662,799 A | 9/1997 | Hudgens et al. |
| 5,718,258 A | 2/1998 | Lefebvre et al. |
| 5,759,217 A | 2/1998 | Joy et al. |
| 5,738,785 A | 4/1998 | Brown et al. |
| 5,753,116 A | 5/1998 | Baumann et al. |
| 5,772,883 A | 6/1998 | Rothman et al. |
| 5,795,361 A | 8/1998 | Lanier, Jr. et al. |
| 5,803,024 A | 9/1998 | Brown |
| 5,820,646 A | 10/1998 | Gillingham et al. |
| 5,853,439 A | 12/1998 | Gieseke et al. |
| 5,891,402 A | 4/1999 | Sassa et al. |
| 5,902,364 A | 5/1999 | Tokar et al. |
| 5,948,248 A | 9/1999 | Brown |
| 6,045,692 A | 4/2000 | Bilski et al. |
| D425,189 S | 5/2000 | Gillingham |
| 6,086,763 A | 7/2000 | Baumaun |
| 6,098,575 A | 8/2000 | Mulshine et al. |
| 6,129,852 A | 10/2000 | Elliot et al. |
| 6,149,700 A | 11/2000 | Morgan et al. |
| 6,165,519 A | 12/2000 | Lehrer et al. |
| 6,171,355 B1 | 1/2001 | Gieseke et al. |
| 6,179,890 B1 | 1/2001 | Ranos et al. |
| D437,402 S | 2/2001 | Gieseke et al. |
| 6,190,432 B1 | 2/2001 | Gieseke et al. |
| 6,196,019 B1 | 3/2001 | Higo et al. |
| 6,231,630 B1 | 5/2001 | Ernst et al. |
| 6,235,194 B1 | 5/2001 | Jousset |
| 6,235,195 B1 | 5/2001 | Tokar |
| 6,238,554 B1 | 5/2001 | Martin, Jr. et al. |
| 6,238,561 B1 | 5/2001 | Liu et al. |
| D444,219 S | 6/2001 | Gieseke et al. |
| 6,261,334 B1 | 7/2001 | Morgan et al. |
| 6,264,833 B1 | 7/2001 | Reamsnyder et al. |
| RE37,369 E | 9/2001 | Hudgens et al. |
| 6,293,984 B1 | 9/2001 | Oda et al. |
| 6,306,193 B1 | 10/2001 | Morgan et al. |
| D450,828 S | 11/2001 | Tokar |
| 6,348,085 B1 | 2/2002 | Tokar et al. |
| 6,350,291 B1 | 2/2002 | Gieske et al. |
| D455,826 S | 4/2002 | Gillingham et al. |
| 6,375,700 B1 | 4/2002 | Jaroszczyk et al. |
| 6,379,564 B1 | 4/2002 | Rohrbach et al. |
| 6,391,076 B1 | 5/2002 | Jaroszczyk et al. |
| 6,398,832 B2 | 6/2002 | Morgan et al. |
| 6,416,561 B1 | 7/2002 | Kallsen et al. |
| 6,475,379 B2 | 11/2002 | Jousset et al. |
| 6,478,958 B1 | 11/2002 | Beard et al. |
| 6,482,247 B2 | 11/2002 | Jaroszczyk et al. |
| 6,511,599 B2 | 1/2003 | Jaroszczyk et al. |
| 6,537,453 B2 | 3/2003 | Beard et al. |
| D473,637 S | 4/2003 | Golden |
| 6,547,857 B2 | 4/2003 | Gieseke et al. |
| 6,554,139 B1 | 4/2003 | Maxwell et al. |
| 6,568,540 B1 | 5/2003 | Holzmann et al. |
| 6,596,165 B2 | 7/2003 | Koivula |
| 6,610,126 B2 | 8/2003 | Xu et al. |
| 6,623,636 B2 | 9/2003 | Rohrbach et al. |
| 6,641,637 B2 | 11/2003 | Kallsen et al. |
| 6,673,136 B2 | 1/2004 | Gillingham et al. |
| 6,676,721 B1 | 1/2004 | Gillingham et al. |
| 6,709,588 B2 | 3/2004 | Pavlin et al. |
| 6,743,317 B2 | 6/2004 | Wydeven |
| 6,746,518 B2 | 6/2004 | Gieseke et al. |
| 6,787,033 B2 | 9/2004 | Beard et al. |
| 6,827,750 B2 | 12/2004 | Drozd et al. |
| 6,835,304 B2 | 12/2004 | Jousset et al. |
| 6,843,916 B2 | 1/2005 | Burrington et al. |
| 6,860,241 B2 | 3/2005 | Martin et al. |
| 6,893,571 B2 | 5/2005 | Harenbrock et al. |
| 6,902,598 B2 | 6/2005 | Gunderson et al. |

(56) References Cited

U.S. PATENT DOCUMENTS

| | | |
|---|---|---|
| 6,919,023 B2 | 7/2005 | Merritt et al. |
| 6,953,124 B2 | 10/2005 | Winter et al. |
| 6,966,940 B2 | 11/2005 | Krisko et al. |
| 6,969,461 B2 | 11/2005 | Beard et al. |
| 6,984,319 B2 | 1/2006 | Merritt et al. |
| 7,001,450 B2 | 2/2006 | Gieseke et al. |
| 7,008,467 B2 | 3/2006 | Krisko et al. |
| 7,018,531 B2 | 3/2006 | Eilers et al. |
| 7,090,711 B2 | 8/2006 | Gillingham et al. |
| 7,153,422 B2 | 12/2006 | Herman et al. |
| 7,156,991 B2 | 1/2007 | Herman et al. |
| 7,160,451 B2 | 1/2007 | Hacker et al. |
| 7,182,863 B2 | 2/2007 | Eilers et al. |
| 7,182,864 B2 | 2/2007 | Brown et al. |
| 7,211,124 B2 | 5/2007 | Gieseke et al. |
| 7,258,719 B2 | 8/2007 | Miller et al. |
| 7,282,075 B2 | 10/2007 | Sporre et al. |
| 7,338,544 B2 | 3/2008 | Sporre et al. |
| 7,351,270 B2 | 4/2008 | Engelland et al. |
| 7,396,371 B2 | 7/2008 | Nepsund et al. |
| 7,491,254 B2 | 2/2009 | Krisko et al. |
| 7,625,419 B2 | 12/2009 | Nelson et al. |
| 7,645,310 B2 | 1/2010 | Krisko et al. |
| 7,655,074 B2 | 2/2010 | Nepsund et al. |
| 7,674,308 B2 | 3/2010 | Krisko et al. |
| 7,967,886 B2 | 6/2011 | Schrage et al. |
| 7,993,422 B2 | 8/2011 | Kirsko et al. |
| 8,034,145 B2 | 10/2011 | Boehrs et al. |
| 8,062,399 B2 | 11/2011 | Nelson et al. |
| 8,101,003 B2 | 1/2012 | Krisko et al. |
| 8,241,383 B2 | 8/2012 | Schrage et al. |
| 8,277,532 B2 | 10/2012 | Reichter et al. |
| 8,292,983 B2 | 10/2012 | Reichter et al. |
| 8,328,897 B2 | 12/2012 | Nelson et al. |
| 8,357,219 B2 | 1/2013 | Boehrs et al. |
| 8,480,779 B2 | 7/2013 | Boehrs et al. |
| 8,496,723 B2 | 7/2013 | Reichter et al. |
| 8,636,820 B2 | 1/2014 | Reichter et al. |
| 8,652,228 B2 | 2/2014 | Krisko et al. |
| 8,709,119 B2 | 4/2014 | Reichter et al. |
| 8,778,043 B2 | 7/2014 | Krisko et al. |
| 8,840,699 B2 | 9/2014 | Boehrs et al. |
| 8,906,128 B2 | 12/2014 | Reichter et al. |
| 9,120,047 B2 | 9/2015 | Boehrs et al. |
| 9,180,399 B2 | 11/2015 | Reichter et al. |
| 9,320,997 B2 | 4/2016 | Campbell et al. |
| 9,399,972 B2 | 7/2016 | Boehrs et al. |
| 9,527,023 B2 | 12/2016 | Reichter et al. |
| 9,795,911 B2 * | 10/2017 | Reichter ............ B01D 46/526 |
| 9,937,455 B2 | 4/2018 | Boehrs et al. |
| 10,046,260 B2 | 8/2018 | Campbell et al. |
| 10,065,145 B2 | 9/2018 | Reichter et al. |
| 10,315,144 B2 | 6/2019 | Reichter et al. |
| 2001/0032545 A1 | 10/2001 | Goto et al. |
| 2002/0060178 A1 | 5/2002 | Tsabari |
| 2002/0073850 A1 | 6/2002 | Tokar et al. |
| 2002/0096247 A1 | 7/2002 | Wydevan |
| 2002/0157359 A1 | 10/2002 | Stenersen |
| 2002/0170280 A1 | 11/2002 | Soh |
| 2002/0185007 A1 | 12/2002 | Xu et al. |
| 2002/0185454 A1 | 12/2002 | Beard et al. |
| 2002/0195384 A1 | 12/2002 | Rohrbach et al. |
| 2003/0121845 A1 | 7/2003 | Wagner et al. |
| 2003/0154863 A1 | 8/2003 | Tokar et al. |
| 2003/0217534 A1 | 11/2003 | Krisko et al. |
| 2003/0218150 A1 | 11/2003 | Blakemore et al. |
| 2004/0035097 A1 | 2/2004 | Schlensker et al. |
| 2004/0060861 A1 | 4/2004 | Winter et al. |
| 2004/0091654 A1 | 5/2004 | Kelly et al. |
| 2004/0140255 A1 | 7/2004 | Merritt et al. |
| 2004/0187689 A1 | 9/2004 | Sporre et al. |
| 2004/0221555 A1 | 11/2004 | Engelland et al. |
| 2004/0226443 A1 | 11/2004 | Gillingham et al. |
| 2005/0019236 A1 | 1/2005 | Martin et al. |
| 2005/0166561 A1 | 8/2005 | Schrage et al. |
| 2005/0173325 A1 | 8/2005 | Klein et al. |
| 2005/0194312 A1 | 9/2005 | Niemeyer et al. |
| 2005/0224061 A1 | 10/2005 | Ulrich et al. |
| 2005/0252848 A1 | 11/2005 | Miller |
| 2006/0113233 A1 | 6/2006 | Merritt et al. |
| 2006/0180537 A1 | 8/2006 | Loftis et al. |
| 2007/0261374 A1 | 11/2007 | Nelson et al. |
| 2008/0022641 A1 | 1/2008 | Engelland et al. |
| 2008/0110142 A1 | 5/2008 | Nelson et al. |
| 2008/0307759 A1 | 12/2008 | Reichter et al. |
| 2009/0057213 A1 | 3/2009 | Schiavon et al. |
| 2009/0151311 A1 | 6/2009 | Reichter et al. |

FOREIGN PATENT DOCUMENTS

| | | |
|---|---|---|
| DE | 88 08 632 | 9/1988 |
| DE | 41 41 823 | 12/1991 |
| DE | 43 24 388 | 9/1994 |
| DE | 296 13 098 | 9/1996 |
| EP | 0 096 597 | 6/1983 |
| EP | 0 747 579 | 12/1996 |
| EP | 0 982 062 | 3/2000 |
| EP | 1 166 843 A1 | 1/2002 |
| EP | 1 208 902 | 5/2002 |
| EP | 1 233 173 A2 | 8/2002 |
| EP | 1 129 760 B1 | 7/2007 |
| EP | 1 747 053 B1 | 10/2007 |
| FR | 2 214 505 A | 8/1974 |
| GB | 970826 | 9/1964 |
| GB | 2 082 932 A | 3/1982 |
| JP | 1-171615 | 7/1989 |
| JP | 1-163408 | 11/1989 |
| JP | 2-25009 | 2/1990 |
| JP | 8-243334 | 9/1996 |
| WO | WO 98/12430 | 3/1998 |
| WO | WO 99/00587 | 1/1999 |
| WO | WO 99/16534 | 4/1999 |
| WO | WO 02/092193 | 11/2002 |
| WO | WO 03/084641 A2 | 10/2003 |
| WO | WO 03/095068 | 11/2003 |
| WO | WO 2004/052504 A2 | 6/2004 |
| WO | WO 2004/054684 A1 | 7/2004 |
| WO | WO 2005/046841 | 5/2005 |
| WO | WO 2005/063358 A2 | 7/2005 |
| WO | WO 2005/077487 A1 | 8/2005 |
| WO | WO 2005/079954 A1 | 9/2005 |
| WO | WO 2005/115581 | 12/2005 |
| WO | WO 2005/123214 A1 | 12/2005 |
| WO | WO 2005/123222 | 12/2005 |
| WO | WO 2006/012386 A2 | 2/2006 |
| WO | WO 2006/014941 | 2/2006 |
| WO | WO 2006/017790 A1 | 2/2006 |
| WO | WO 2006/076456 | 7/2006 |
| WO | WO 2006/076479 | 7/2006 |
| WO | WO 2007/009039 A1 | 1/2007 |
| WO | WO 2007/044677 | 4/2007 |

OTHER PUBLICATIONS

U.S. Appl. No. 60/556,133, filed Mar. 2004, Krisko et al.
Pending claims corresponding to U.S. Appl. No. 14/935,860, filed Jan. 2, 2018.
Pending claims corresponding to U.S. Appl. No. 15/387,820, filed Jan. 2, 2018.
Pending claims corresponding to U.S. Appl. No. 15/211,099, filed Jan. 2, 2018.
Pending claims of U.S. Appl. No. 15/539,600, filed Jan. 2, 2018.
Pending claims of U.S. Appl. No. 15/137,089, filed Jan. 2, 2018.
Pending claims of U.S. Appl. No. 15/541,122, filed Jan. 2, 2018.
English translation of Opposition Brief corresponding to EP 1 778 384 dated Oct. 23, 2013.
Pending claims of U.S. Appl. No. 16/119,121, filed Aug. 28, 2019.
Pending claims of U.S. Appl. No. 15/946,818, filed Aug. 28, 2019.
Pending claims U.S. Appl. No. 16/285,845, filed Aug. 28, 2019.
Pending claims of U.S. Appl. No. 15/211,099, filed Aug. 28, 2019.
Pending claims of U.S. Appl. No. 16/101,811, filed Aug. 28, 2019.

(56) References Cited

OTHER PUBLICATIONS

Pending claims of U.S. Appl. No. 15/539,600, filed Aug. 28, 2019.
Pending claims of U.S. Appl. No. 15/541,122, filed Aug. 28, 2019.
Extended European Search Report for Application No. 16178370.9 dated Jan. 31, 2017.
Extended European Search Report for Application No. 10167026 dated Aug. 25, 2010.
Extended European Search Report for Application No. 10167077.6 dated Sep. 3, 2010.
Extended European Search Report for Application No. 10179074.9 dated Mar. 9, 2011.
PCT International Search Report and Written Opinion for PCT/US2005/028002 corresponding to WO 2006/017790 dated Nov. 11, 2005.
PCT Search Report and Written Opinion for PCT/US2005/019777 corresponding to WO 2005/123214 dated Sep. 28, 2005.
PCT Search Report and Written Opinion for PCT/US2005/001061, corresponding to WO 2006/076479 dated May 15, 2006.
PCT Search Report and Written Opinion for PCT/US2006/001021, corresponding to WO 2006/076456 dated May 29, 2006.
PCT Search Report and Written Opinion for PCTUS/2005/020593 corresponding to WO 2005/123222 dated Sep. 28, 2005.

\* cited by examiner

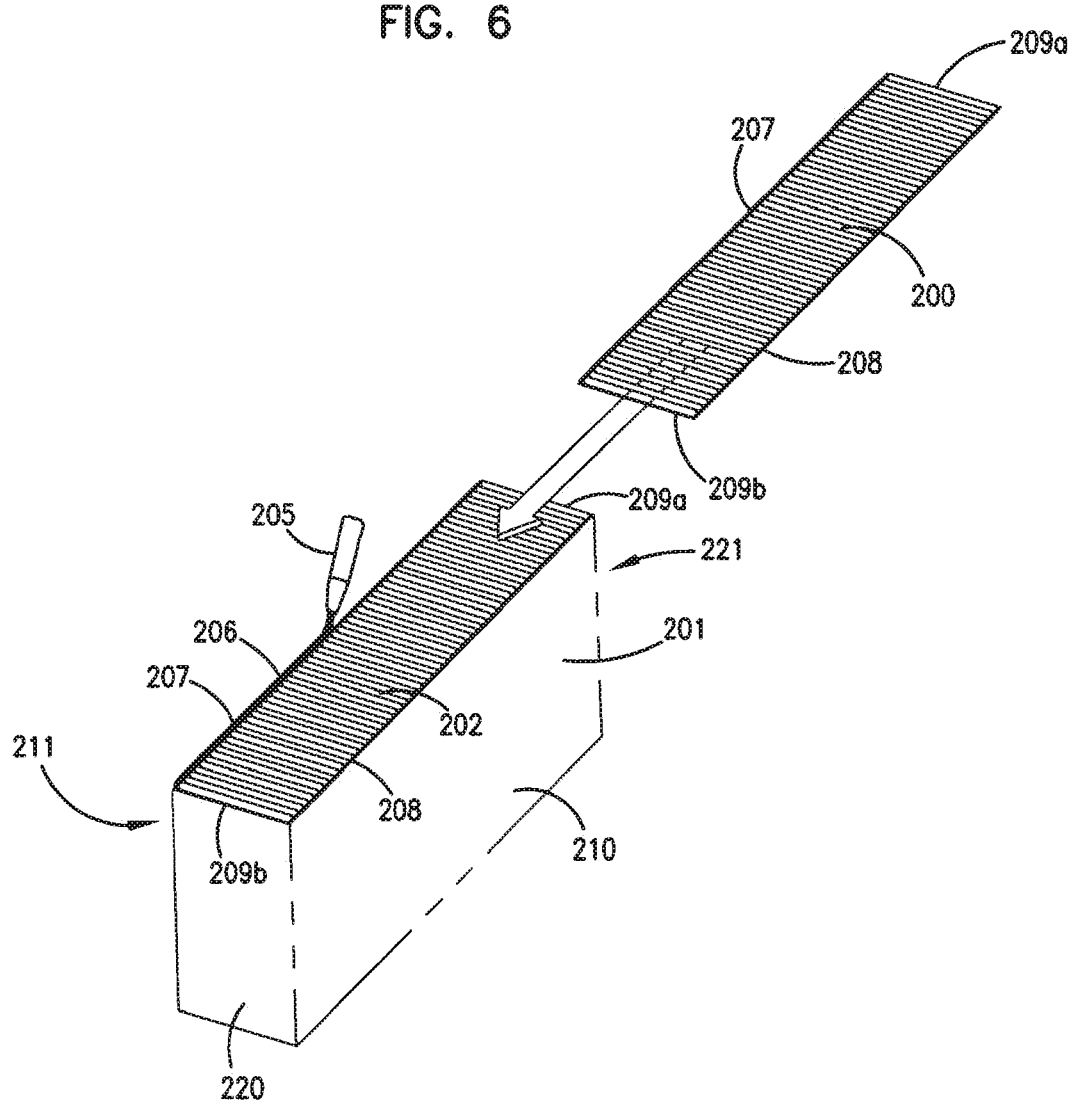

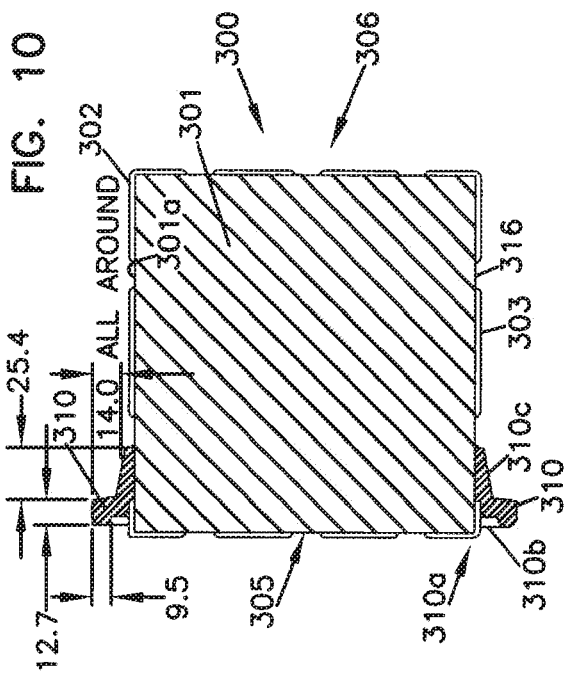
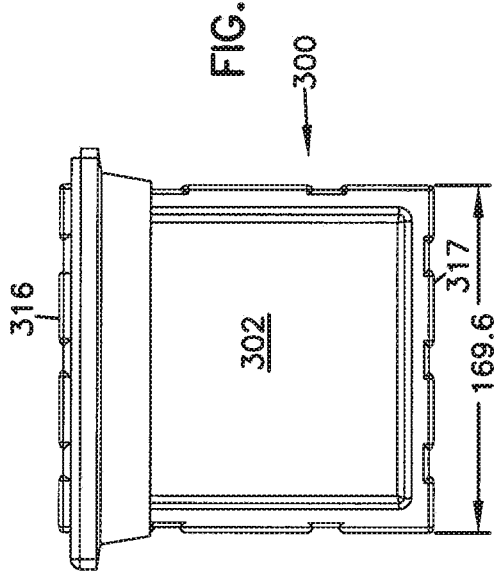
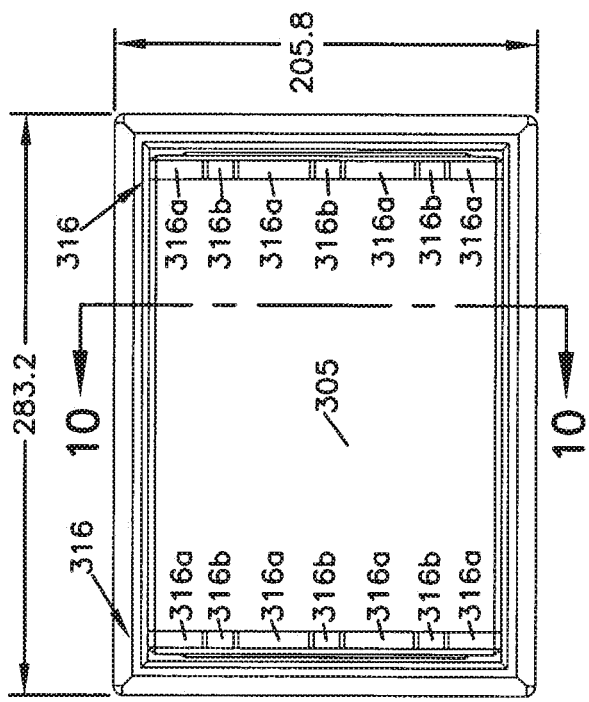
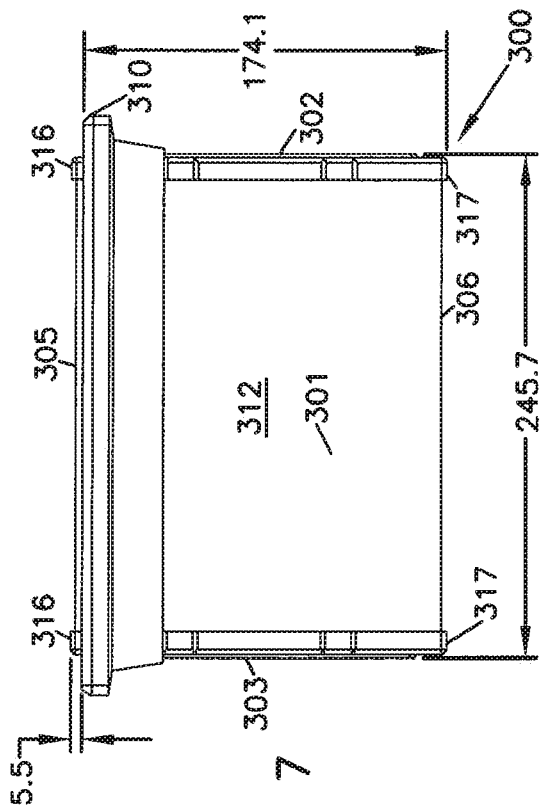

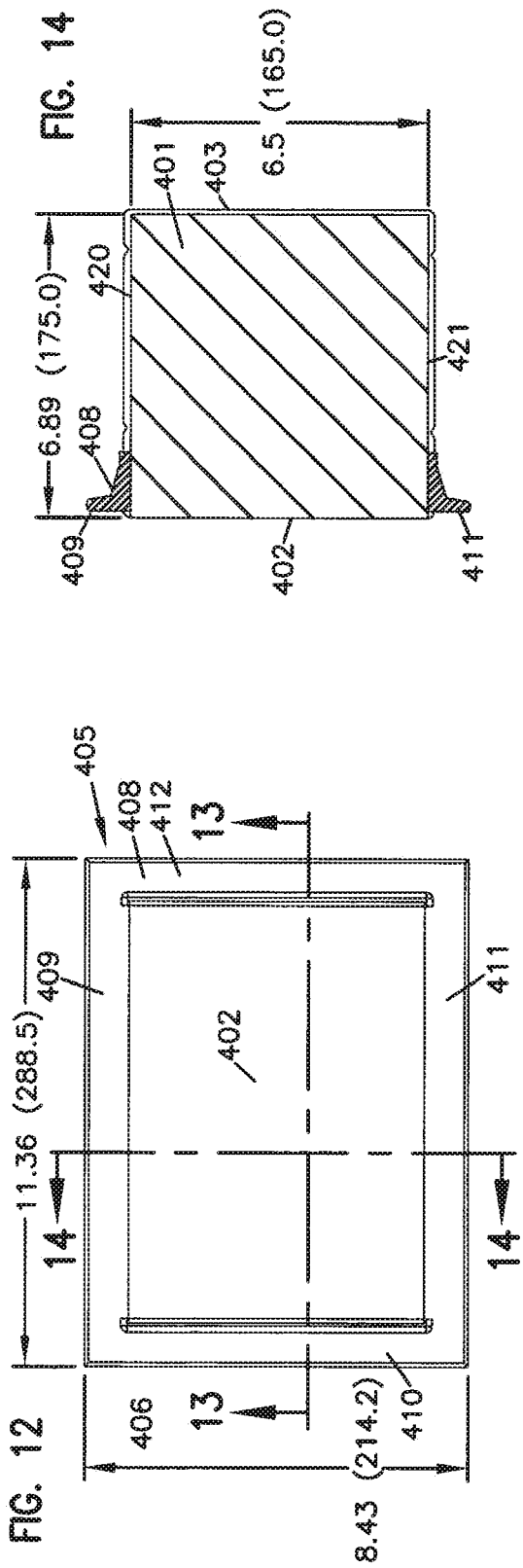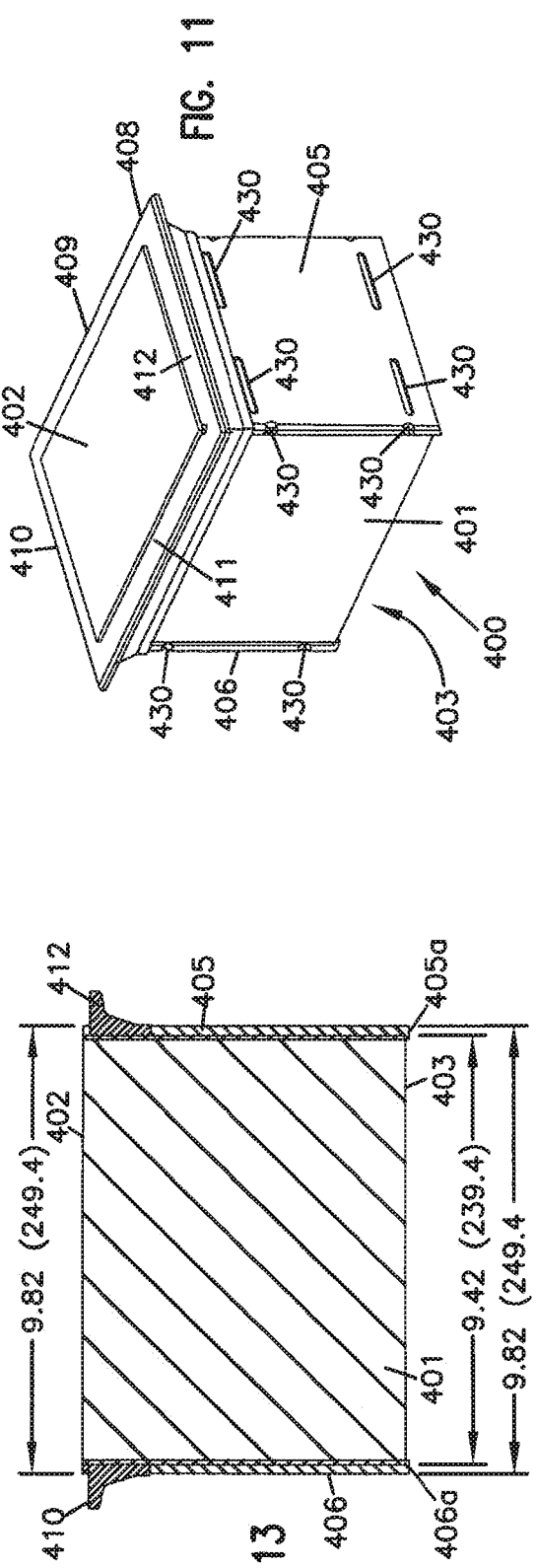

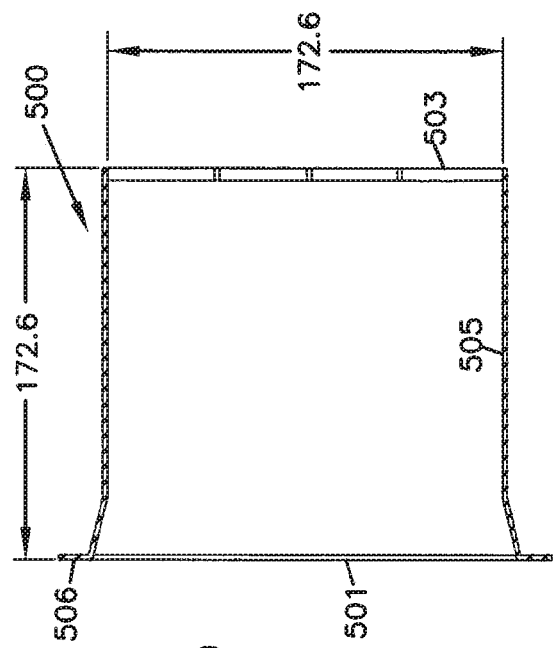
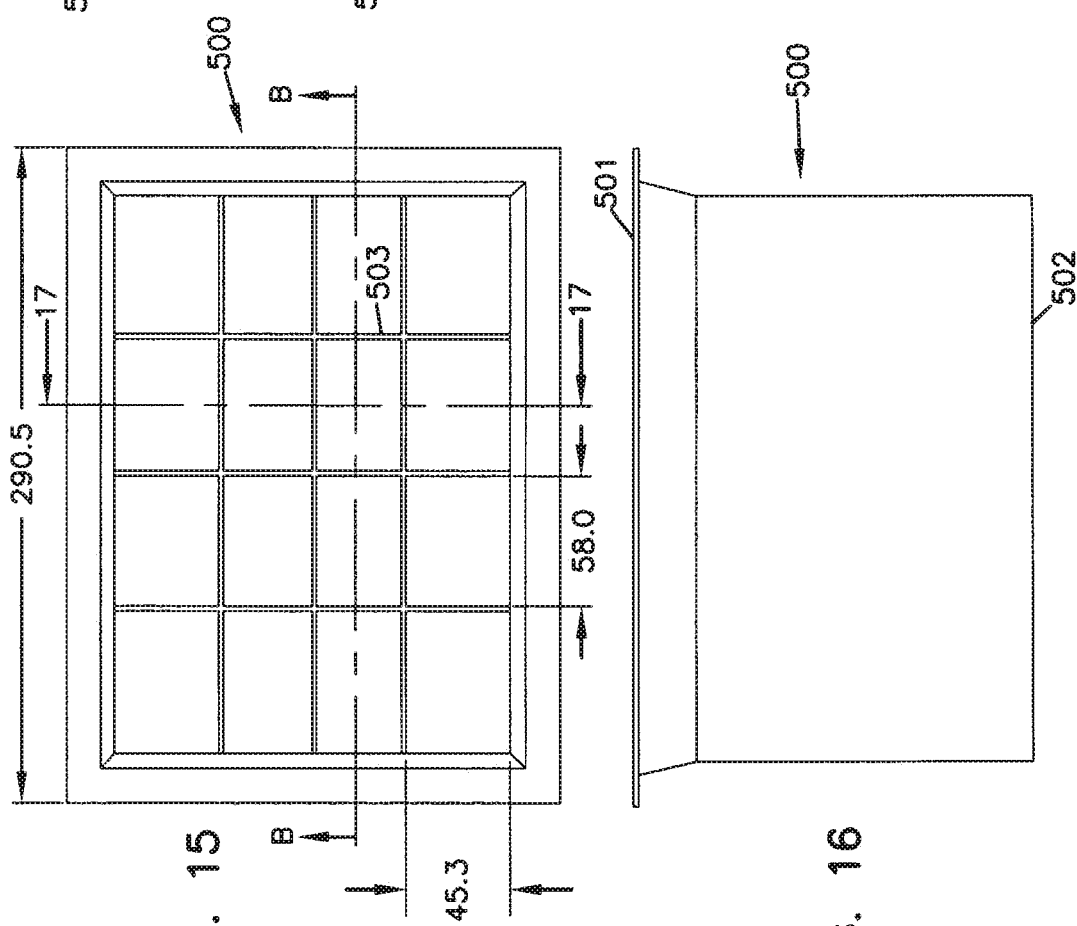

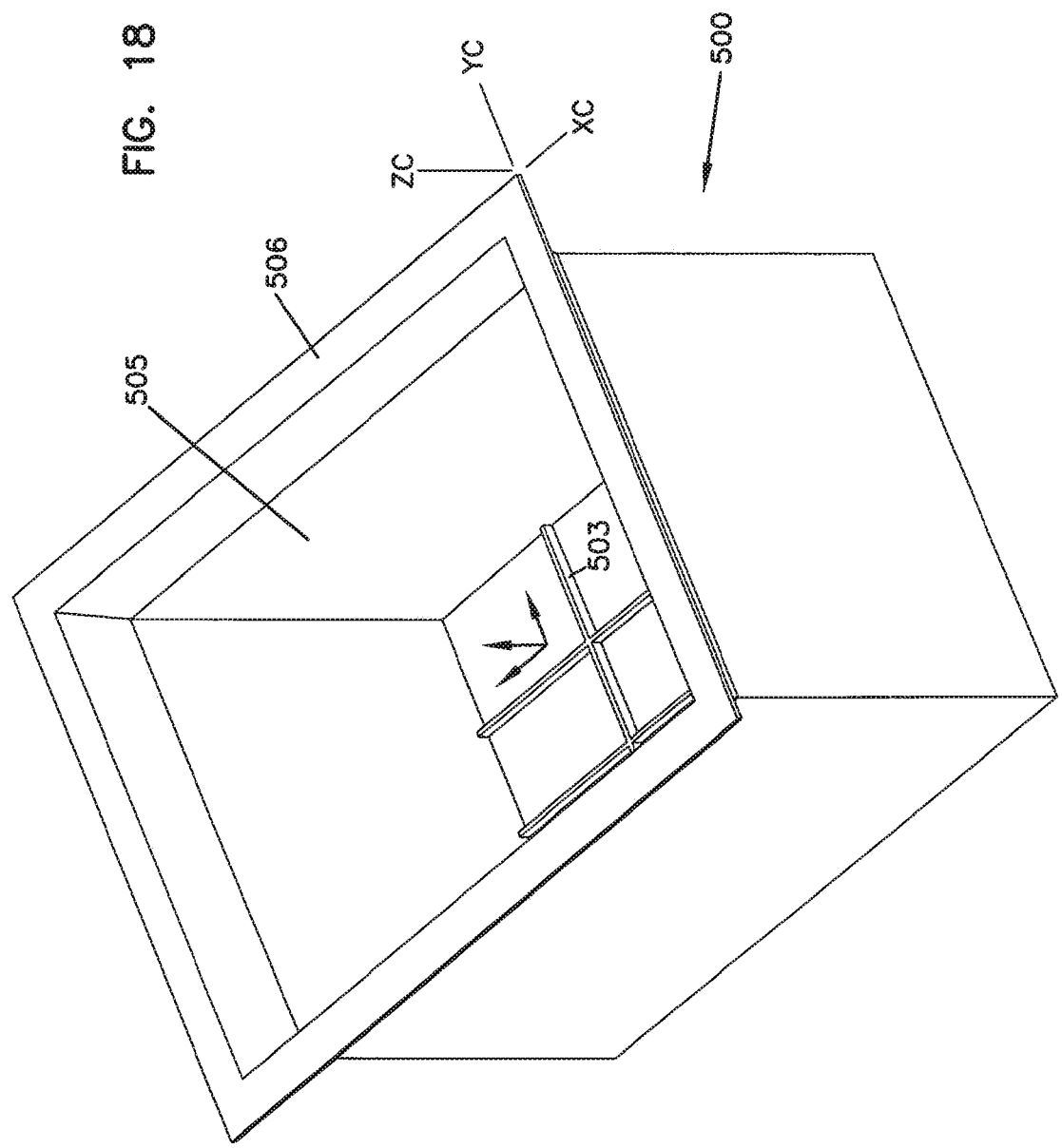

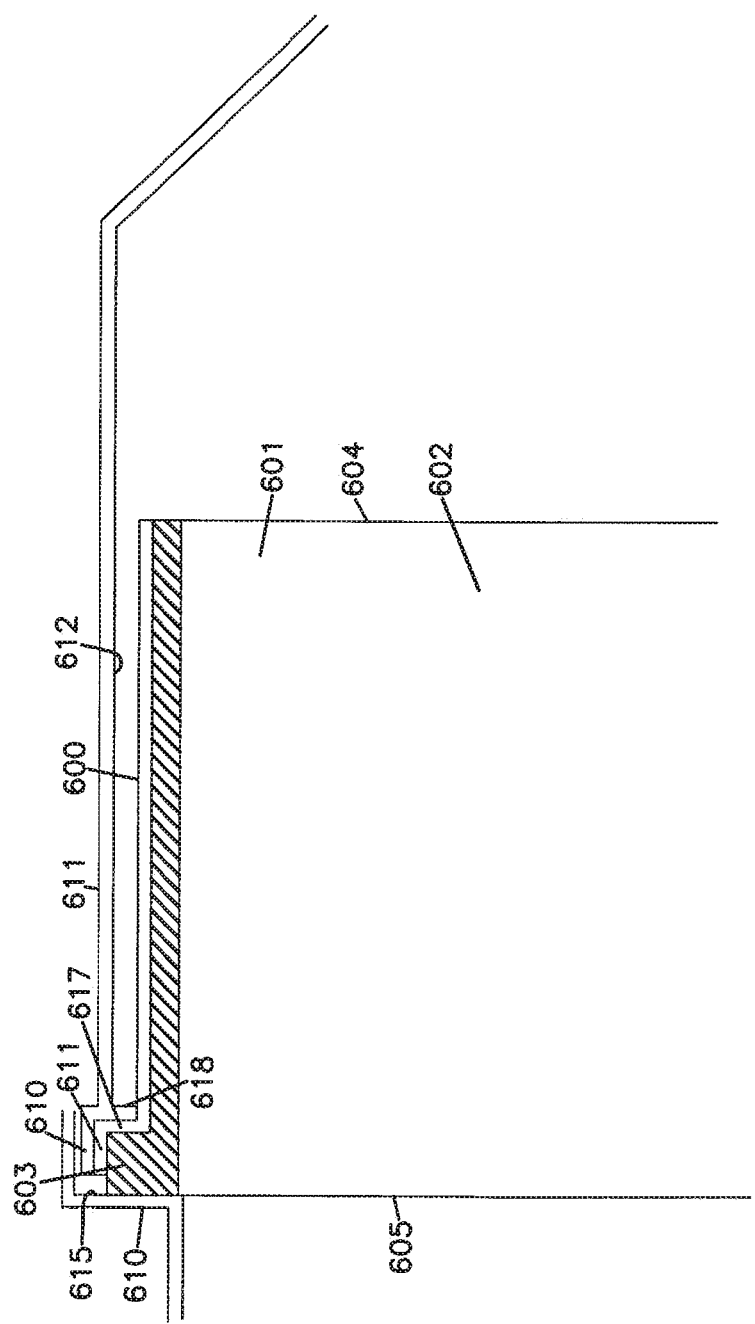

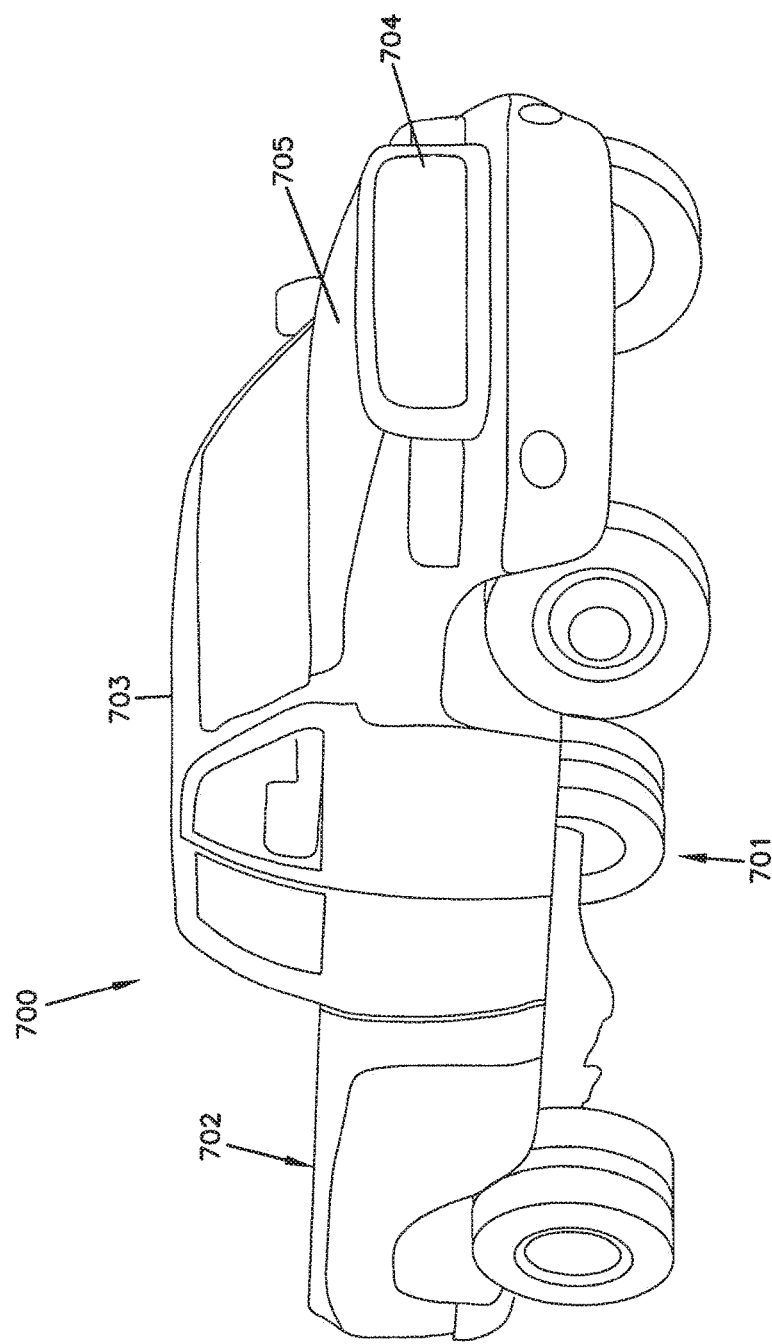

FIG. 37
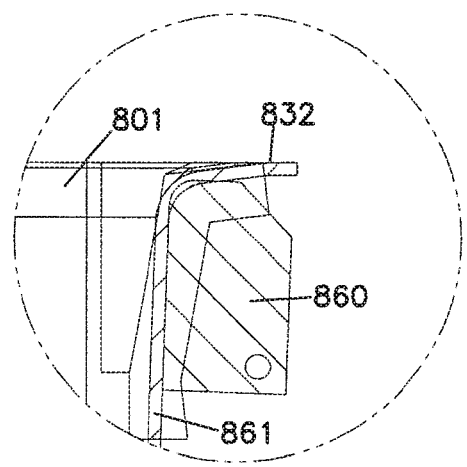
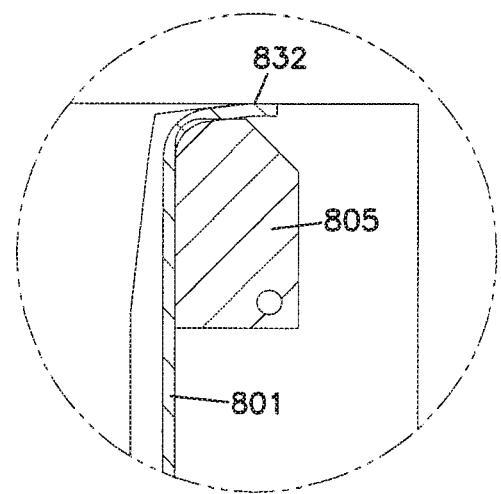
FIG. 39

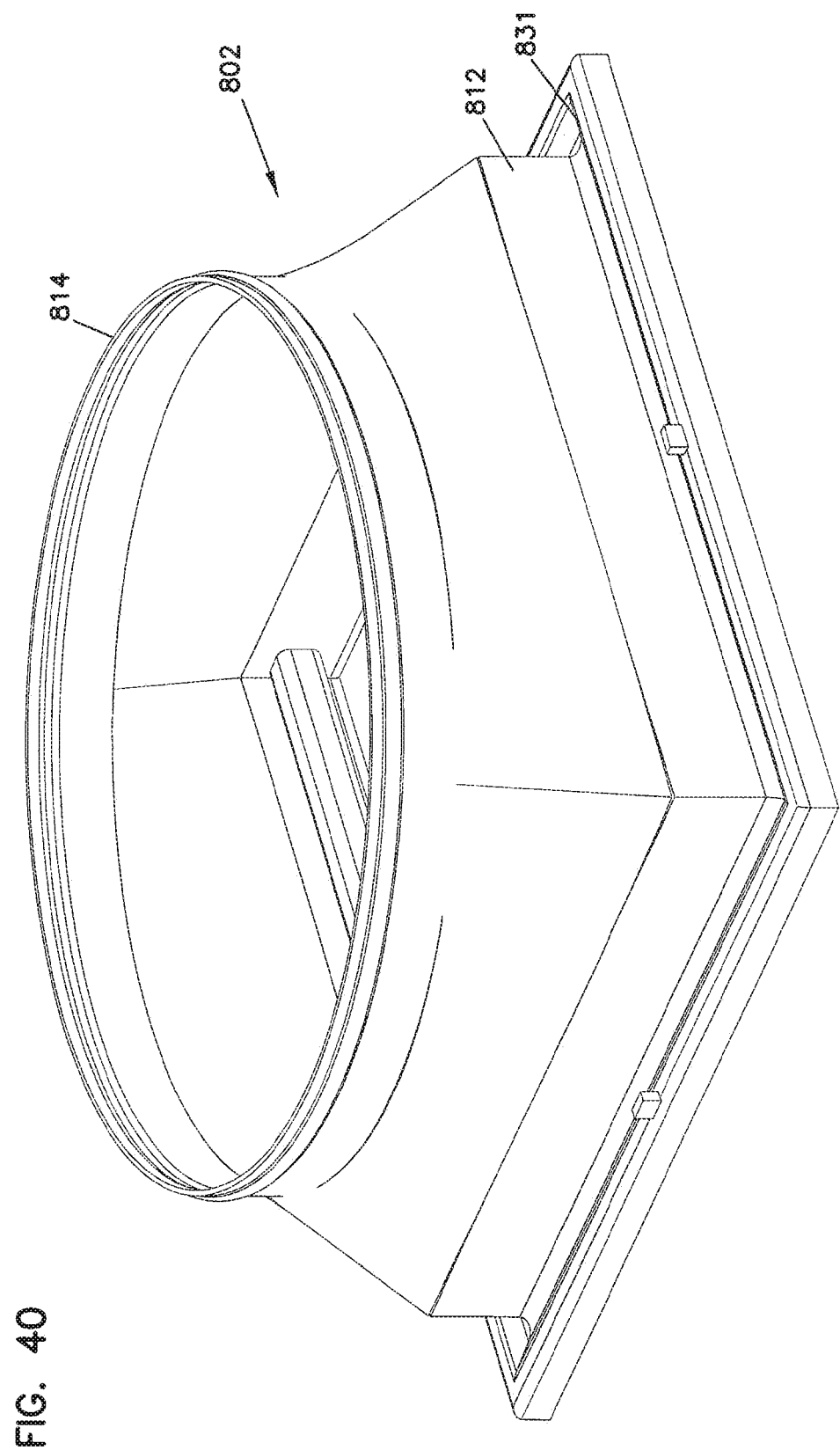

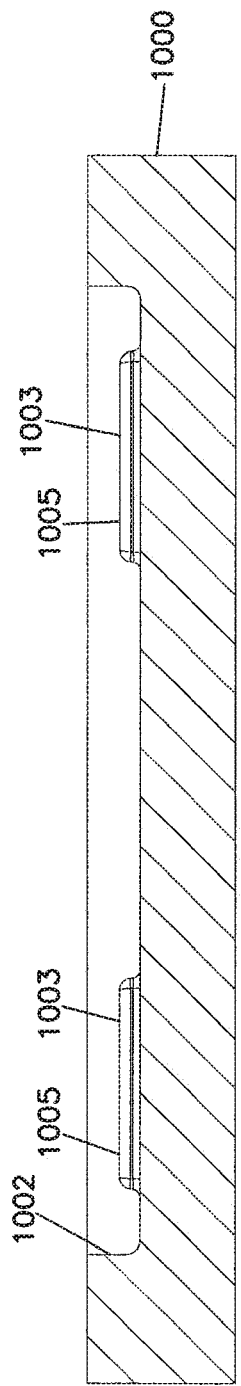
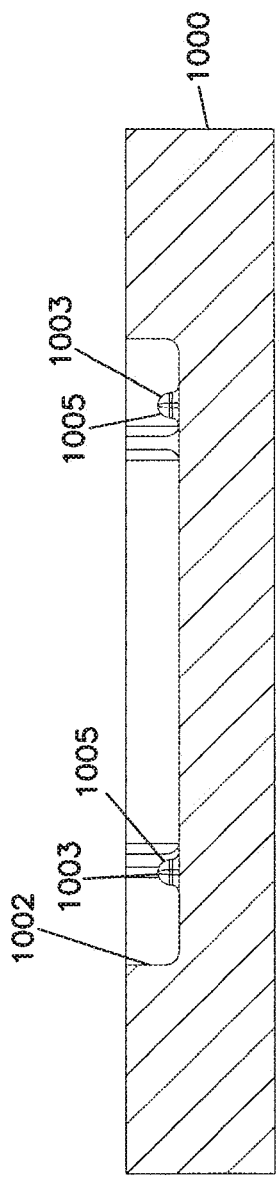

AIR FILTER ARRANGEMENT; ASSEMBLY; AND, METHODS

CROSS-REFERENCE TO RELATED APPLICATION

This application is a continuation application of U.S. Ser. No. 14/563,561, filed Dec. 8, 2014, which issued as U.S. Pat. No. 9,795,911 on Oct. 24, 2017. U.S. Ser. No. 14/563,561 is a continuation of U.S. Ser. No. 13/616,292, filed Sep. 14, 2012, which issued as U.S. Pat. No. 8,906,128 on Dec. 9, 2014. U.S. Ser. No. 13/616,292 is a continuation of U.S. Ser. No. 11/659,067, filed Jan. 30, 2007; and, which issued as U.S. Pat. No. 8,277,532. U.S. Ser. No. 11/659,067 was a I filing of PCT application PCT/I2005/028002, filed Aug. 5, 2005; the PCT application claiming priority to U.S. Ser. No. 60/599,686, filed Aug. 6, 2004; U.S. Ser. No. 60/600,081, filed Aug. 9, 2004; U.S. Ser. No. 60/602,721, filed Aug. 18, 2004; and, U.S. Ser. No. 60/616,364, filed Oct. 5, 2004. A claim of priority to each of U.S. Ser. No. 14/563,561; U.S. Ser. No. 13/616,292; U.S. Ser. No. 11/659,067; PCT/I2005/028002; U.S. Ser. No. 60/599,686; U.S. Ser. No. 60/600,081; U.S. Ser. No. 60/602,721; and, U.S. Ser. No. 60/616,364 is made to the extent appropriate. Each of U.S. Ser. No. 14/563,561; U.S. Ser. No. 13/616,292; U.S. Ser. No. 11/659,067; PCT/I2005/028002; U.S. Ser. No. 60/599,686; U.S. Ser. No. 60/600,081; U.S. Ser. No. 60/602,721; and, U.S. Ser. No. 60/616,364 is incorporated herein by reference.

FIELD OF THE DISCLOSURE

The present disclosure relates to filter media for use in filtering gases. The disclosure particularly relates to media packs that use z-filter media which comprises a corrugated media sheet secured to facing sheet, formed into a media pack. More specifically, the disclosure relates to such media packs and their inclusion in serviceable filter cartridge arrangements, typically for use in air cleaners. Air cleaner arrangements, methods of assembly and use, and systems of use are also described.

BACKGROUND

Fluid streams, such as air, can carry contaminant material therein. In many instances, it is desired to filter some or all of the contaminant material from the fluid stream. For example, air flow streams to engines (for example combustion air) for motorized vehicles or for power generation equipment, gas streams to gas turbine systems and air streams to various combustion furnaces, carry particulate contaminant therein that should be filtered. It is preferred for such systems, that selected contaminant material be removed from (or have its level reduced in) the fluid. A variety of fluid filter (air or liquid filter) arrangements have been developed for contaminant rejection. However, continued improvements are sought.

SUMMARY

According to a portion of the present disclosure, features useable in preferred filter cartridges, such as air filter cartridges are provided. The features can be used together to provide a preferred filter cartridge, however some advantageous cartridges can be constructed to use only selected ones of the features. In addition, methods of construction and use are provided.

In one aspect of the present disclosure, a preferred media pack is provided, for use in or as air filter cartridges. The media pack comprises a stacked z-filter arrangement having opposite flow faces and opposite sides. At the opposite sides, ends of stacked strips are secured in, and sealed by, molded end pieces. Preferably the molded end pieces comprise molded polyurethane. Also, a molded in place seal arrangement is provided.

Also air cleaner arrangements which use the filter cartridge as a service component are also described.

Various preferred features for a filter cartridge, for a described type of application, are shown. In addition, shown and described are variations in air cleaners, air cleaner systems and an example environment of use. Also, methods of assembly are shown and described.

BRIEF DESCRIPTION OF THE DRAWINGS

FIG. 6 is a schematic depiction of a step of creating a blocked, stacked z-filter media pack.

FIG. 7 is a schematic side elevational view of a filter cartridge according to the present disclosure.

FIG. 8 is an end elevational view of the filter cartridge of FIG. 7.

FIG. 9 is a top plan view of the filter cartridge of FIG. 7.

FIG. 10 is a cross-sectional view taken along line A-A, FIG. 9.

FIG. 11 is a schematic perspective view of an alternate filter cartridge according to the present disclosure.

FIG. 12 is a top plan view of the filter cartridge in FIG. 11.

FIG. 13 is a side cross-sectional view taken along line A-A, FIG. 12.

FIG. 14 is a cross-sectional view taken along line B-B, FIG. 12.

FIG. 15 is a schematic top plan view of a cartridge/cassette useable with the filter cartridge of FIG. 11.

FIG. 16 is a cross-sectional view taken along line B-B, FIG. 15.

FIG. 17 is a cross-sectional view taken along line A-A, FIG. 15.

FIG. 18 is a perspective view of a cartridge/cassette.

FIG. 19 is a fragmentary, schematic, cross-sectional view of a portion of an air cleaner.

FIG. 20 is a depiction of a pick-up truck in which an air cleaner system according to the present disclosure can be used.

FIG. 37 is an enlarged view of a portion of FIG. 36.

FIG. 39 is an enlarged fragmentary view of a portion of FIG. 38.

FIG. 40 is a perspective view of a cover component of the air cleaner of FIG. 24.

FIG. 60 is a cross-sectional view taken along line 60-60, FIG. 59.

FIG. 61 is a cross-sectional view taken along line 61-61, FIG. 59.

FIG. 64 being a side elevational view directed toward a side not covered by a side panel.

in FIG. 72, the mold section being depicted with a media pack positioned therein.

Figure 1:
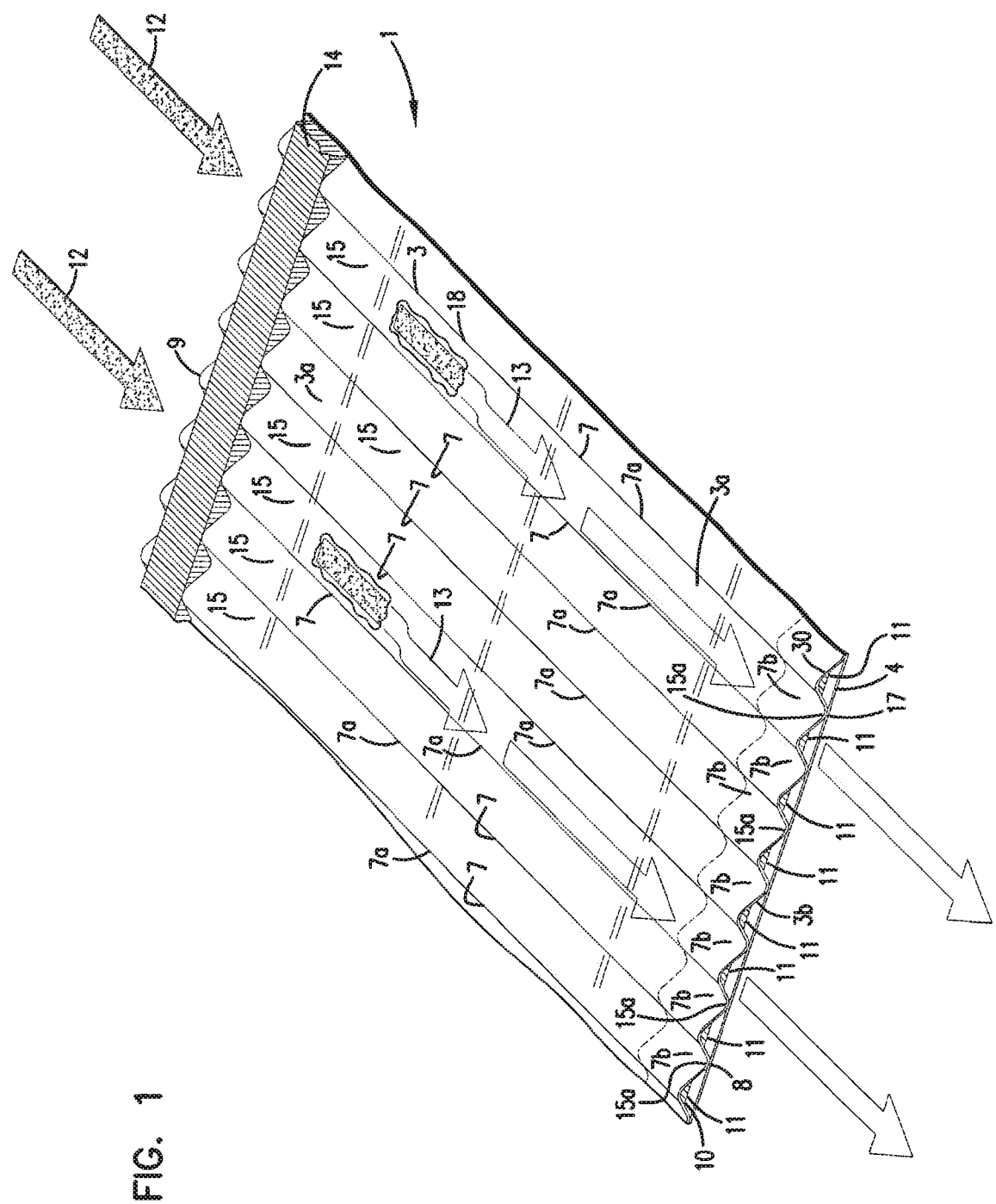
FIG. 1 is a fragmentary, schematic, perspective view of z-filter media useable in arrangements according to the present disclosure.

Some dimensions (in mm and sometimes in inches) are provided in certain drawings, as examples. Alternate sizes are possible.

DETAILED DESCRIPTION

I. Z-Filter Media Configurations, Generally

Fluted filter media can be used to provide fluid filter constructions in a variety of manners. One well known manner is as a z-filter construction. The term "z-filter construction" as used herein, is meant to refer to a filter construction in which individual ones of corrugated, folded or otherwise formed filter flutes are used to define sets of longitudinal, typically parallel, inlet and outlet filter flutes for fluid flow through the media; the fluid flowing along the length of the flutes between opposite inlet and outlet flow ends (or flow faces) of the media. Some examples of z-filter media are provided in U.S. Pat. Nos. 5,820,646; 5,772,883; 5,902,364; 5,792,247; 5,895,574; 6,210,469; 6,190,432; 6,350,296; 6,179,890; 6,235,195; Des. 399,944; Des. 428,128; Des. 396,098; Des. 398,046; and, Des. 437,401; each of these fifteen cited references being incorporated herein by reference.

One type of z-filter media, utilizes two specific media components joined together, to form the media construction. The two components are: (1) a fluted (typically corrugated) media sheet; and, (2) a facing media sheet. The facing media sheet is typically non-corrugated, however it can be corrugated, for example perpendicularly to the flute direction as described in U.S. provisional 60/543,804, filed Feb. 11, 2004, incorporated herein by reference.

The fluted (typically corrugated) media sheet and the facing media sheet together, are used to define media having parallel inlet and outlet flutes. In some instances, the fluted sheet and facing sheet are secured together and are then coiled to form a z-filter media construction. Such arrangements are described, for example, in U.S. Pat. Nos. 6,235,195 and 6,179,890, each of which is incorporated herein by reference. In certain other arrangements, some non-coiled sections of corrugated media secured to facing media, are stacked on one another, to create a filter construction. An example of this is described in FIG. 11 of U.S. Pat. No. 5,820,646, incorporated herein by reference.

The term "corrugated" used herein to refer to structure in media, is meant to refer to a flute structure resulting from passing the media between two corrugation rollers, i.e., into a nip or bite between two rollers, each of which has surface features appropriate to cause a corrugation affect in the resulting media. The term "corrugation" is not meant to refer to flutes that are formed by techniques not involving passage of media into a bite between corrugation rollers. However, the term "corrugated" is meant to apply even if the media is further modified or deformed after corrugation, for example by the folding techniques described in PCT WO 04/007054, published Jan. 22, 2004, incorporated herein by reference.

Corrugated media is a specific form of fluted media. Fluted media is media which has individual flutes (for example formed by corrugating or folding) extending thereacross.

Serviceable filter element or filter cartridge configurations utilizing z-filter media are sometimes referred to as "straight through flow configurations" or by variants thereof. In general, in this context what is meant is that the serviceable filter elements generally have an inlet flow end (or face) and an opposite exit flow end (or face), with flow entering and exiting the filter cartridge in generally the same straight through direction. The term "serviceable" in this context is meant to refer to a media containing filter cartridge that is periodically removed and replaced from a corresponding fluid (e.g. air) cleaner. In some instances, each of the inlet flow end and outlet flow end will be generally flat or planar, with the two parallel to one another. However, variations from this, for example non-planar faces, are possible.

A straight through flow configuration (especially for a coiled media pack) is, for example, in contrast to serviceable filter cartridges such as cylindrical pleated filter cartridges of the type shown in U.S. Pat. No. 6,039,778, incorporated herein by reference, in which the flow generally makes a turn inside of the cartridge and as its passes through the serviceable cartridge. That is, in a U.S. Pat. No. 6,039,778 filter, the flow enters the cylindrical filter cartridge through a cylindrical side, and then turns to exit through an end face (in forward-flow systems). In a typical reverse-flow system, the flow enters the serviceable cylindrical cartridge through an end face and then turns to exit through a side of the cylindrical filter cartridge. An example of such a reverse-flow system is shown in U.S. Pat. No. 5,613,992, incorporated by reference herein.

The term "z-filter media construction" and variants thereof as used herein, without more, is meant to refer to any or all of: a web of corrugated or otherwise fluted media secured to (facing) media with appropriate sealing to allow for definition of inlet and outlet flutes; or, a media pack constructed or formed from such media into a three dimensional network of inlet and outlet flutes; and/or, a filter cartridge or construction including such a media pack.

In FIG. 1, an example of media 1 useable in z-filter media is shown. The media 1 is formed from a corrugated sheet 3 and a facing sheet 4.

In general, the corrugated sheet 3, FIG. 1 is of a type generally characterized herein as having a regular, curved, wave pattern of flutes or corrugations 7. The term "wave pattern" in this context, is meant to refer to a flute or corrugated pattern of alternating troughs 7b and ridges 7a. The term "regular" in this context is meant to refer to the fact that the pairs of troughs and ridges (7b, 7a) alternate with generally the same repeating corrugation (or flute) shape and size. (Also, typically in a regular configuration each trough 7b is substantially an inverse of each ridge 7a.) The term "regular" is thus meant to indicate that the corrugation (or flute) pattern comprises troughs and ridges with each pair (comprising an adjacent trough and ridge) repeating, without substantial modification in size and shape of the corrugations along at least 70% of the length of the flutes. The term "substantial" in this context, refers to a modification resulting from a change in the process or form used to create the corrugated or fluted sheet, as opposed to minor variations from the fact that the media sheet 3 is flexible. With respect to the characterization of a repeating pattern, it is not meant that in any given filter construction, an equal number of ridges and troughs is necessarily present. The media 1 could be terminated, for example, between a pair comprising a ridge and a trough, or partially along a pair comprising a ridge and a trough. (For example, in FIG. 1 the media 1 depicted in fragmentary has eight complete ridges 7a and seven complete troughs 7b.) Also, the opposite flute ends (ends of the troughs and ridges) may vary from one another. Such variations in ends are disregarded in these definitions, unless specifically stated. That is, variations in the ends of flutes are intended to be covered by the above definitions.

In the context of the characterization of a "curved" wave pattern of corrugations, the term "curved" is meant to refer to a corrugation pattern that is not the result of a folded or creased shape provided to the media, but rather the apex 7*a* of each ridge and the bottom 7*b* of each trough is formed along a radiused curve. A typical radius for such z-filter media would be at least 0.25 mm and typically would be not more than 3 mm.

An additional characteristic of the particular regular, curved, wave pattern depicted in FIG. 1, for the corrugated sheet 3, is that at approximately a midpoint 30 between each trough and each adjacent ridge, along most of the length of the flutes 7, is located a transition region where the curvature inverts. For example, viewing back side or face 3*a*, FIG. 1, trough 7*b* is a concave region, and ridge 7*a* is a convex region. Of course when viewed toward front side or face 3*b*, trough 7*b* of side 3*a* forms a ridge; and, ridge 7*a* of face 3*a*, forms a trough. (In some instances, region 30 can be a straight segment, instead of a point, with curvature inverting at ends of the segment 30.)

A characteristic of the particular regular, curved, wave pattern corrugated sheet 3 shown in FIG. 1, is that the individual corrugations are generally straight. By "straight" in this context, it is meant that through at least 70%, typically at least 80% of the length between edges 8 and 9, the ridges 7*a* and troughs 7*b* do not change substantially in cross-section. The term "straight" in reference to corrugation pattern shown in FIG. 1, in part distinguishes the pattern from the tapered flutes of corrugated media described in FIG. 1 of WO 97/40918 and PCT Publication WO 03/47722, published Jun. 12, 2003, incorporated herein by reference. The tapered flutes of FIG. 1 of WO 97/40918, for example, would be a curved wave pattern, but not a "regular" pattern, or a pattern of straight flutes, as the terms are used herein.

Referring to the present FIG. 1 and as referenced above, the media 1 has first and second opposite edges 8 and 9. When the media 1 is coiled and formed into a media pack, in general edge 9 will form an inlet end for the media pack and edge 8 an outlet end, although an opposite orientation is possible.

Adjacent edge 8 is provided a sealant bead 10, or other seal arrangement, sealing the corrugated sheet 3 and the facing sheet 4 together. Bead 10 will sometimes be referred to as a "single facer" bead, since it is a bead between the corrugated sheet 3 and facing sheet 4, which forms the single facer or media strip 1. Sealant bead 10 seals closed individual flutes 11 adjacent edge 8, to passage of air therefrom.

Adjacent edge 9, is provided seal bead 14, or seal arrangement. Seal bead 14 generally closes flutes 15 to passage of unfiltered fluid therein, adjacent edge 9. Bead 14 would typically be applied as strips of the media 1 are secured to one another during stacking. Thus, bead 14 will form a seal between a back side 17 of facing sheet 4, and side 18 of the next adjacent corrugated sheet 3. When the media 1 is cut in strips and stacked, instead of coiled, bead 14 is sometimes referenced as a "stacking bead." (When bead 14 is used in a coiled arrangement, not depicted herein, it is sometimes referenced as a "winding bead.")

Referring to FIG. 1, once the media 1 is incorporated into a media pack, for example by stacking, it can be operated as follows. First, air in the direction of arrows 12, would enter open flutes 11 adjacent end 9. Due to the closure at end 8, by bead 10, the air would pass through the media shown by arrows 13. It could then exit the media pack, by passage through open ends 15*a* of the flutes 15, adjacent end 8 of the media pack. Of course operation could be conducted with air flow in the opposite direction.

For the particular arrangement shown herein in FIG. 1, the parallel corrugations 7*a*, 7*b* are generally straight completely across the media, from edge 8 to edge 9. Straight flutes or corrugations can be deformed or folded at selected locations, especially at ends. Modifications at flute ends for closure are generally disregarded in the above definitions of "regular," "curved" and "wave pattern."

Z-filter constructions which do not utilize straight, regular curved wave pattern corrugation shapes are known. For example in Yamada et al. U.S. Pat. No. 5,562,825 corrugation patterns which utilize somewhat semicircular (in cross section) inlet flutes adjacent narrow V-shaped (with curved sides) exit flutes are shown (see FIGS. 1 and 3, of U.S. Pat. No. 5,562,825). In Matsumoto, et al. U.S. Pat. No. 5,049,326 circular (in cross-section) or tubular flutes defined by one sheet having half tubes attached to another sheet having half tubes, with flat regions between the resulting parallel, straight, flutes are shown, see FIG. 2 of Matsumoto '326. In Ishii, et al. U.S. Pat. No. 4,925,561 (FIG. 1) flutes folded to have a rectangular cross section are shown, in which the flutes taper along their lengths. In WO 97/40918 (FIG. 1), flutes or parallel corrugations which have a curved, wave patterns (from adjacent curved convex and concave troughs) but which taper along their lengths (and thus are not straight) are shown. Also, in WO 97/40918 flutes which have curved wave patterns, but with different sized ridges and troughs, are shown.

In general, the filter media is a relatively flexible material, typically a non-woven fibrous material (of cellulose fibers, synthetic fibers or both) often including a resin therein, sometimes treated with additional materials. Thus, it can be conformed or configured into the various corrugated patterns, without unacceptable media damage. Also, it can be readily coiled or otherwise configured for use, again without unacceptable media damage. Of course, it must be of a nature such that it will maintain the required corrugated configuration, during use. In the corrugation process, an inelastic deformation is caused to the media. This prevents the media from returning to its original shape. However, once the tension is released the flute or corrugations will tend to spring back, recovering at least a portion of the stretch and bending that has occurred. The facing sheet is sometimes tacked to the fluted sheet, to inhibit this spring back in the corrugated sheet.

Also, typically, the media contains a resin. During the corrugation process, the media can be heated to above the glass transition point of the resin. When the resin then cools, it will help to maintain the fluted shapes.

The media of the corrugated sheet 3 facing sheet 4 or both, can be provided with a fine fiber material on one or both sides thereof, for example in accord with U.S. Pat. No. 6,673,136, incorporated herein by reference.

An issue with respect to z-filter constructions relates to closing of the individual flute ends. Although alternatives are possible, typically a sealant or adhesive is provided, to accomplish the closure. As is apparent from the discussion above, in typical z-filter media, especially that which uses straight flutes as opposed to tapered flutes, large sealant surface areas (and volume) at both the upstream end and the downstream end are needed. High quality seals at these locations are critical to proper operation of the media structure that results. The high sealant volume and area, creates issues with respect to this.

Figure 2:
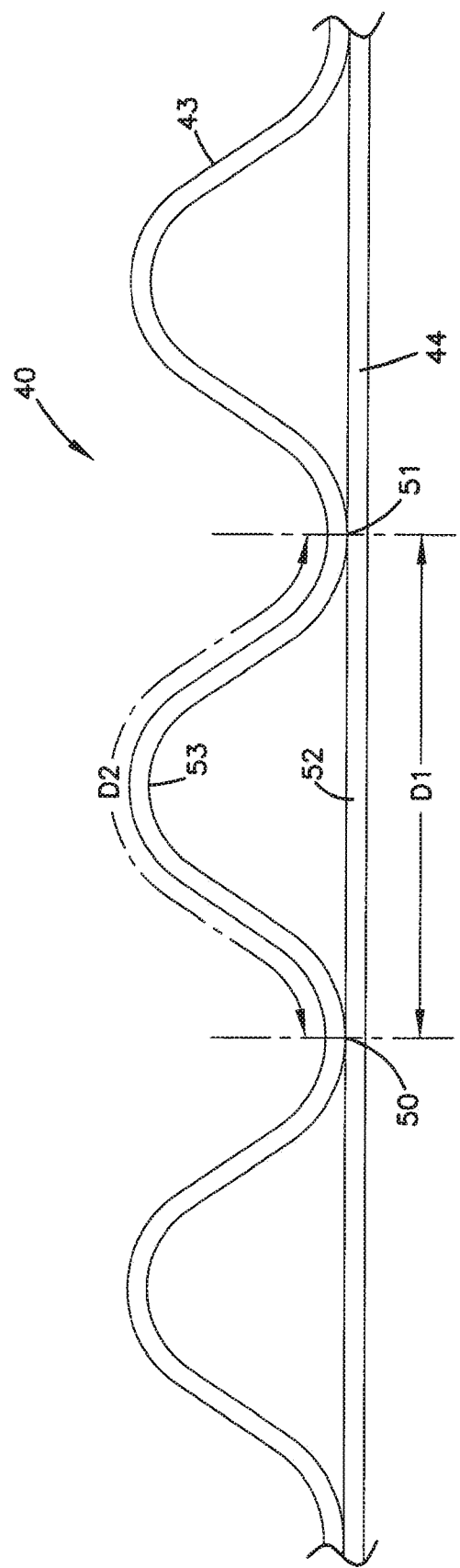
FIG. 2 is an enlarged schematic, cross-sectional view of a portion of the media depicted in FIG. 1.

Attention is now directed to FIG. 2, in which a z-filter media construction 40 utilizing a regular, curved, wave pattern corrugated sheet 43, and a non-corrugated (flat) flowing sheet 44, is depicted. The distance D1, between points 50 and 51, defines the extension of media 44 in region 52 underneath a given corrugated flute 53. The length D2 of the arcuate media for the corrugated flute 53, over the same distance D1 is of course larger than D1, due to the shape of the corrugated flute 53. For a typical regular shaped media used in fluted filter applications, the linear length D2 of the media 53 between points 50 and 51 will often be at least 1.2 times D1. Typically, D2 would be within a range of 1.2-2.0, inclusive. One particularly convenient arrangement for air filters has a configuration in which D2 is about 1.25-1.35× D1. Such media has, for example, been used commercially in Donaldson Powercore™ Z-filter arrangements. Herein the ratio D2/D1 will sometimes be characterized as the flute/flat ratio or media draw for the corrugated media.

Figure 3:
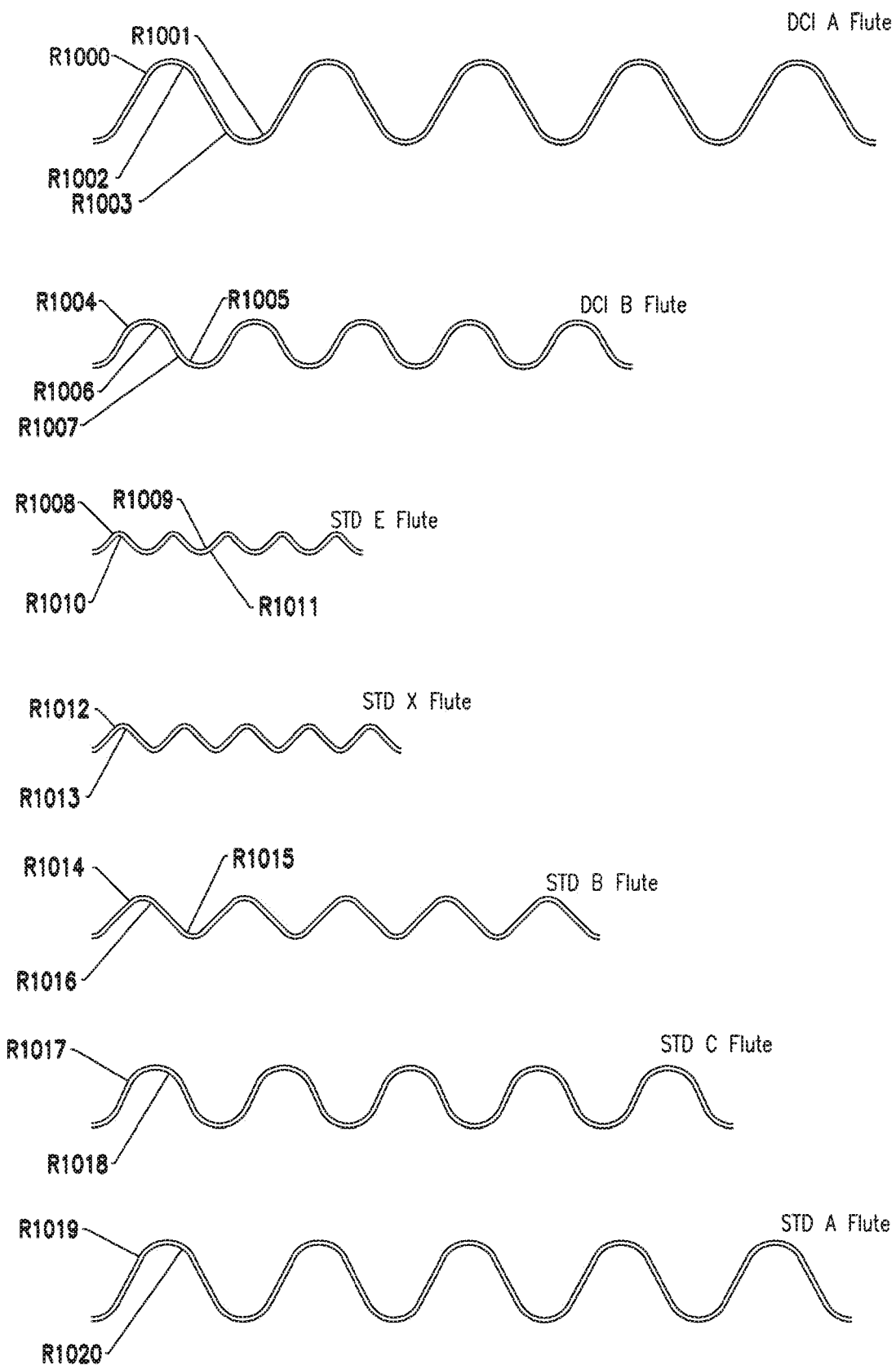
FIG. 3 is a schematic view of examples of various corrugated media definitions.

In the corrugated cardboard industry, various standard flutes have been defined. For example the standard E flute, standard X flute, standard B flute, standard C flute and standard A flute. FIG. 3, attached, in combination with Table A below provides definitions of these flutes.

Donaldson Company, Inc., (DCI) the assignee of the present disclosure, has used variations of the standard A and standard B flutes, in a variety of z-filter arrangements. These flutes are also defined in Table A and FIG. 3.

TABLE A (Flute definitions for FIG. 3)

| | |
|---|---|
| DCI A Flute: | Flute/flat = 1.52:1; The Radii (R) are as follows: R1000 = .0675 inch (1.715 mm); R1001 = .0581 inch (1.476 mm); R1002 = .0575 inch (1.461 mm); R1003 = .0681 inch (1.730 mm); |
| DCI B Flute: | Flute/flat = 1.32:1; The Radii (R) are as follows: R1004 = .0600 inch (1.524 mm); R1005 = .0520 inch (1.321 mm); R1006 = .0500 inch (1.270 mm); R1007 = .0620 inch (1.575 mm); |
| Std. E Flute: | Flute/flat = 1.24:1; The Radii (R) are as follows: R1008 = .0200 inch (.508 mm); R1009 = .0300 inch (.762 mm); R1010 = .0100 inch (.254 mm); R1011 = .0400 inch (1.016 mm); |
| Std. X Flute: | Flute/flat = 1.29:1; The Radii (R) are as follows: R1012 = .0250 inch (.635 mm); R1013 = .0150 inch (.381 mm); |
| Std. B Flute: | Flute/flat = 1.29:1; The Radii (R) are as follows: R1014 = .0410 inch (1.041 mm); R1015 = .0310 inch (.7874 mm); R1016 = .0310 inch (.7874 mm); |
| Std. C Flute: | Flute/flat = 1.46:1; The Radii (R) are as follows: R1017 = .0720 inch (1.829 mm); R1018 = .0620 inch (1.575 mm); |
| Std. A Flute: | Flute/flat = 1.53:1; The Radii (R) are as follows: R1019 = .0720 inch (1.829 mm); R1020 = .0620 inch (1.575 mm). |

Of course other, standard, flutes definitions from the corrugated box industry are known.

In general, standard flute configurations from the corrugated box industry can be used to define corrugation shapes or approximate corrugation shapes for corrugated media. Comparisons above between the DCI A flute and DCI B flute, and the corrugation industry standard A and standard B flutes, indicate some convenient variations.

II. Manufacture of Stacked Media Configurations Using Fluted Media, Generally In FIG. 4, one example of a manufacturing process for making a media strip corresponding to strip 1, FIG. 1 is shown. In general, facing sheet 64 and the fluted (corrugated) sheet 66 having flutes 68 are brought together to form a media web 69, with an adhesive bead located therebetween at 70. The adhesive bead 70 will form a single facer bead 10, FIG. 1. An optional darting process occurs at station 71 to form center darted section 72 located mid-web. The z-filter media or Z-media strip 74 can be cut or slit at 75 along the bead 70 to create two pieces 76, 77 of z-filter media 74, each of which has an edge with a strip of sealant (single facer bead) extending between the corrugating and facing sheet. Of course, if the optional darting process is used, the edge with a strip of sealant (single facer bead) would also have a set of flutes darted at this location. The strips or pieces 76, 77 can then be cut across, for stacking, as described below in connection with FIG. 6.

Figure 4:
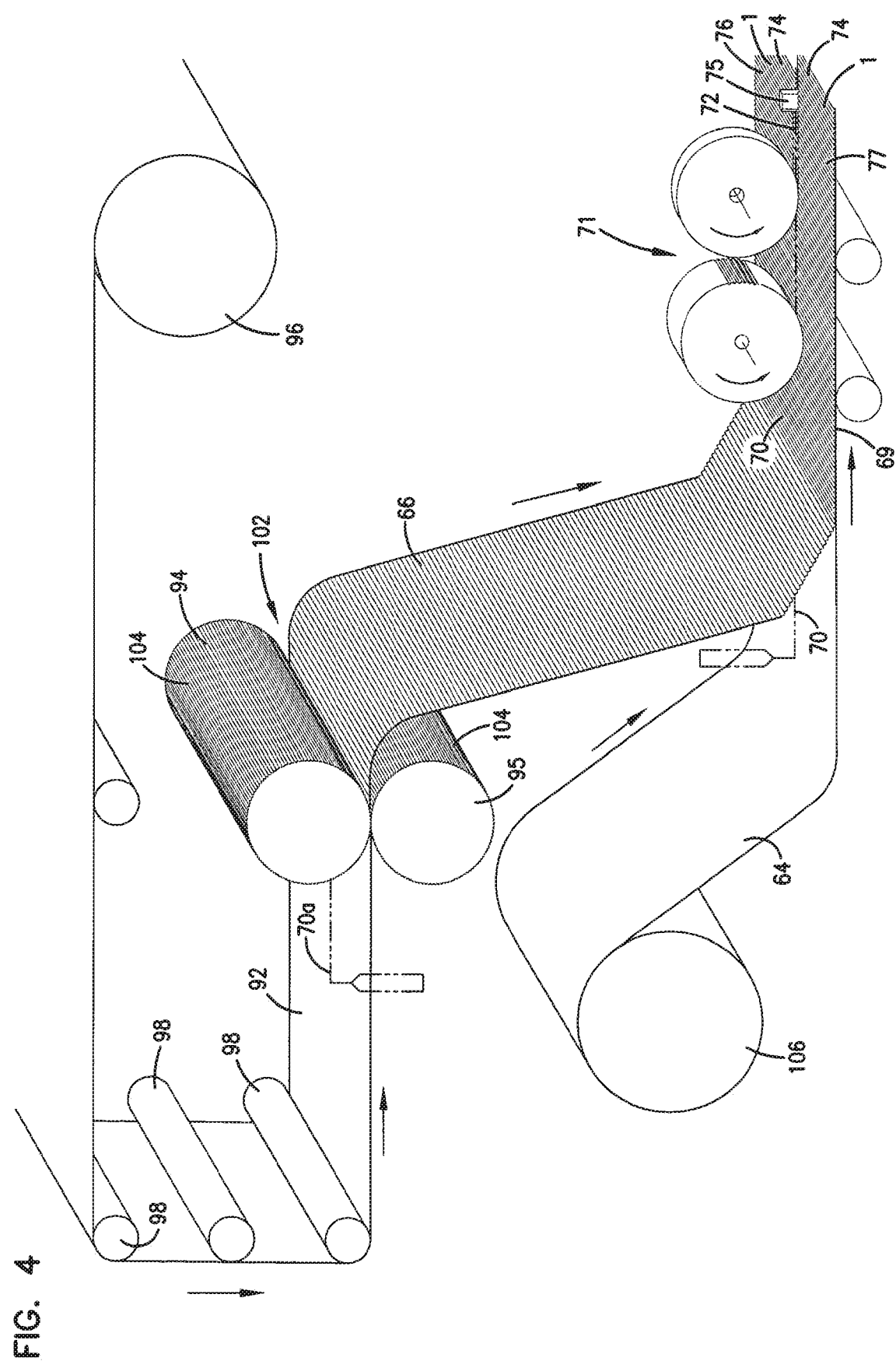
FIG. 4 is a schematic view of a process for manufacturing media according to the present disclosure.

Techniques for conducting a process as characterized with respect to FIG. 4 are described in PCT WO 04/007054, published Jan. 22, 2004 incorporated herein by reference.

Still in reference to FIG. 4, before the z-filter media 74 is put through the darting station 71 the media 74 must be formed. In the schematic shown in FIG. 4, this is done by passing a flat sheet of media 92 through a pair of corrugation rollers 94, 95. In the schematic shown in FIG. 4, the flat sheet of media 92 is unrolled from a roll 96, wound around tension rollers 98, and then passed through a nip or bite 102 between the corrugation rollers 94, 95. The corrugation rollers 94, 95 have teeth 104 that will give the general desired shape of the corrugations after the flat sheet 92 passes through the nip 102. After passing through the nip 102, the flat sheet 92 becomes corrugated and is referenced at 66 as the corrugated sheet. The corrugated sheet 66 is then secured to facing sheet 64. (The corrugation process may involve heating the media, in some instances.)

Still in reference to FIG. 4, the process also shows the facing sheet 64 being routed to the darting process station 71. The facing sheet 64 is depicted as being stored on a roll 106 and then directed to the corrugated sheet 66 to form the Z-media 74. The corrugated sheet 66 and the facing sheet 64 are secured together by adhesive or by other means (for example by sonic welding).

Referring to FIG. 4, an adhesive line 70 is shown used to secure corrugated sheet 66 and facing sheet 64 together, as the sealant bead. Alternatively, the sealant bead for forming the facing bead could be applied as shown as 70a. If the sealant is applied at 70a, it may be desirable to put a gap in the corrugation roller 95, and possibly in both corrugation rollers 94, 95, to accommodate the bead 70a.

The type of corrugation provided to the corrugated media is a matter of choice, and will be dictated by the corrugation or corrugation teeth of the corrugation rollers 94, 95. One preferred corrugation pattern will be a regular curved wave pattern corrugation, of straight flutes, as defined herein above. A typical regular curved wave pattern used, would be one in which the distance D2, as defined above, in a corrugated pattern is at least 1.2 times the distance D1 as defined above. In one preferred application, typically D2=1.25-1.35×D1. In some instances the techniques may be applied with curved wave patterns that are not "regular," including, for example, ones that do not use straight flutes.

Figure 5:
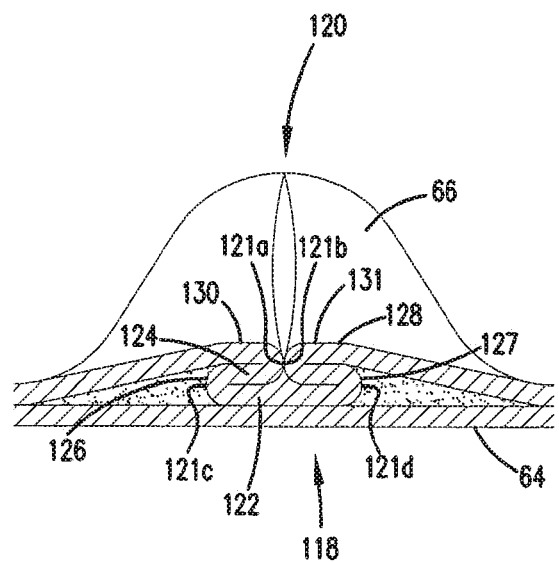
FIG. 5 is a cross-sectional view of an optional end dart for media flutes useable in arrangements according to the present disclosure.

As described, the process shown in FIG. 4 can be used to create the center darted section 72. FIG. 5 shows, in cross-section, one of the flutes 68 after darting and slitting.

A fold arrangement 118 can be seen to form a darted flute 120 with four creases 121a, 121b, 121c, 121d. The fold arrangement 118 includes a flat first layer or portion 122 that is secured to the facing sheet 64. A second layer or portion 124 is shown pressed against the first layer or portion 122.

The second layer or portion 124 is preferably formed from folding opposite outer ends 126, 127 of the first layer or portion 122.

Still referring to FIG. 5, two of the folds or creases 121a, 121b will generally be referred to herein as "upper, inwardly directed" folds or creases. The term "upper" in this context is meant to indicate that the creases lie on an upper portion of the entire fold 120, when the fold 120 is viewed in the orientation of FIG. 5. The term "inwardly directed" is meant to refer to the fact that the fold line or crease line of each crease 121a, 121b, is directed toward the other.

In FIG. 5, creases 121c, 121d, will generally be referred to herein as "lower, outwardly directed" creases. The term "lower" in this context refers to the fact that the creases 121c, 121d are not located on the top as are creases 121a, 121b, in the orientation of FIG. 5. The term "outwardly directed" is meant to indicate that the fold lines of the creases 121c, 121d are directed away from one another.

The terms "upper" and "lower" as used in this context are meant specifically to refer to the fold 120, when viewed from the orientation of FIG. 5. That is, they are not meant to be otherwise indicative of direction when the fold 120 is oriented in an actual product for use.

Based upon these characterizations and review of FIG. 5, it can be seen that a preferred regular fold arrangement 118 according to FIG. 5 in this disclosure is one which includes at least two "upper, inwardly directed, creases." These inwardly directed creases are unique and help provide an overall arrangement in which the folding does not cause a significant encroachment on adjacent flutes.

A third layer or portion 128 can also be seen pressed against the second layer or portion 124. The third layer or portion 128 is formed by folding from opposite inner ends 130, 131 of the third layer 128.

Another way of viewing the fold arrangement 118 is in reference to the geometry of alternating ridges and troughs of the corrugated sheet 66. The first layer or portion 122 is formed from an inverted ridge. The second layer or portion 124 corresponds to a double peak (after inverting the ridge) that is folded toward, and in preferred arrangements, folded against the inverted ridge.

Techniques for providing the optional dart described in connection with FIG. 5, in a preferred manner, are described in PCT WO 04/007054, incorporated herein by reference. Other techniques for media management are described in PCT application US 04/07927, filed Mar. 17, 2004, incorporated herein by reference.

Techniques described herein are well adapted for use of media packs that result from arrangements that, instead of being formed by coiling, are formed from a plurality of strips of single facer.

Opposite flow ends or flow faces of the media pack can be provided with a variety of different definitions. In many arrangements, the ends are generally flat and perpendicular to one another.

The flute seals (single facer bead, winding bead or stacking bead) can be formed from a variety of materials. In various ones of the cited and incorporated references, hot melt or polyurethane seals are described as possible for various applications. These are useable for applications described herein.

In FIG. 6, schematically there is shown a step of forming a stacked z-filter media pack from strips of z-filter media. Referring to FIG. 6, strip 200 is being shown added to a stack 201 of strips 202 analogous to strip 200. Strip 200 can be cut from either of strips 76, 77, FIG. 4. At 205, FIG. 6, application of a stacking bead 206 is shown, between each layer corresponding to a strip 200, 202 at an opposite edge from the single facer bead or seal. In FIG. 6, each layer is added to a top of the stack. Such layers could alternatively be added to the bottom.

Also, in some alternate processing approaches sealant bead 206 can be added to the underside (i.e., facing sheet side) of each strip, as opposed to the fluted sheet (corrugated) side of each single facer strip.

Referring to FIG. 6, each strip 200, 202 has front and rear edges 207, 208 and opposite side edges 209a, 209b. Inlet and outlet flutes of the corrugated sheet/facing sheet combination comprising each strip 200, 202 generally extend between the front and rear edges 207, 208, and parallel to side edges 209a, 209b. Sides 209a, 209b are sometimes referenced as tail and lead ends of the media strips 200.

Still referring to FIG. 6, in the media pack 201 being formed, opposite flow faces are indicated at 210, 211. The selection of which one of faces 210, 211 is the inlet end face and which is the outlet end face, during filtering, is a matter of choice. In some instances the stacking bead 206 is preferably positioned adjacent the upstream or inlet face 211. The flow faces 210, 211, extend between opposite side faces 220, 221.

The stacked media pack 201 being formed in FIG. 6, is sometimes referred to herein as a "blocked" stacked media pack. The term "blocked" in this context, is an indication that the arrangement is formed to a rectangular block in which all faces are 90° relative to all adjoining wall faces. Alternate configurations are possible, as discussed in U.S. Provisional application 60/579,754, filed Jun. 14, 2004, incorporated herein by reference. One example of an alternate configuration, would be one in which instead of each cross-section of the stacked media pack arrangement having rectangular (or right quadrilateral) cross-section, at least one of the cross-sections is a oblique parallelogram cross-section. In such a parallelogram, opposite sides are parallel to one another, but adjacent sides do not meet at a right angle, but rather meet at a defined angle other than 90°.

Still other stacked shapes are possible, depending on how the individual sheets, in forming the stack, are positioned relative to adjacent sheets.

In some instances, the media pack 201 shown will be referenced as having a parallelogram shape in any cross-section, meaning that any two opposite side faces extend generally parallel to one another.

It is noted that a blocked, stacked arrangement corresponding to FIG. 6 is described in the prior art of U.S. Pat. No. 5,820,646, incorporated herein by reference. It is also noted that stacked arrangements are described in U.S. Pat. Nos. 5,772,883; 5,792,247; U.S. Provisional 60/457,255 filed Mar. 25, 2003; and U.S. Ser. No. 10/731,564 filed Dec. 8, 2003. All four of these latter references are incorporated herein by reference. It is noted that the stacked arrangement at FIG. 6 of U.S. Ser. No. 10/731,504, is a slanted or oblique parallelogram stacked arrangement.

Of course the methods disclosed are merely examples. Useable z-filter media packs can be formed in alternate manners.

III. A First Filter Cartridge, FIGS. 7-10

Attention is directed to FIG. 7 which discloses a filter cartridge utilizing a media pack according to the above general description. Referring to FIG. 7, at 300 a filter cartridge is depicted comprising a blocked stacked (rectangular or right (normal) parallelogram) media pack 301. To seal opposite ends of the media pack 201 are positioned side panels 302, 303. These panels can be made in general, in accord with the descriptions in U.S. provisional application 60/579,754, filed Jun. 14, 2004.

More specifically, and referring to FIG. 6, each single facer strip 200 (comprising a section of corrugated sheet and facing sheet secured together) has a lead edge 209b and a tail edge 209a. These edges result from cutting a continuous strip of single facer into the individual sheets used to form the media pack stack. The lead end and tail ends need to be sealed closed. For the arrangement of FIG. 19, this sealing is conducted by side panels 302, 303.

In preferred arrangements, as described below, panels 302, 303 will be molded directly to the media pack, to seal the lead and tail ends of the strips of single facer, within the media pack. By "molded directly to" in this context, it is meant that there is no preform in the side panel, rather the side panel is formed in place on and joined to the media pack. This would distinguish, for example, a preform molded side piece which is attached to the media pack by a potting material.

The media pack 301 has opposite flow faces 305, 306. In use, air flows through the media pack 301 from one of the flow faces 305, 306 to the other. The direction of flow is typically a matter of choice for the system of use. Often, the media pack 301 would be positioned with flow face 305 as the outlet flow face, but alternatives are possible.

Adjacent to, but spaced from surface 305 toward surface 306, is provided peripheral seal ring 310. The particular seal ring 310 depicted, is an axial pinch seal ring, although alternatives are possible. Herein, seal ring 310 will sometimes be referred to as a housing seal arrangement, since it is a seal member positioned in the filter cartridge 300 at a location desirable for forming a seal with housing components, when the filter cartridge 300 is positioned in an air cleaner for use.

The filter cartridge 300 of FIG. 7 can be made by: (a) providing the media pack 301; and, (b) molding panels 302, 303 thereto in separate molding operations, and then finally molding pinch (housing) seal arrangement 310 thereto, in a three shot molding process. Alternatives are possible, for example a single shot mold could be prepared and used.

If desired, a protective sheet or panel could be provided over the media pack surface 312 and also a second protective sheet over an opposite side or surface of the media pack 201. Such panels could be formed from a variety of materials such as cardboard, plastic sheets, etc. Such panels can be secured in place by being placed against the media pack 301 when the panels 302, 303 are molded.

In a typical cartridge 300 as shown, cartridge 312 and an opposite surface of the media pack 301, is at least 50%, typically at least 70% uncovered of molded material. Some molded material is positioned thereover, in association with the housing seal 310. However, portions of the opposite molded panels 302, 303 may extend partially over the sides 312 (and opposite side). However, in general and in preferred arrangements, one pair of surfaces corresponding to surface 312 and an opposite surface, in the media pack, will be at least 50%, typically at least 70% uncovered by molded material directly molded to the media pack 301. By "directly molded to" in this context and other context herein, it is meant that the portion defined is formed in a molding operation having the identified portion of the media pack in the mold and with the resin at least partially bonded directly to the media pack. Thus, again, a preformed end piece which the media pack is secured by potting, is not an end piece directly molded to the media pack.

As explained, in some instances surfaces 312 (and the corresponding opposite surface) can be covered by a preformed piece such as a cardboard or plastic section embedded within end pieces 302, 303 and if desired partially within housing seal arrangement 310, securing the protective cover in place. Such a cover would not correspond to material "molded directly to" the media pack, in accord with the above definitions.

Cartridge 300 is particularly configured with molded panels 302, 303 having opposite ends 316, 317. These ends can be configured to engage housing pieces, when pinch seal 310 is sealed between the housing pieces. When this approach to abutting regions 316, 317 is used, the media pack is not suspended within the housing by the seal 310, rather it is also secured in place by abutment with housing pieces at regions 316, 317 to convenience. Surfaces 316, 317 can be irregular, i.e., have bumps and indents, due to mold stand-offs. This is shown at ends 316, in FIG. 9 with alternating projections 316a and indents or recesses from mold stand-offs 316b. (Similar indents along other edges of molded areas can also be from mold stand-offs.)

Herein, surfaces such as surfaces 316, 317 which form abutment (non-sealing) surfaces for support with a housing, in use, will sometimes be referred to as "axial abutment surfaces," or "compression ends" the term axial in this context referring to abutment with forces in the direction of air flow through the media pack 301, between surfaces 306, 305.

As indicated above, a "axial abutment surface" or a "compression end" may sometimes be formed with a plurality of bumps and also (if desired) a plurality of recesses (or alternatively stated projections and recesses) thereon.

A variety of materials can be utilized for the molded panels 302, 303 and seal arrangement 310. Materials such as those described in U.S. Provisional application 60/579,754, filed Jun. 14, 2004, can be used. In general such materials are polyurethanes, typically foamed polyurethanes. Although alternatives are possible polyurethanes having an as-molded density of no greater than about 30 lbs./cu.ft. (0.48 g/cc), typically no greater than about 22 lbs/cu.ft. (0.35 g/cc), and usually within the range of about 10-22 lbs./cu.ft. (0.16-0.35 g/cc), are useable. Typically materials having a hardness, Shore A, of no greater than 30, and typically no greater than 20, often within the range of 12-20, are useable. Harder materials can be used, in some applications.

Attention is directed now to FIG. 8, in which the cartridge 300 is shown in side view; the viewer seeing panel 302, the opposite side being a mirror image. Panel 303 extends completely over the media pack 301 at this end, sealing edges of the media pack 301 at this location.

In FIG. 10, a cross-sectional view of the cartridge 300 is depicted. Here it can be seen that the seal arrangement 310 is not adjacent to surface 305, and includes a contoured surface 310a with a recess on trough 310b, facing in the same direction as surface 305a, and a tapered region 310c, directed toward end 306. A housing can be appropriately configured to engage seal arrangement 310, with engagement into recess 310b, to pinch, axially, seal arrangement 310 to provide a yield to bypass flow around the cartridge, when installed. By "axial" in this context and related context, it is meant that forces are generally directed in the same direction as extension between flow faces 305, 306.

In a typical molding operation, panels 302 and 303 would be formed (separately) in the same mold arrangement, with, for example in the instance of panels 302, 303, FIG. 10, media pack sides 301a, 301b, respectively, directed down into the mold. Although alternatives are possible, for example, seal arrangement 310 could be formed with either surface 305 or surface 306 directed down into the mold. Typically seal arrangement 310 would be formed with surface 305 directed down. As a result, the entire seal arrangement 310 would be molded in a single seal operation, with the plane of the mold generally corresponding to the plane in which the rectangular seal arrangement 310 sits. Alternatives are of course possible.

Although alternatives are possible, the particular seal arrangement 310 depicted is recessed toward surface 306 from surface 305. In this instance, the recess is about 1-10 mm, although alternatives are also possible here. The recess of seal arrangement 310 toward surface 306 from surface 305, provides for regions 316 projecting beyond the seal arrangement 310, to operate as non-sealing axial abutment surfaces with housing members, leaving seal arrangement 310 available to be sealed at an axial pinch seal. This facilitates an arrangement in which the element is not suspended at the seal arrangement 310, but rather is separately secured in place in the air cleaner, during use.

It is noted that media pack 301, FIGS. 7-10, is shown with a pleat length (distance between flow faces) of about 170-175 mm, and a rectangular configuration of about 240-250 mm by about 165-175 mm. Alternate sizes can be used. In addition, an arrangement in which the projecting portion of the gasket 10 is about 9.5 mm wide and about 12.7 mm thick shown, with a tapered extension 310 to be about 25.4 mm long. Alternatives can be used.

IV. An Alternate Arrangement, FIGS. 11-19

An alternate cartridge 400 is depicted in FIG. 11. The cartridge 400 comprises a blocked stacked (rectangular) media pack 401 having opposite flow faces 402, 403. The arrangement has side panels 405, 406, molded to the media pack 401 to seal opposite side edges of the z-filter media pack. The cartridge includes a seal gasket 408 adjacent surface 402. The gasket 408 has four side extensions 409, 410, 411 and 412.

The cartridge 400 can be used with air flow from surface 402 toward surface 403, or surface 403 toward surface 402. The direction is a matter of choice, depending on the air cleaner involved. In a typical arrangement, the filter cartridge 400 will be mounted such that the air flow is from surface 403 to surface 402, as indicated in the description below.

Side panels 405, 406 can be made similarly to the side panels 302, 303, FIG. 7. For a particular embodiment shown, cartridge 400 has been configured to be optionally used in a cassette described below, which would then be inserted into air cleaner housing for use.

FIG. 12 is a top view of cartridge 400. FIG. 13 is a cross-sectional view along line A-A, FIG. 13. FIG. 14 is a cross-sectional view along line B-B, FIG. 12.

In order to prepare cartridge 400, media pack 401 can be inserted into a mold arrangement to form panels 405, 406, a separate molding operation being used for each. This molding can be used to simultaneously form gasket sections 412, 410 respectively. Then section 409 could be formed by putting side 420, FIG. 14, in the mold; and gasket section 411 could be formed by putting side 421, FIG. 14, into the mold. A dovetail type connection (or tongue and groove) could be used at the corners of the gasket 408. Thus, cartridge 400 could be prepared in a four shot mold process, as opposed to a three shot mold process as used for the arrangement of cartridge 300, FIG. 10. However, a three-shot approach could be used, as could a single shot approach.

If a four shot mold process as described above is used, the gasket 408 does not result from a molding in a single plane in which the rectangular gasket 408 sits. Rather, each of the four sections is molded separately, generally with the mold being in the same plane as a side of the cartridge 400 along which the section of gasket 408 extends. This can be used to create different shapes and extensions in any one or more of the gasket sections, if desired. Cover panels (cardboard, plastic, etc.) could be put over sides 420, 421, if desired, before molding.

In FIG. 11 at 430, indents from mold stand-offs are shown.

Attention is now directed to FIGS. 15-18, which show a preformed plastic (in this instance generally rectangular) cassette 500 into which cartridge 400 could be positioned for use, for eventual installation into a filter arrangement. Referring to FIG. 16, cassette 500 includes open end 501 and opposite end 502 having grid 503, FIG. 15, extending there across. The cartridge 400 would be inserted into cassette interior 505, FIG. 17, through end 501, with surface 402 positioned to align with end 501. This would rest gasket 408 against gasket sealing surface (pressure flange) 506. Edges 405a and 406a, FIG. 13, of cartridge 400 could be configured to engage cassette grid 503, as abutment surfaces, to support the cartridge position. The side walls of the cassette 500 can be provided with a slight inward taper toward end 502.

The cassette 500 is depicted in perspective, in FIG. 18.

Space between the cassette 500 and a housing wall can be used for sound attenuation. Installation would involve compressing the gasket 408 between surface 506 and a portion of a housing, in use. A schematic of one possibility is shown in FIG. 19, in which cassette 600, cartridge 601, comprising media pack 602 (with flow faces 604 and 605), seal arrangement 603 and housing pieces 610, 611 are assembled to form a seal. Gap 612 allows for some sound attenuation control. In FIG. 19, the gasket 603 is surrounded by cassette housing rim 610 and cassette rim 611, and is biased into sealing against surface 615 by cassette pressure flange 617 and housing pressure flange 618.

It is noted that the media pack for cartridge 400 is shown with a flute length (distance between flow faces) of about 175 mm, and a media pack outer perimeter of about 165 mm by about 239.4 mm. Alternatives can be used. It is also noted that a gasket width of about 22-29 mm is shown, although alternatives can be used; by width in this context it is meant distance of extension outwardly from the media pack.

V. Systems of Use, FIGS. 20-22

In FIG. 20, a system for use of an air cleaner according to the present disclosure is shown. Referring to FIG. 20, a pick-up truck 700 is depicted, comprising wheel base 701, bed 702, driver/passenger cab 703 and engine compartment 704 covered by hood 705. An air cleaner system would be positioned for example under the hood 705 within the engine compartment 704. Pick-up truck 700 is meant to be a representative example of a variety of vehicles, and no specific make, model or year is intended.

Figure 21:
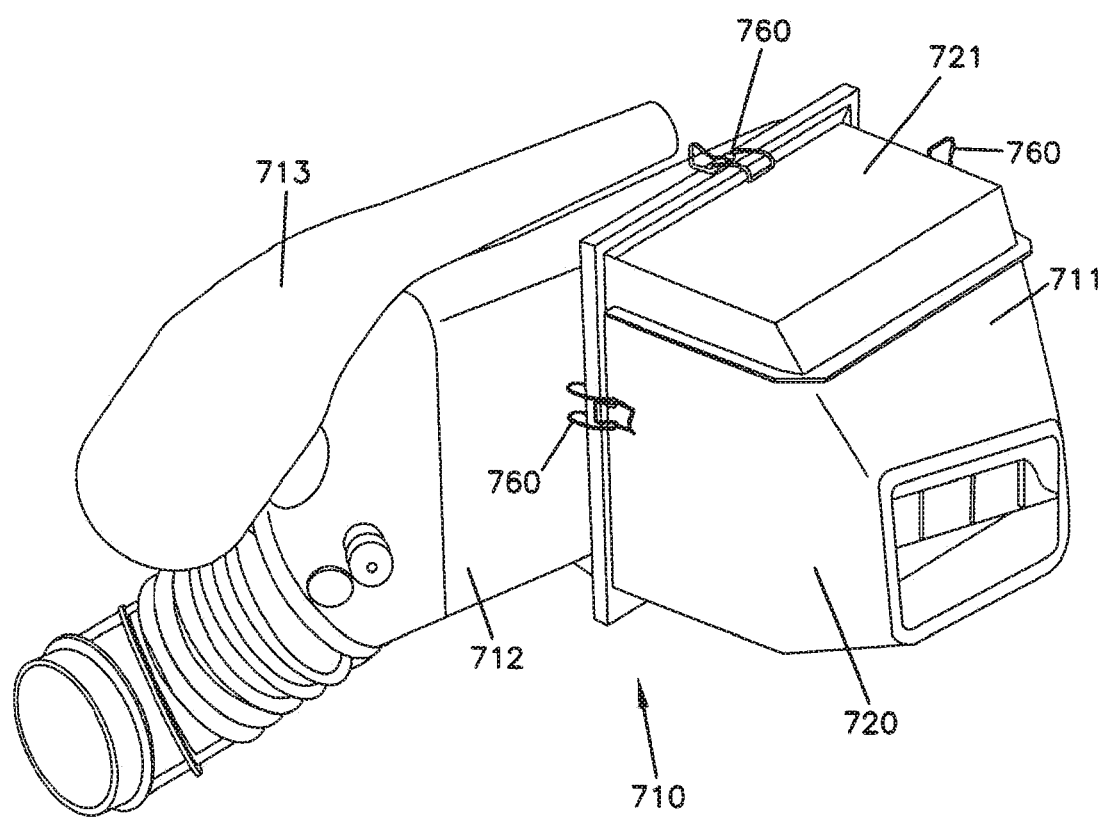
FIG. 21 is a perspective view of an air cleaner system useable with a pick-up truck.

Referring to FIG. 21, air cleaner system 710, positionable, for example, under hood 705, is depicted comprising air cleaner housing 711, down stream air plenum 712 and resonator 713.

Figure 22:
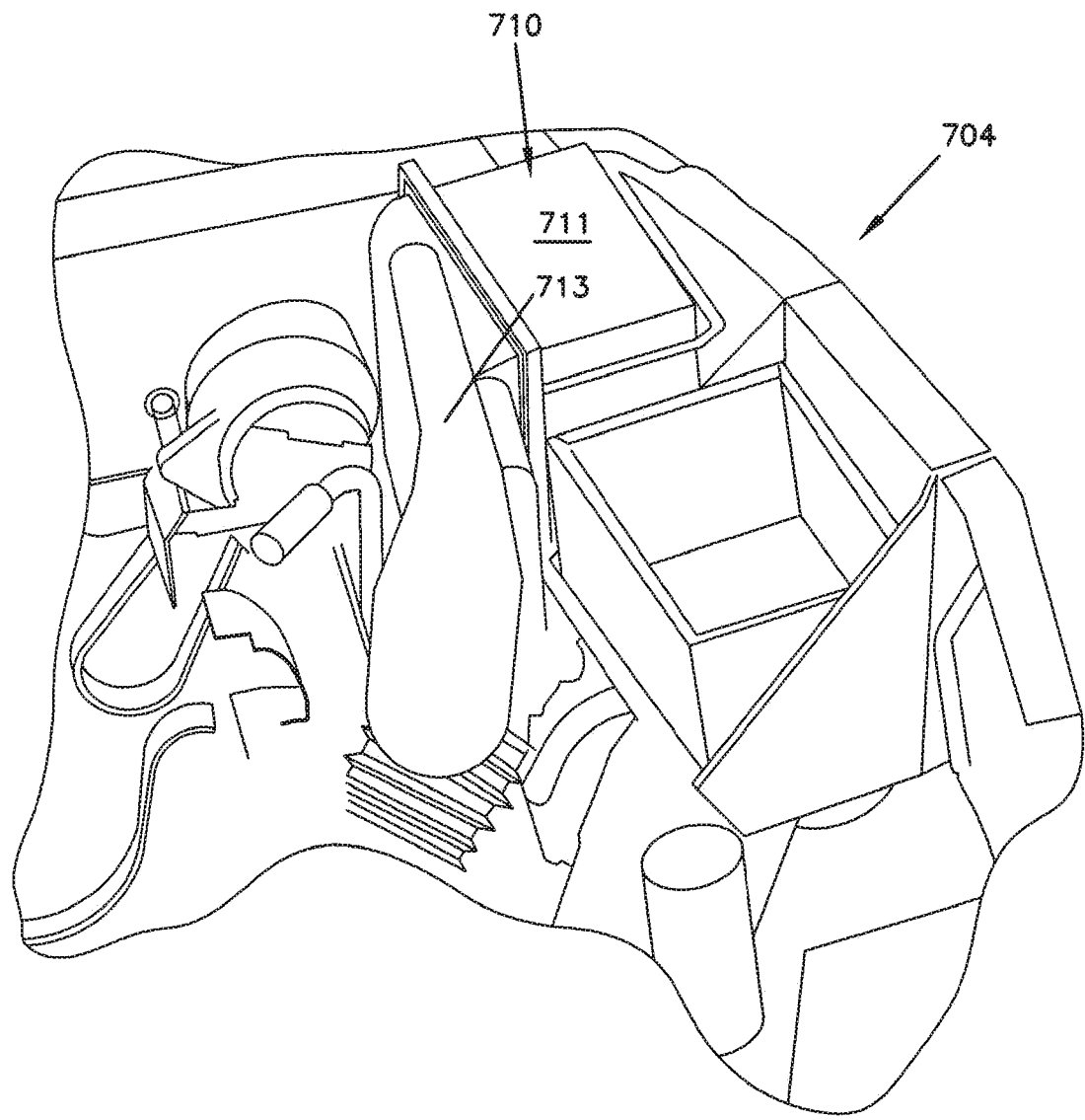
FIG. 22 is a schematic perspective view of a portion of the engine compartment under the hood of a pick-up truck with an air cleaner system according to FIG. 21 positioned therein.

Attention is now directed to FIG. 22 in which the interior of the engine compartment 704 is viewable schematically. Air cleaner system 710 can be viewed as positioned where appropriate.

Figure 23:
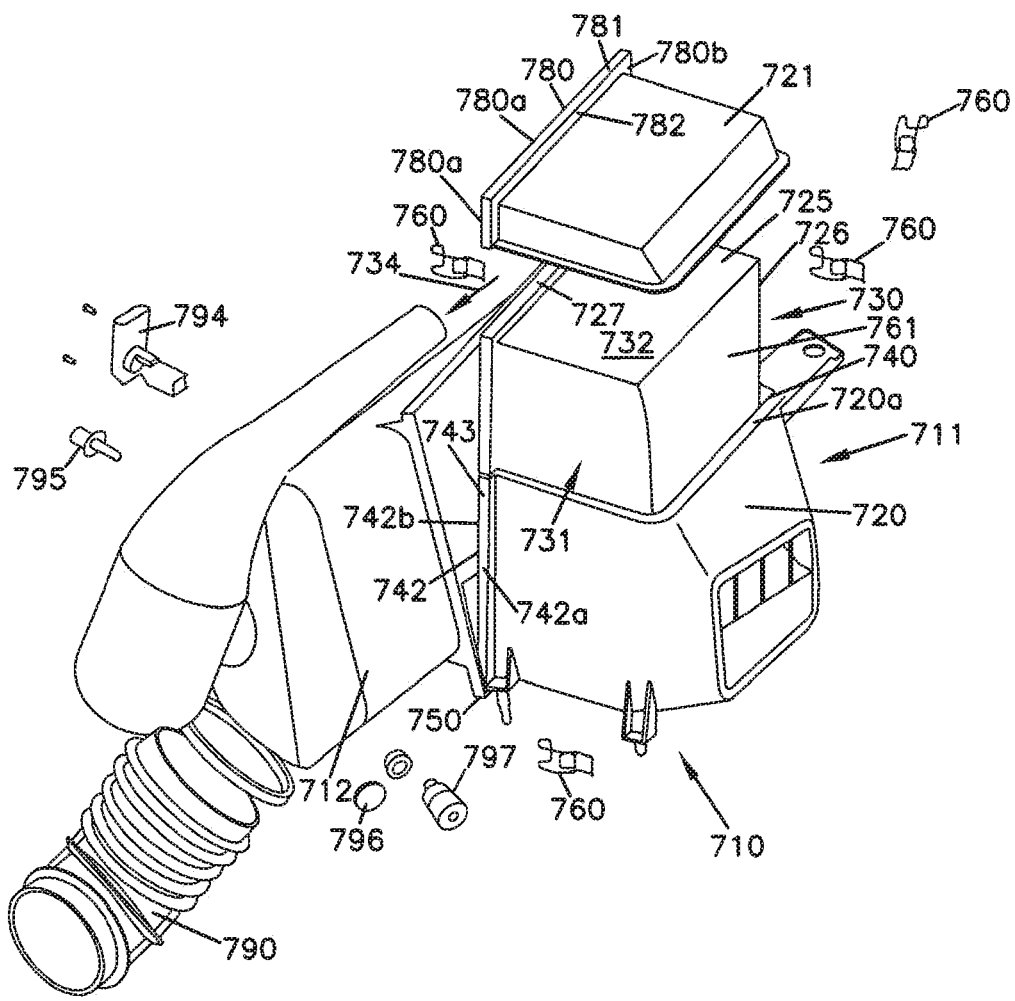
FIG. 23 is an exploded perspective view of the air cleaner system of FIG. 21 shown during a step of filter cartridge insertion or removal.

Attention is now directed to FIG. 23, in which the air cleaner system 710 is shown in exploded view.

The air cleaner housing 711 generally comprises bottom, base or body 720 and removable access cover 721. An air cleaner cartridge 725 (in this instance rectangular) is shown, comprising media pack 726 (in this instance rectangular) and gasket arrangement 727. The cartridge 726 may be generally as described above. The particular variation shown, is with gasket 727 aligned with a flow face of the media pack 726, in this instance an outlet flow face. Alternate shapes can be used.

Such a cartridge 725 would typically be formed with molded side panels at opposite sides 730, 731. At the top 732 and an opposite bottom, not shown, moldings could be used, or separate pieces such as plastic sheets or cardboard could be placed. Alternatively, the media pack 726 could be exposed to these locations depending on the system and system requirements.

The air cleaner base 720 defines an interior 740. In use, the cartridge 725 is slid into the interior 740, from a top 720a or vertical location, with gasket 727 slid into receiver 742. This would typically be done with the outlet air plenum 712 previously pivoted away from surface 743 in the direction of arrow 734. Pivoting could be accomplished by having pins, not shown, in a lower portion 750 of outlet plenum 712, which engage a portion of housing base 720. After the cartridge 725 is fully slid into position, outlet plenum 712 can be pivoted against surface 743, in an opposite direction to arrow 734, and cover 721 can be put in place with various clamps 760 or latches can be used, to ensure sufficient axial force against gasket 727 to ensure seal. The system 711 is shown closed, in this manner, in FIG. 21. The plenum 712 can be provided with a support grid positioned to extend across an outlet flow face of cartridge 725, if desired.

Still referring to FIG. 23, receiver 742, into which gasket 727 is slid, during operation, is a three-sided channel comprising pressure flange 742a and outer rim 742b. The outer rim 742b extends along an outer periphery of the gasket 727. The pressure surface 742a will provide pressure to a side of gasket arrangement 727 which is facing toward cartridge inlet flow surface 761.

The reference to a "three-sided channel" was meant to indicate that region 742 shown (although alternatives are possible) generally comprises a u-shaped channel, having two opposite side extensions and one base extension, in this instance each side extension extending at an angle of about 90° to the base extension, and each of the extensions being straight.

Similarly, access cover 721 includes a three-sided channel 780 thereon, comprising a top member 780a and opposite side members 780b and 780c, again forming a u-shape, in this instance an inverted u-shape, with the side extensions 780a, 780b, each extending a right angle to the top extensions of 780a. Again, channel 780 comprises an outer rim 781 and a pressure flange 782.

Referring to FIG. 23, tube 790 is shown positioned for delivering filtered air into an engine intake or similar construction.

It is noted that with an air cleaner system such as system 710, a cassette such as cassette 600, FIG. 19, or cassette 500, FIG. 18, can be used around cartridge 725, to facilitate assembly.

It is noted that attached to the outlet plenum 712 is a resonator 713 having a generally club shape with large end 770, narrow end 771 and elbow 772 therebetween. The resonator 713 will be referred to herein as a "club shaped resonator" secured to the outlet plenum 712 to provide for acoustic attenuation.

Still referring to FIG. 22, additional equipment to be attached to this system are shown including: MAFS (Mass Sensor) 794, TMAP or pressure tap 795, PVC port 796 and service indicator 797.

Filter cartridges according to the present disclosure can be made in a variety of sizes. One that would be convenient for the pick-up truck 700 of FIG. 20, would be a rectangular filter cartridge is about 150 mm (140-160 mm) deep, is about 254 mm (about 250-260 mm) high when installed, and about 220 mm (210-230 mm) wide, when installed. Again, a variety of sizes or shapes could be used, depending on the application.

VI. Example Air Cleaners, FIGS. 24-58

A. A First Example Air Cleaner, FIGS. 24-49.

Figure 24:
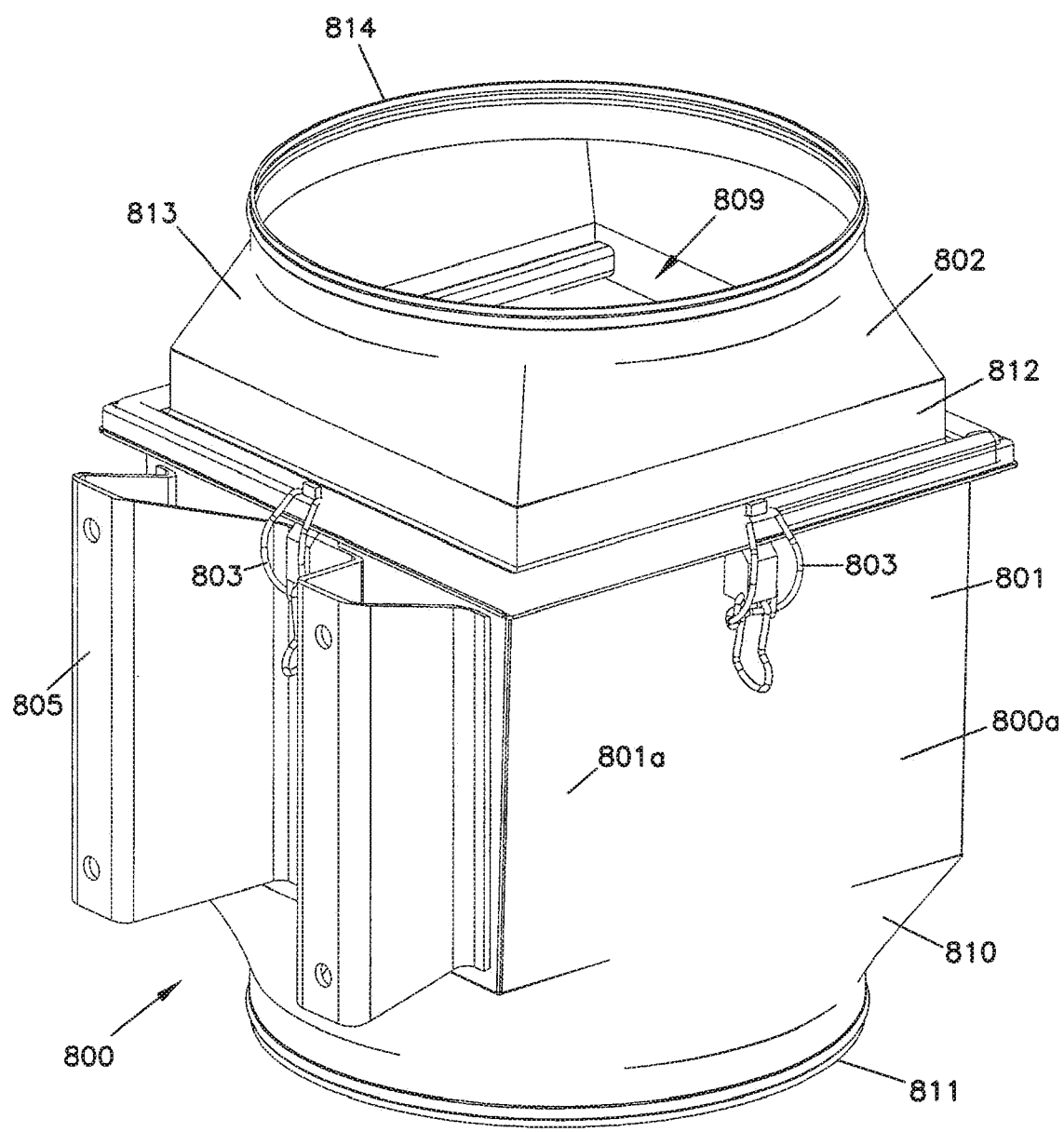
FIG. 24 is a perspective view of an air cleaner arrangement utilizing principles according to the present disclosure.

Reference numeral 800, FIG. 24, depicts an example air cleaner including features, and applying selected principles, according to the present disclosure. The air cleaner 800 comprises a housing 800a that includes a filter cartridge receiving body or air cleaner body or base, 801 and a cover or access cover 802. The cover 802 is secured to the body 801 by latches 803, in this instance over center wire latches, although alternate arrangements to secure could be used.

The air cleaner 800 includes a mounting arrangement 805 thereon, for mounting to a framework or other portions of a vehicle or other equipment for use.

Service access to an interior 809, of the air cleaner 800, is accomplished by releasing latches 803, and separating cover 802 from body 801.

In the particular examples shown, the body 801 has a portion 801a of generally regular parallelogram shape, in this instance a square or rectangular cross-section, with an end section 810 tapering to a circular air flow aperture 811. In this instance air flow aperture 811 is an outlet aperture, although in some configurations it configured as an inlet aperture.

Analogously, cover 802, has a portion of regular parallelogram cross-sectional shape, in this instance square or rectangular, at region 812, where it encounters body 801. Cover 812 then tapers in region 813, to a circular air flow aperture 814. In this instance, aperture 814 is an inlet aperture, although alternatives are possible.

Although alternatives are possible, in normal use air flow would be through inlet 814, through an internally received filter cartridge described further below, and outwardly through outlet 811.

Figure 25:
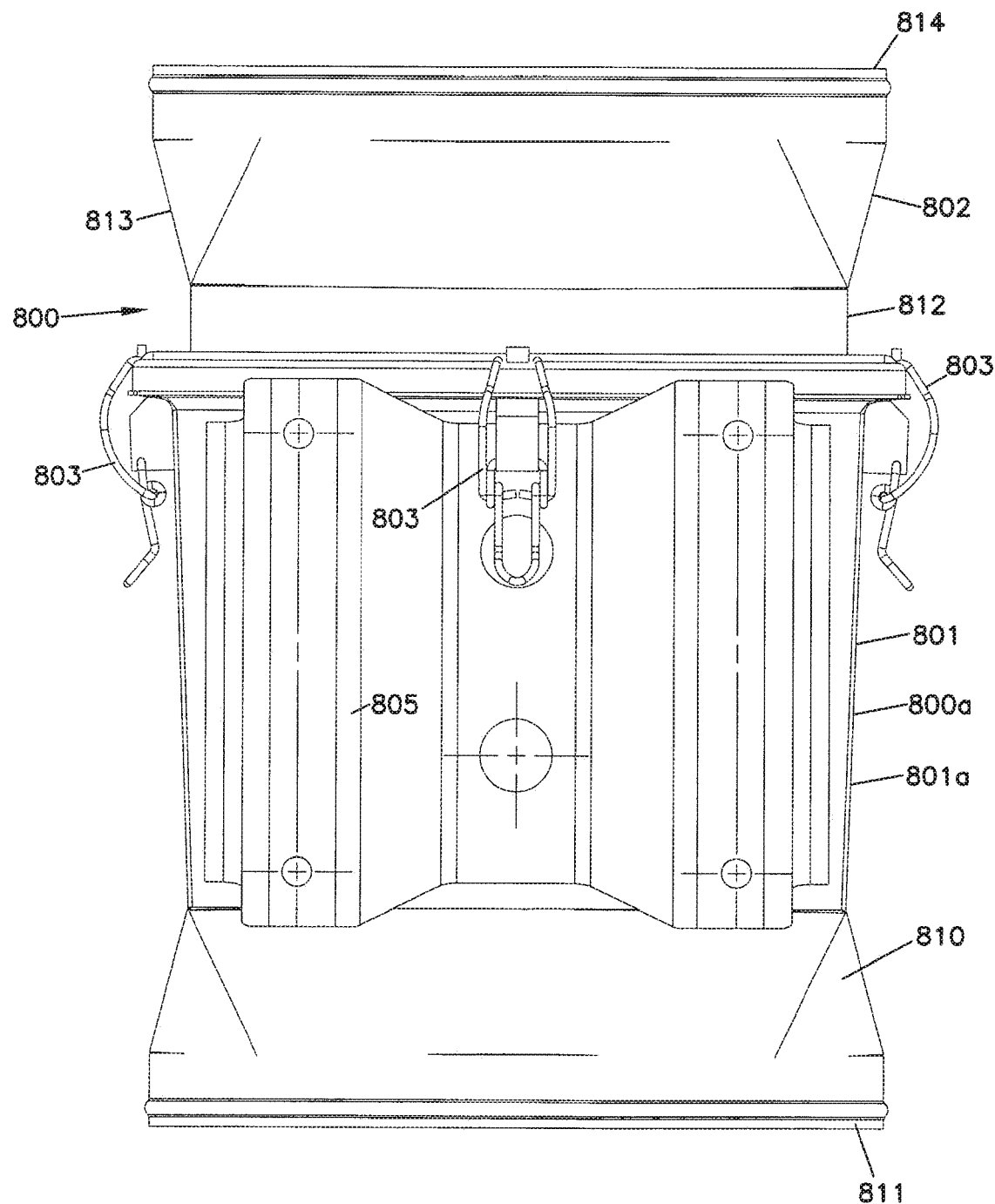
FIG. 25 is a side elevational view of the air cleaner arrangement of FIG. 24.

In FIG. 25, a side elevational view of air cleaner 800 is depicted.

Figure 26:
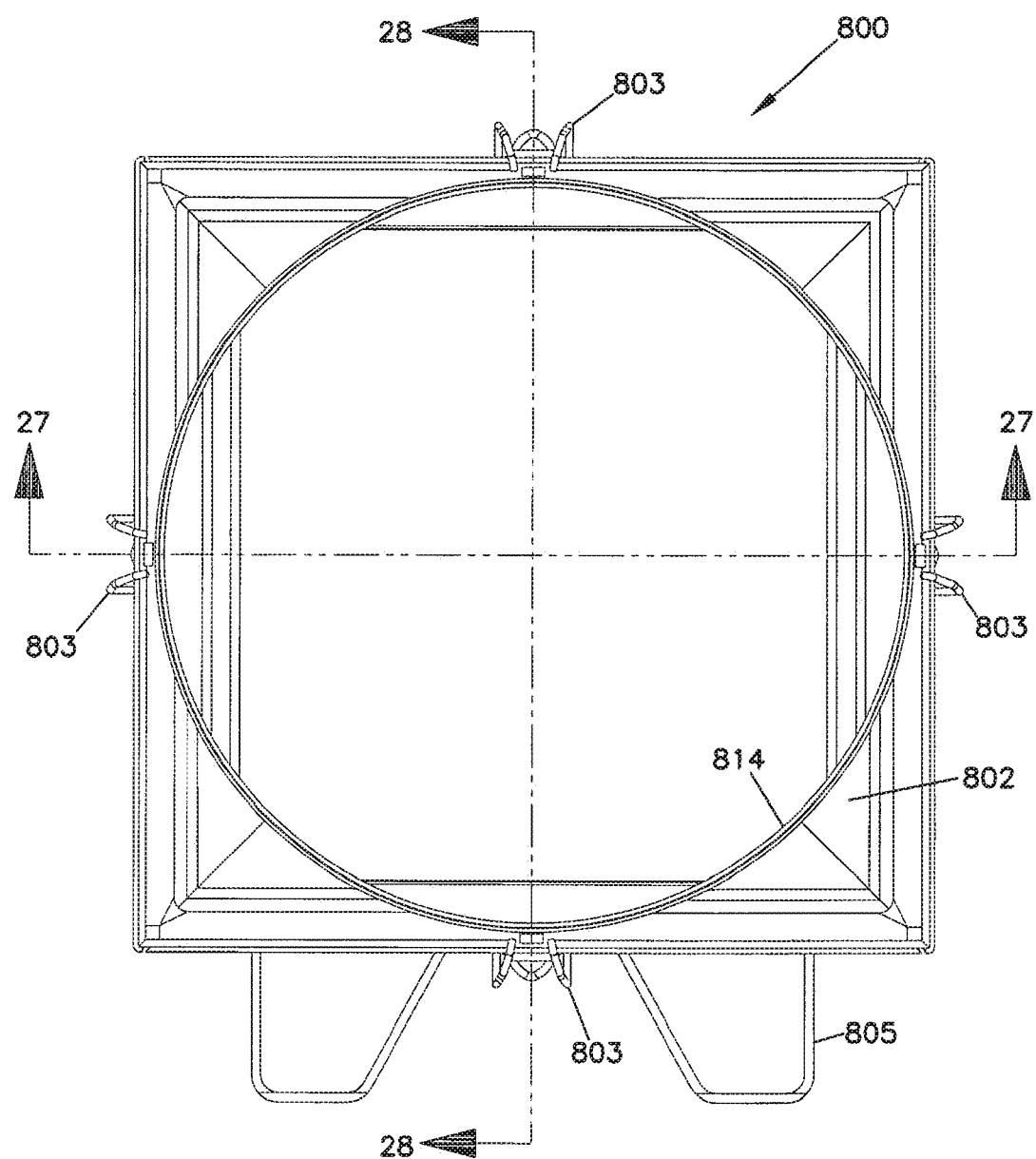
FIG. 26 is a top plan view of the air cleaner arrangement of FIGS. 24 and 25.

In FIG. 26 a top plan view of air cleaner 800 is depicted.

Figure 27:
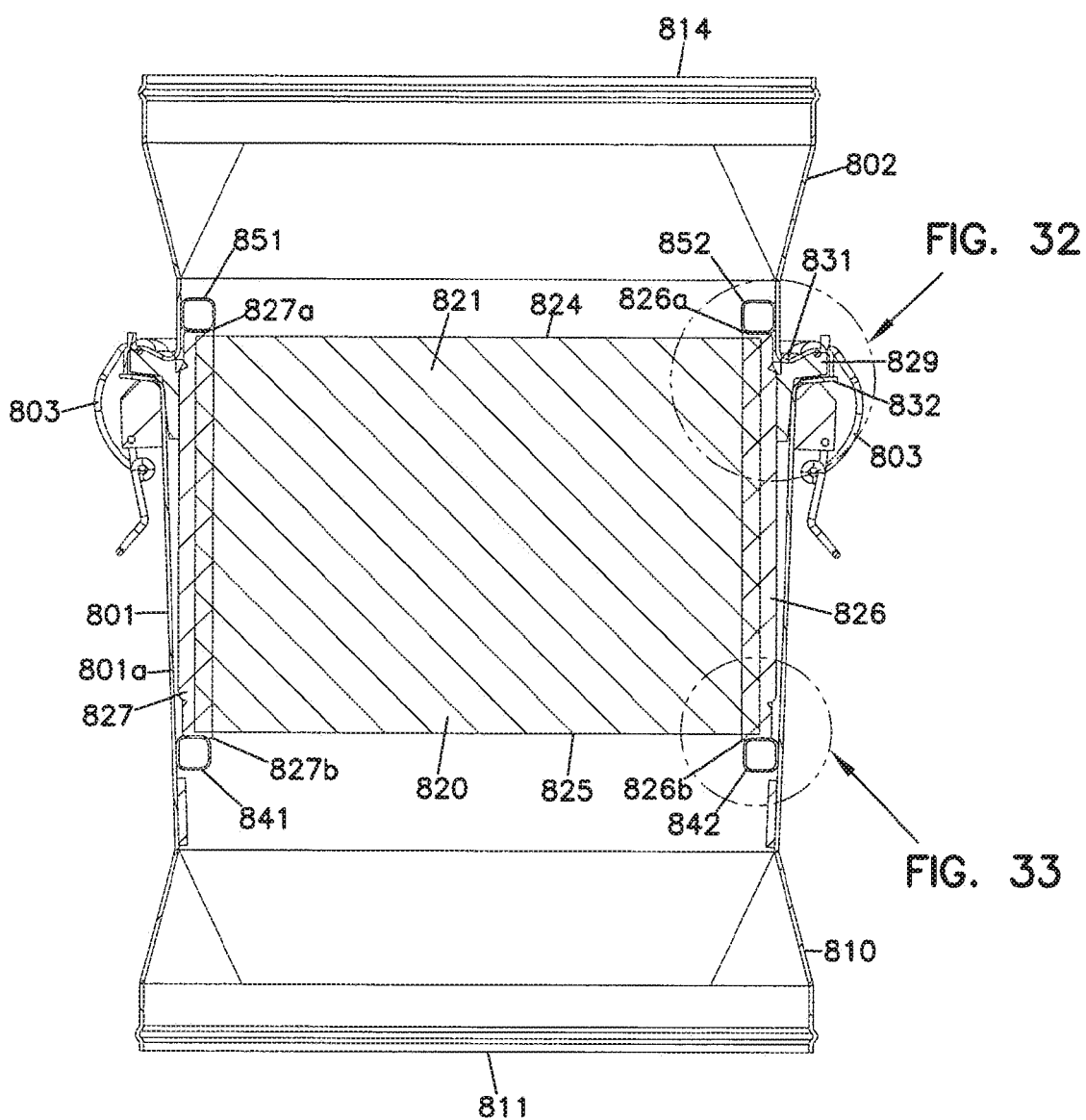
FIG. 27 is a cross-sectional view taken along line 27-27, FIG. 26.

FIG. 27, is a cross-sectional view taken along line 27-27, FIG. 26. In FIG. 27, internally received cartridge 820, can be seen. Cartridge 820 is a filter cartridge comprising a media pack 821 positioned in a flow path of air from inlet 814 to outlet 811. The media pack 821 preferably comprises a stacked z-filter media arrangement, as described herein above. The media pack 821 includes a first (in this instance inlet) flow face 824 and a second, opposite (in this instance outlet) flow face 825, with filtering flow, during use, extending therebetween.

The filter cartridge 820 is described in further detail below in connection with other figures. Referring to FIG. 27, it can be seen that filter cartridge 820 includes opposite molded side panels 826, 827 along two opposite sides of the media pack 821. Such panels are described, for example, above in connection with FIGS. 5-10 at 300.

Still referring to FIG. 27, the filter cartridge 820 includes a gasket or seal member 829, pinched between seal flange 831 on the cover 802 and seal flange 832 on the body 801, to form an axial pinch seal. Sealing pressure is maintained by the clamps 803. In the embodiment shown, seal member 825 is molded in the cartridge 820.

Figure 28:
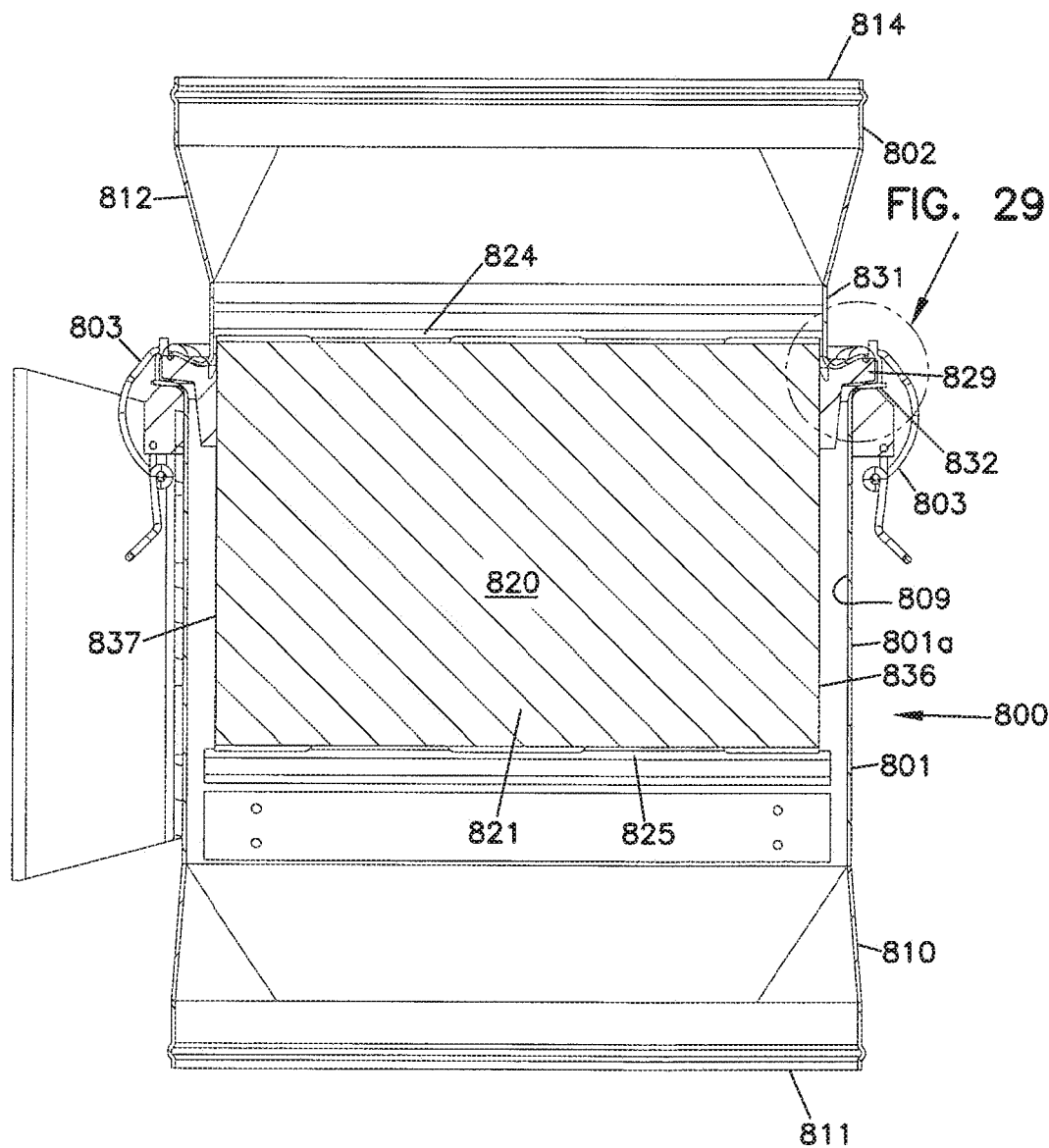
FIG. 28 is a cross-sectional view taken along line 28-28, FIG. 26.

Attention is now directed to FIG. 28, which shows a cross-sectional view of air cleaner 800 taken along line 28-28, FIG. 26. Here filter cartridge 820 is also viewable within interior 809. It can be seen that the opposite sides 836, 837 of the media pack 821 viewable in this cross-section, do not include molded panels thereon. This is analogous to what was described hereinabove, in connection with the filter cartridge of FIGS. 8-10. Of course sides 836, 387 could be provided with molded protective panels if desired, or protective panels such as preformed cardboard panels or plastic panels, secured to the cartridge, as described above.

Figure 29:
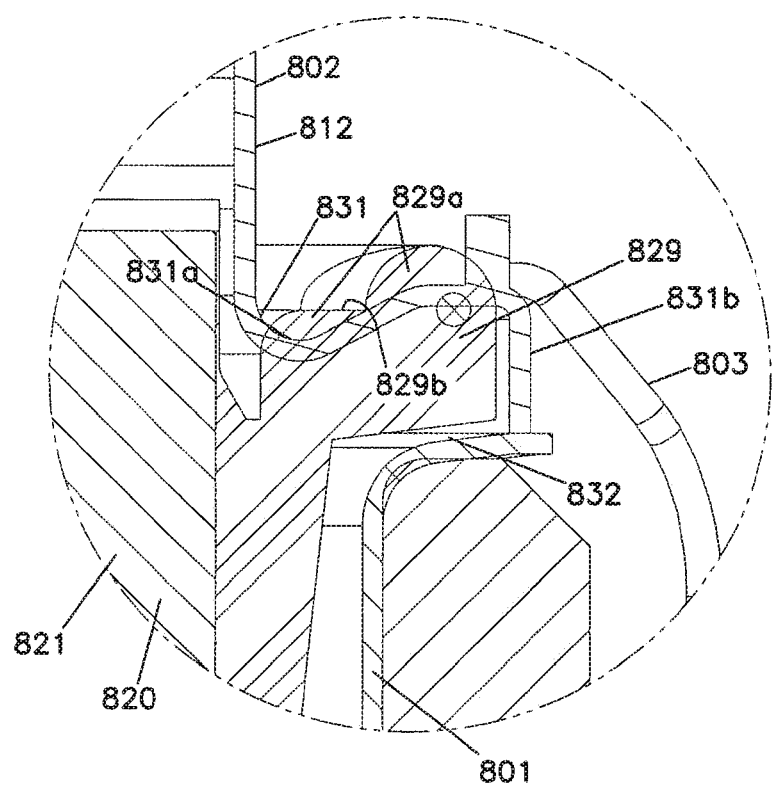
FIG. 29 is an enlarged fragmentary view of a portion of FIG. 28.

FIG. 29 is an enlarged view of a portion of FIG. 28. Seal member 829 can be seen pinched between seal flange 831 and seal flange 832 as discussed above. Regions 829a, of seal member 829 would actually be distorted (compressed) during sealing, and in FIG. 29 they are shown with an outer perimeter before distortion, to facilitate an understanding of what compression occurs during sealing.

It is noted that seal region 829 includes a trough 829b therein, and flange 831 includes a projection 831a, sized to project into trough 829b, with interference to facilitate sealing and securing of the cartridge 820 in place. Flange 831 includes annular projection 831b which surrounds gasket 829, and bottoms out against flange 832, although alternatives are possible.

Figure 30:
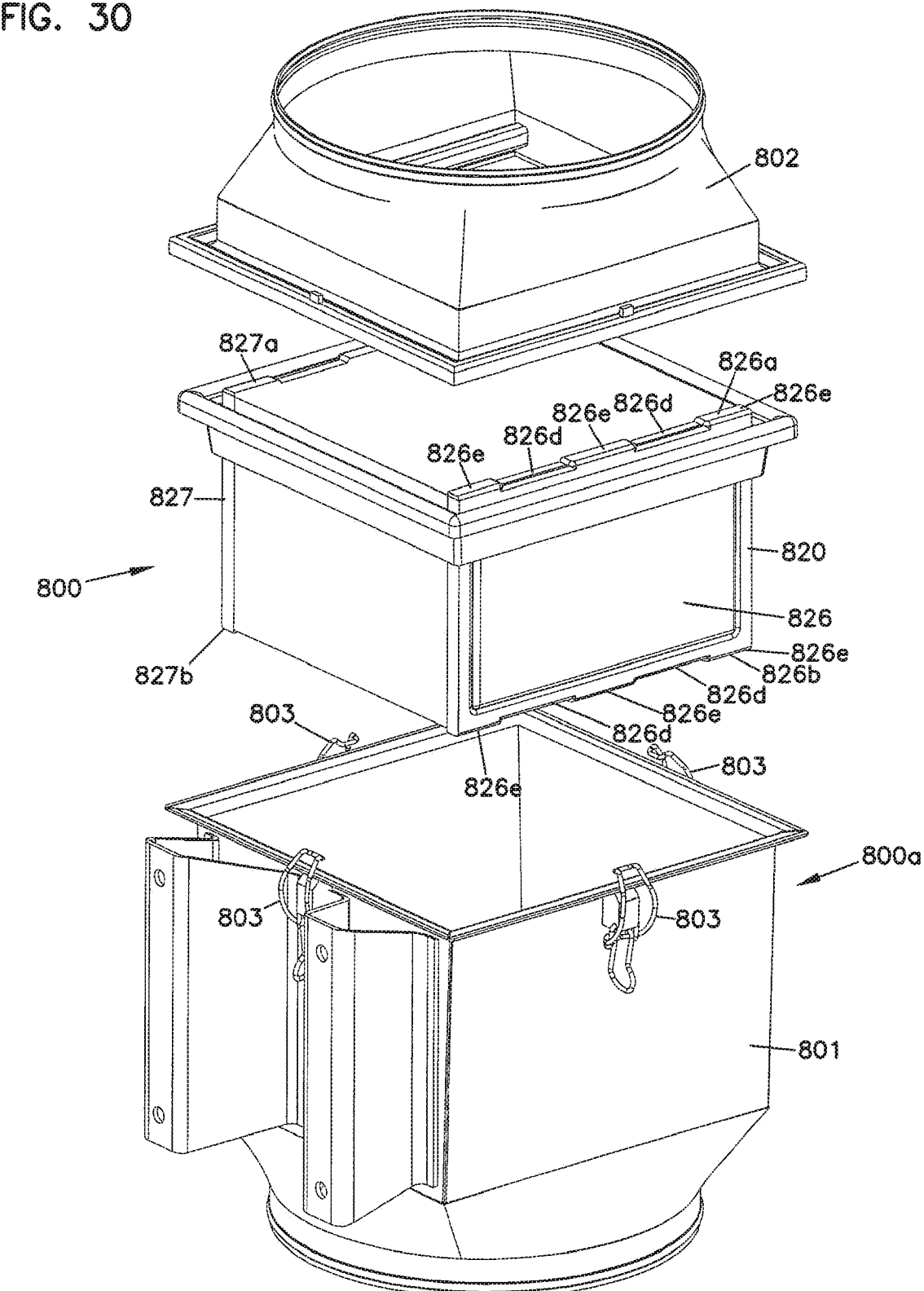
FIG. 30 is an exploded perspective view of an air cleaner of FIG. 24.

Attention is now directed to FIG. 30, which shows air cleaner 800 in exploded perspective view. In FIG. 30, it can be seen how cover 802 can be removed from body 801, to allow service access to cartridge 820.

Referring to FIG. 30, molded panel 826 can be viewed. The panel 826 comprises opposite edges 826a, 826b, each comprising alternating recesses 826d and bumps or projections 826e. This is similar to what was described previously in connection with cartridge 300 of FIGS. 8-10. Opposite panel 827 is similarly configured, at opposite edges 827a and 827b.

Edges 826a and 826b (and 827a, 827b), are used to support the filter cartridge 820 in position, within the housing 800a.

Figure 31:
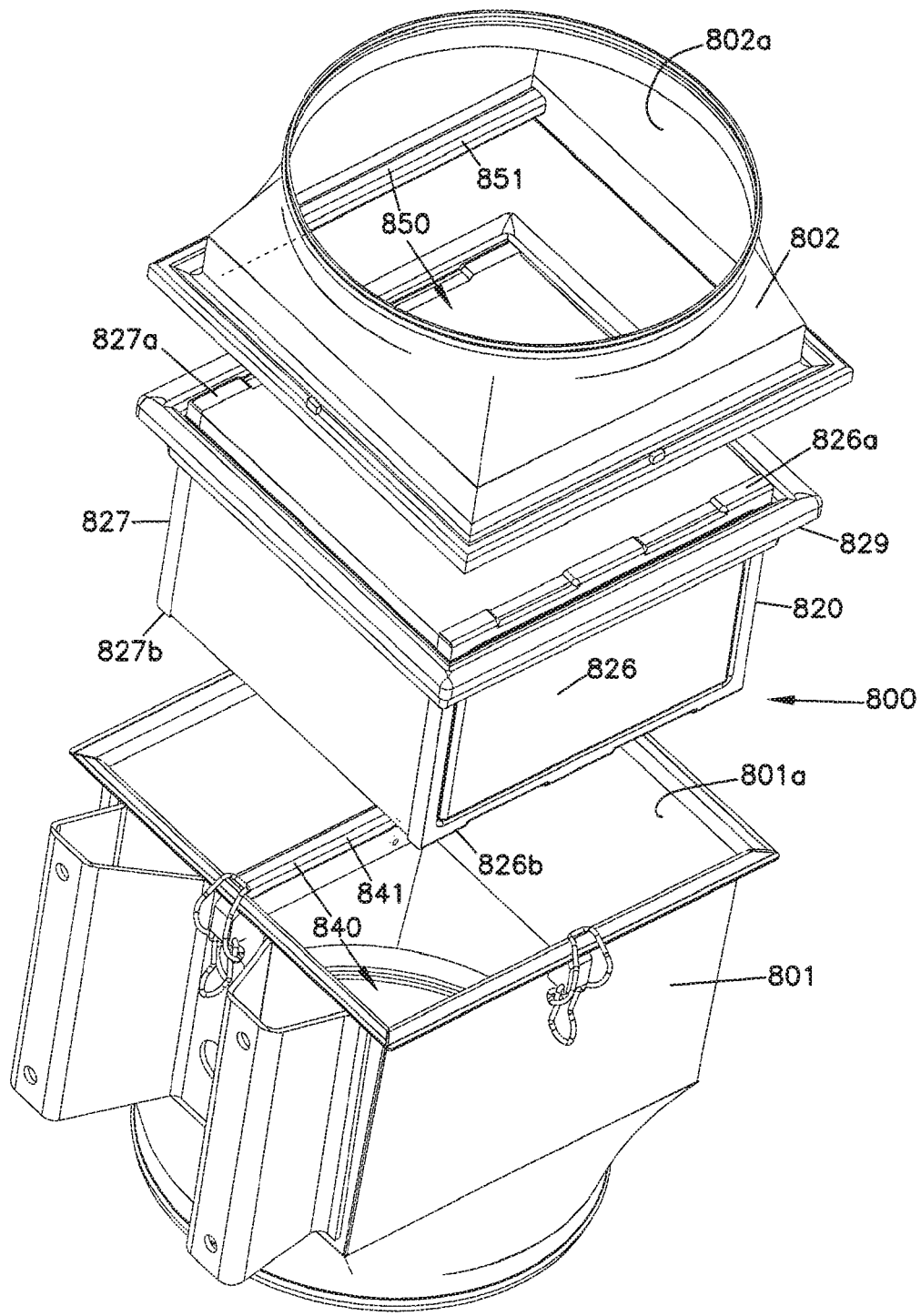
FIG. 31 is an alternate exploded perspective view of the air cleaner of FIG. 24.

FIG. 31 is an alternate perspective view of air cleaner 800, again depicting body 801, cover 802 and cartridge 820. Within interior 801a of body 801 is viewable a stop arrangement 840. The stop arrangement 840 is positioned to be engaged by edge 826b of panel 826 and edge 827b of panel 827, when cartridge 820 is inserted. Stop arrangement 840 comprises opposite sides 841 and 842, only side 841 being viewable in FIG. 31. Sides 841 and 842 are both viewable in the cross-section of FIG. 27.

Referring again to FIG. 31, cover 802 includes an interior 802a, and stop arrangement 850 therein. The stop arrangement 850 comprises two stops 851, 852, only stop 851 being viewable in FIG. 31. Both stops 851 and 852 are viewable in the cross-section of FIG. 27.

Stops 851, 852 are positioned, respectively, to engage edges 827a, 826a of cartridge 820, during assembly.

As a result, the housing 800a, is configured with cover 802 and 801 sized and positioned to pinch the side molds 826, 827 axially, during assembly. This will support the media pack weight between the stop arrangements 840, 850, so that the weight of the media pack is not suspended by the gasket arrangement 829, during use.

Figure 32:
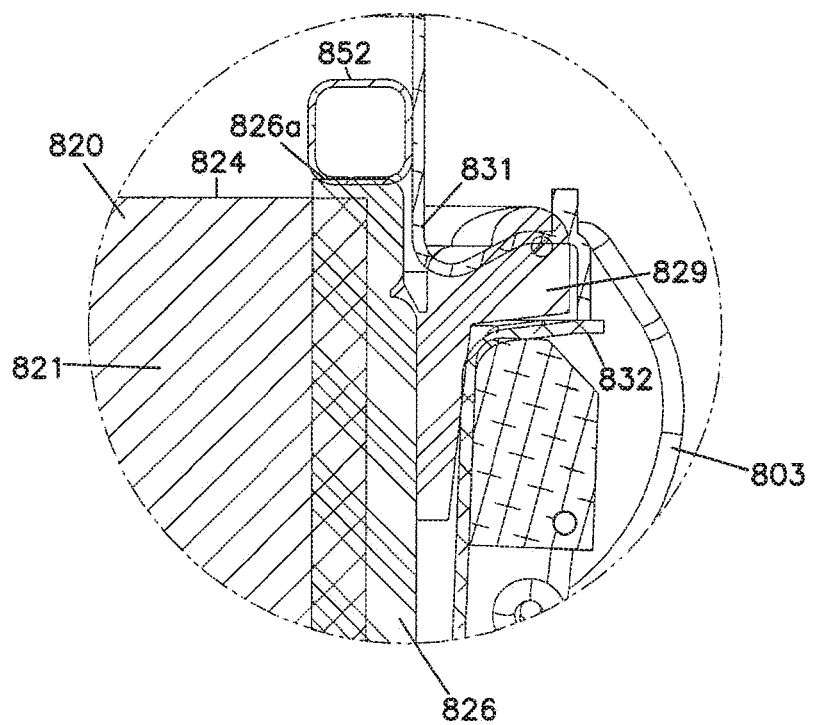
FIG. 32 is an enlarged fragmentary view of a portion of FIG. 27.
Figure 33:
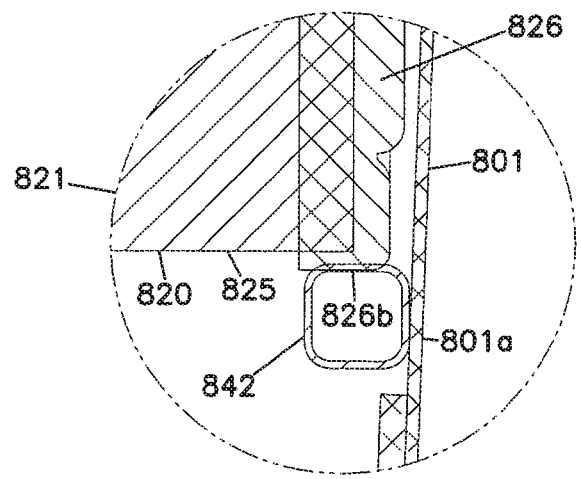
FIG. 33 is an enlarged fragmentary view of a portion of FIG. 27.

In FIG. 32, engagement between stop 852 and molding edge 826a is shown. In FIG. 33 engagement between stop 842 and mold edge 826b is shown. The opposite side involving molding 827 would be a mirror image of FIGS. 32 and 33.

Referring to FIG. 31, it is noted that there is no grid shown extending across interior 801a, at a bottom end or lower end surface 825 of cartridge 820, when assembled. Also, there is no grid across cover 802. A grid or other med pack support construction could be positioned at either end, if desired.

Figure 34:
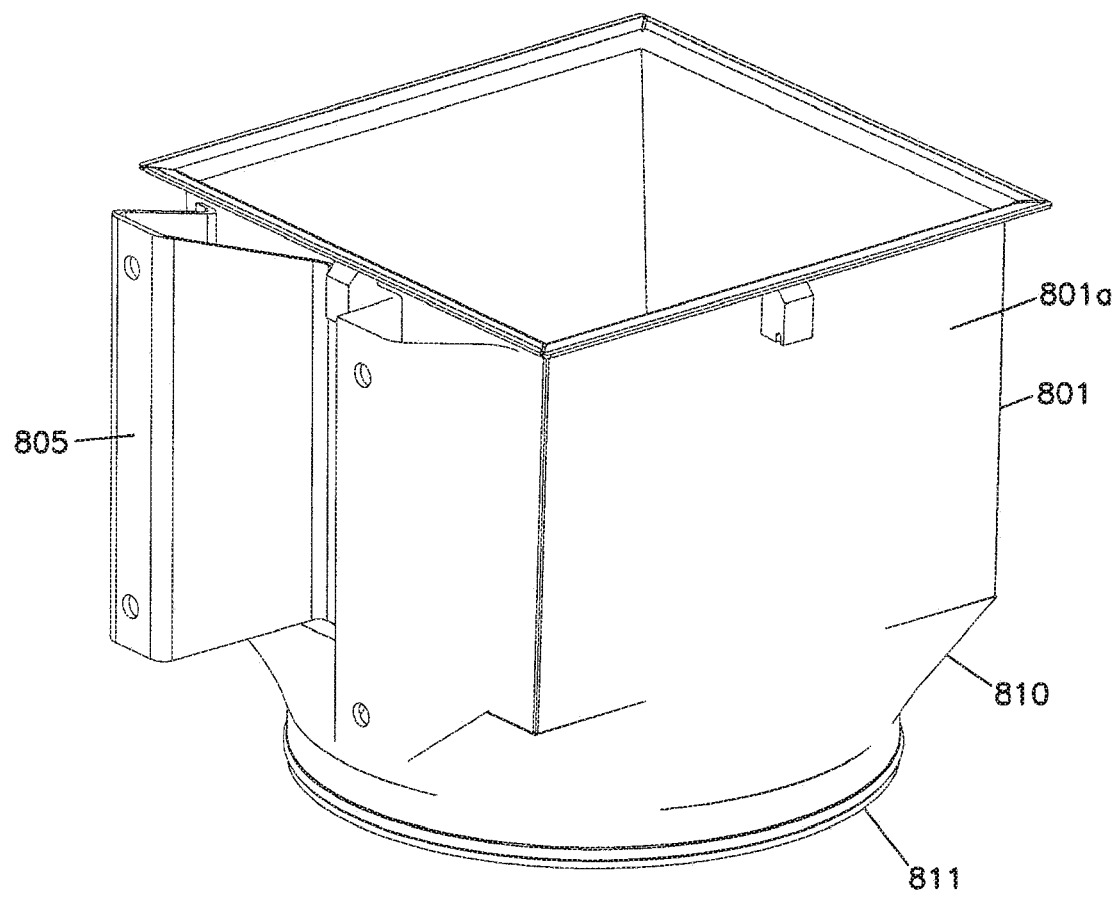
FIG. 34 is a perspective view of a body component of the air cleaner of FIG. 24.
Figure 35:
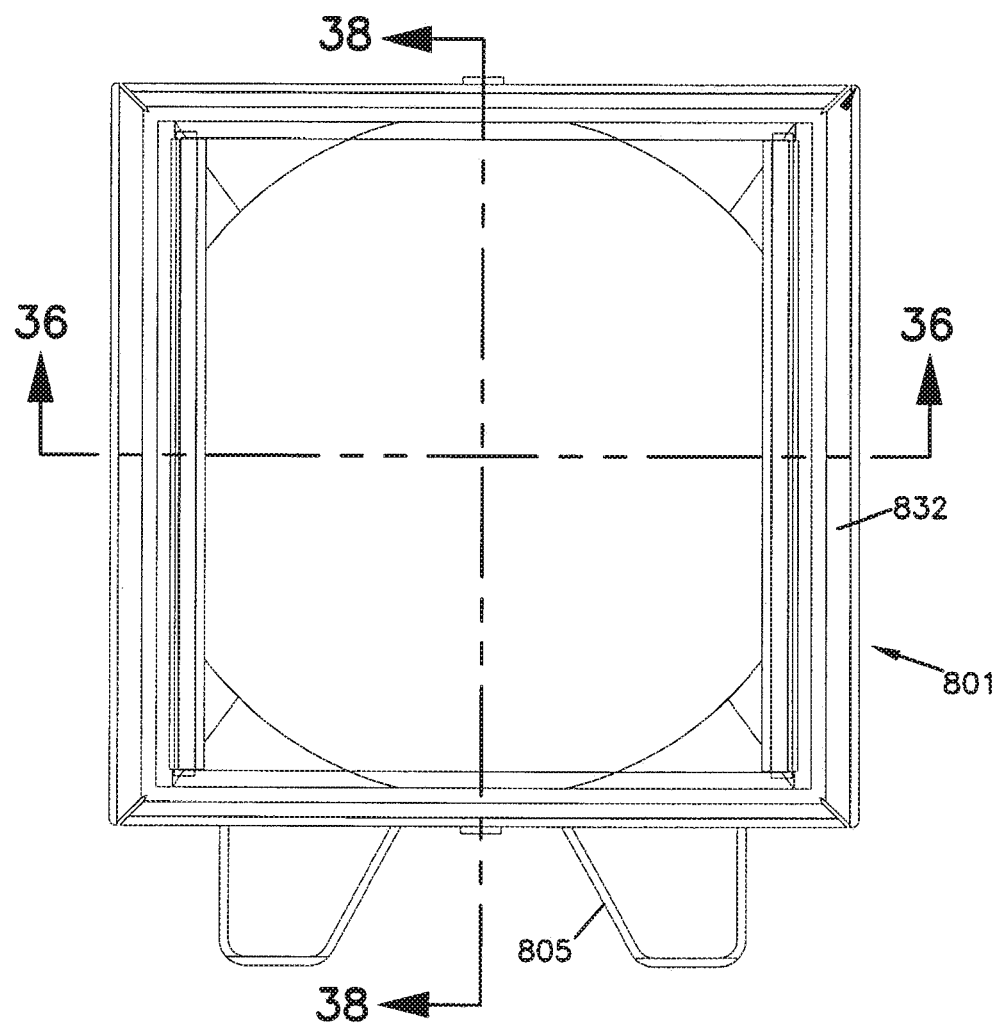
FIG. 35 is a top view of the component of FIG. 34.
Figure 36:
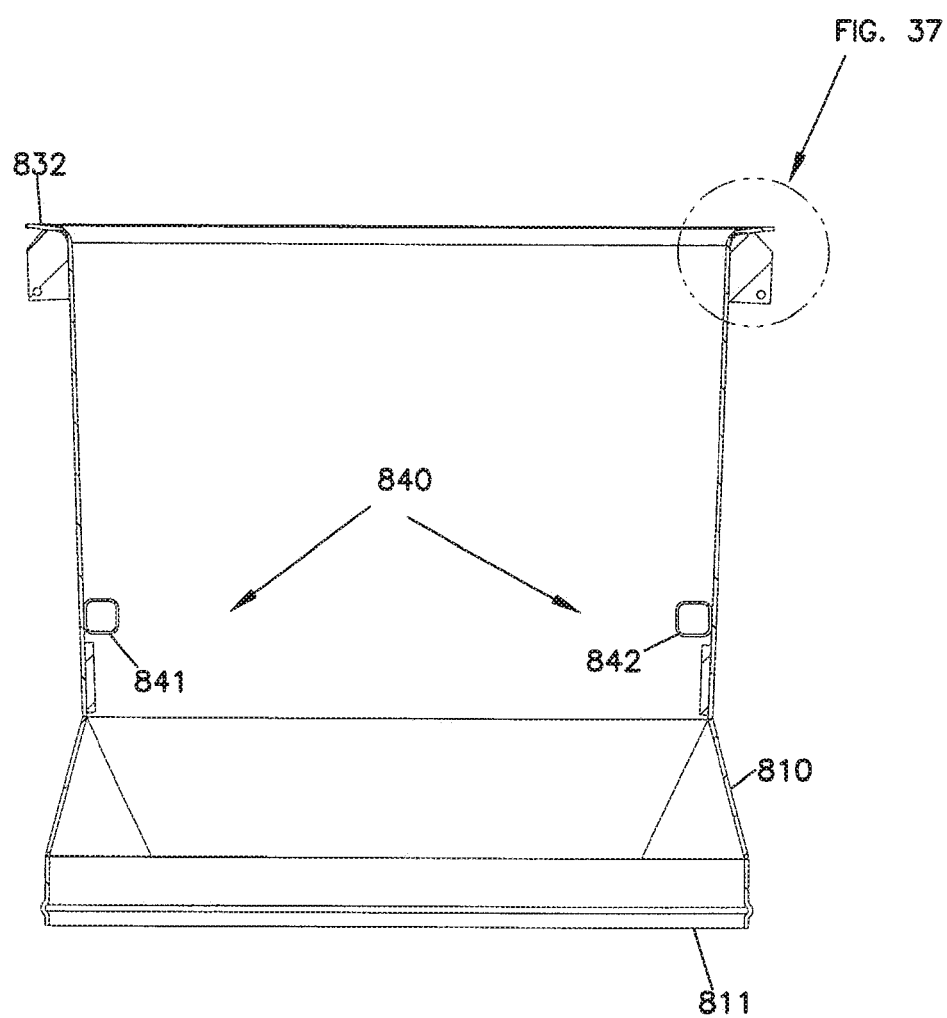
FIG. 36 is a cross-sectional view taken along line 36-36, FIG. 35.

In FIG. 34, housing body member or base 801 is depicted, without certain other portions of the assembly thereon. In FIG. 35, body 801 is depicted in top view. In FIG. 36, a cross-sectional view taken along line 36-36, FIG. 35 is viewed. In FIG. 37, an enlarged fragmentary view of a portion of FIG. 36 is viewable. In FIG. 37 mount 860 is shown for a latch member to be mounted on a side wall 861 of body 801. Further, flange 832, which provides a seal surface for engagement with gasket 829, FIG. 29, is shown.

Figure 38:
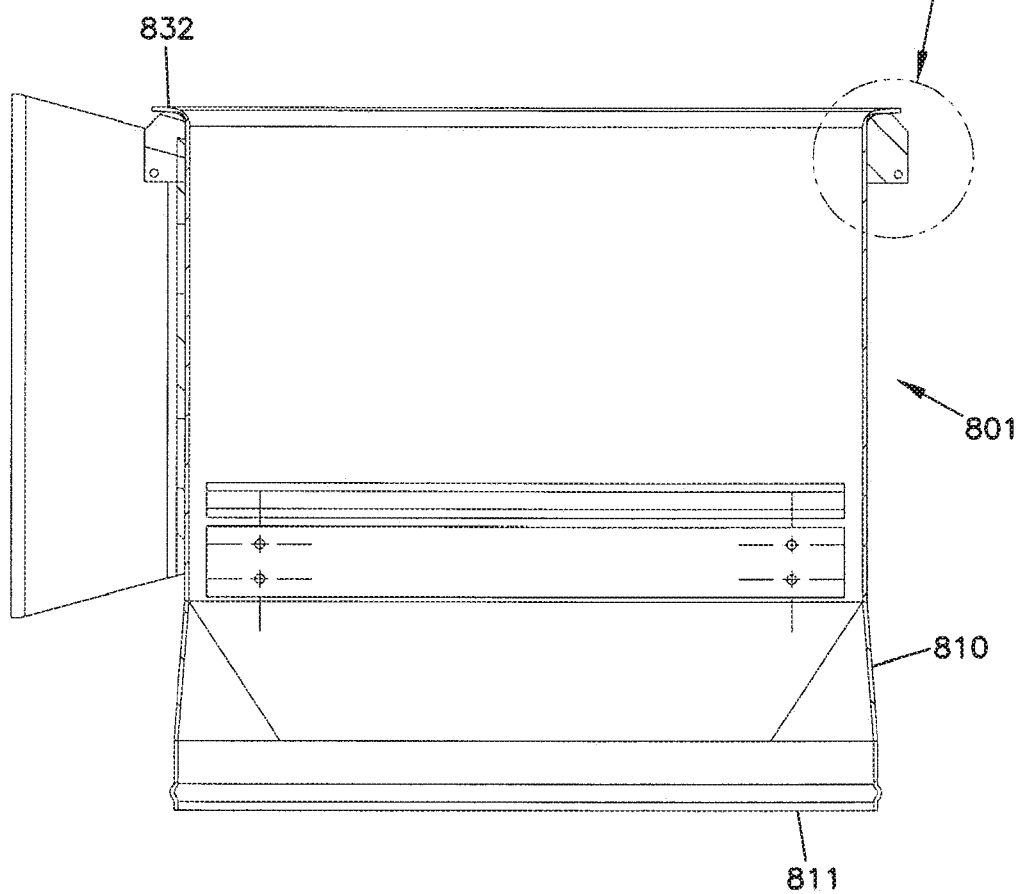
FIG. 38 is a cross-sectional view taken along line 38-38, FIG. 35.

FIG. 38 depicts body 801 in cross-sectional view taken along line 38-38, FIG. 35. FIG. 39 is an enlarged fragmentary view of a portion of FIG. 38, showing another mounting piece 865 for a latch, as well as a portion of flange 832 and a sealing surface therewith.

Referring to FIG. 36, stop or support arrangement 840 comprising stop members 841, 842 are readily viewable.

Although alternatives are possible, for the particular arrangement shown, body 801 is a sheet metal or formed metal body, and stops 841, 842 are bars or tubes welded therein. Of course molded arrangements could be used, in some applications.

Figure 41:
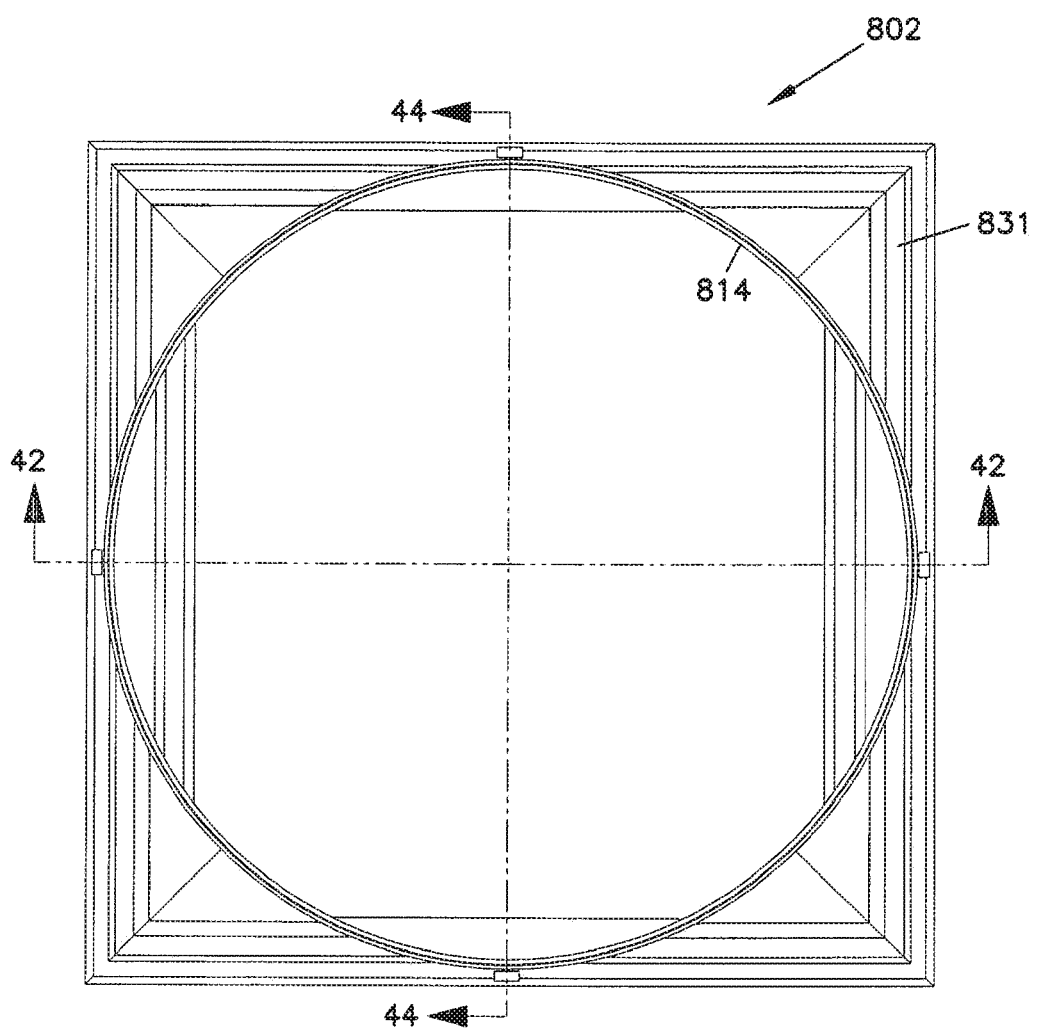
FIG. 41 is a top plan view of the cover component of FIG. 40.
Figure 42:
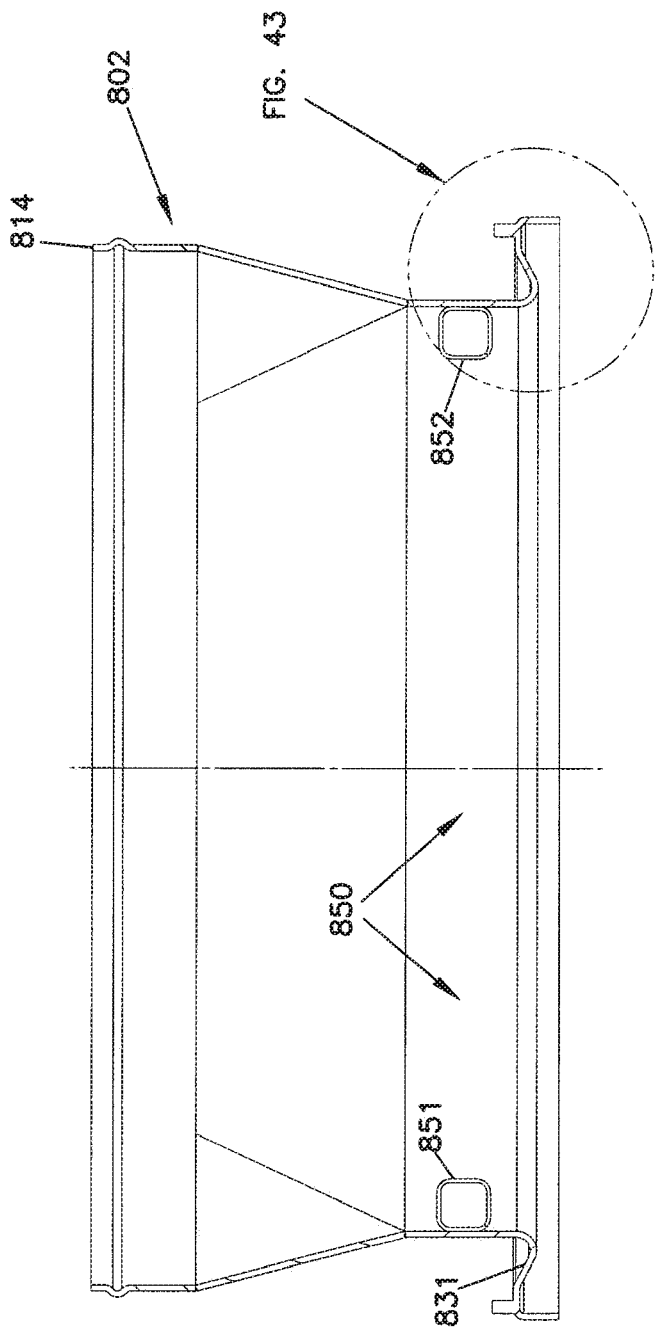
FIG. 42 is a cross-sectional view taken along line 42-42, FIG. 41.

In FIG. 40 a perspective view of a cover member 802 is depicted. In FIG. 41, a top plan view is shown. In FIG. 42 a cross-sectional view taken along line 42-42, FIG. 41 is shown. In FIG. 42 stop arrangement 850 is depicted comprising stops 851, 852. Although alternatives are possible, cover 802 depicted is made from sheet metal or formed metal components, with stops 851, 852 comprising bars or tubes welded in position. Of course alternative arrangements, such as plastic arrangements, can be used.

Figure 43:
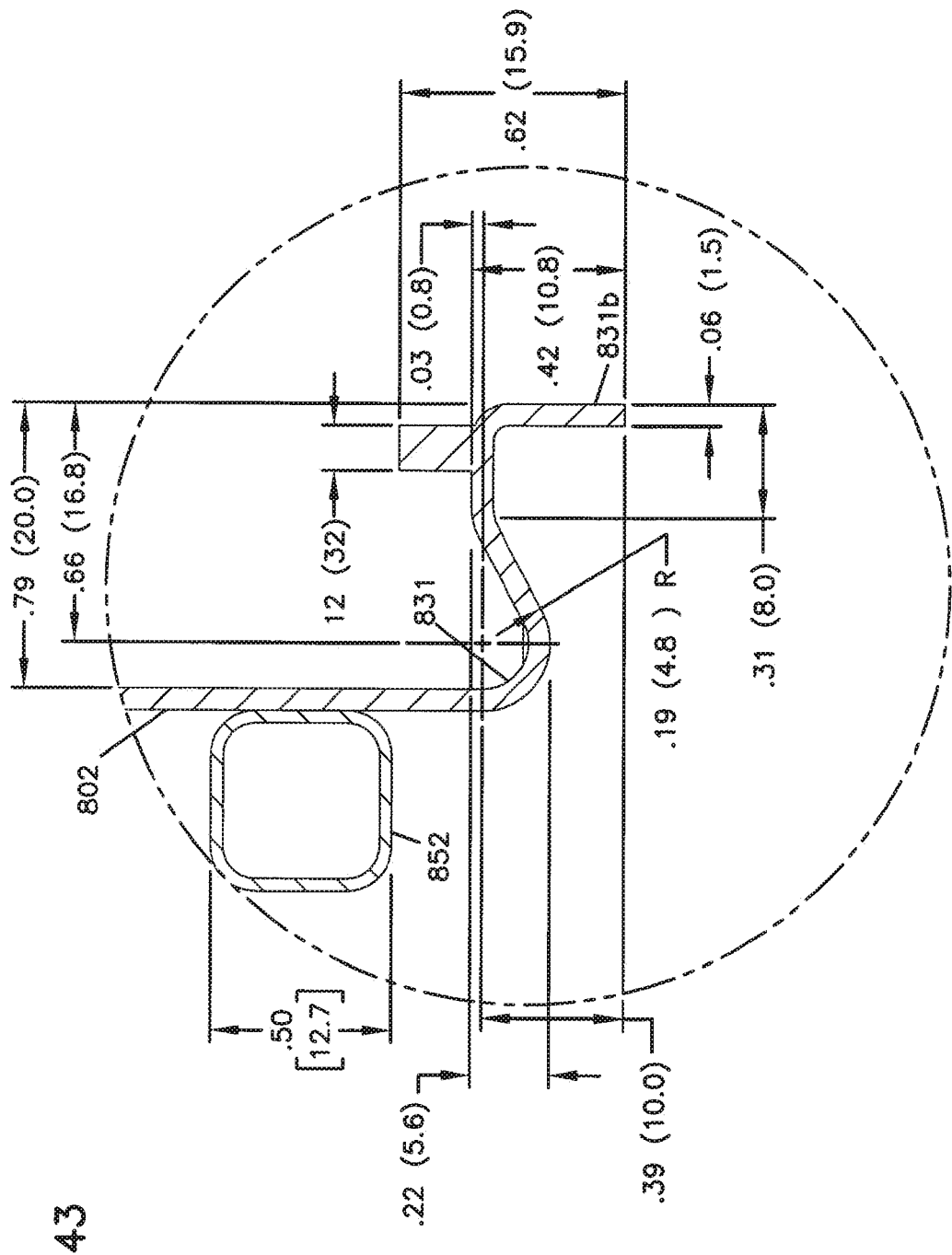
FIG. 43 is an enlarged fragmentary view of a portion of FIG. 42.

FIG. 43 is an enlarged fragmentary view of a portion of FIG. 42. In particular in FIG. 43 portions of stop 852 and flange 831 are viewable. Example dimensions are shown for these components, to provide an example. The dimensions in brackets are in millimeters, with other dimensions shown in inches, sometimes in parens.

Figure 44:
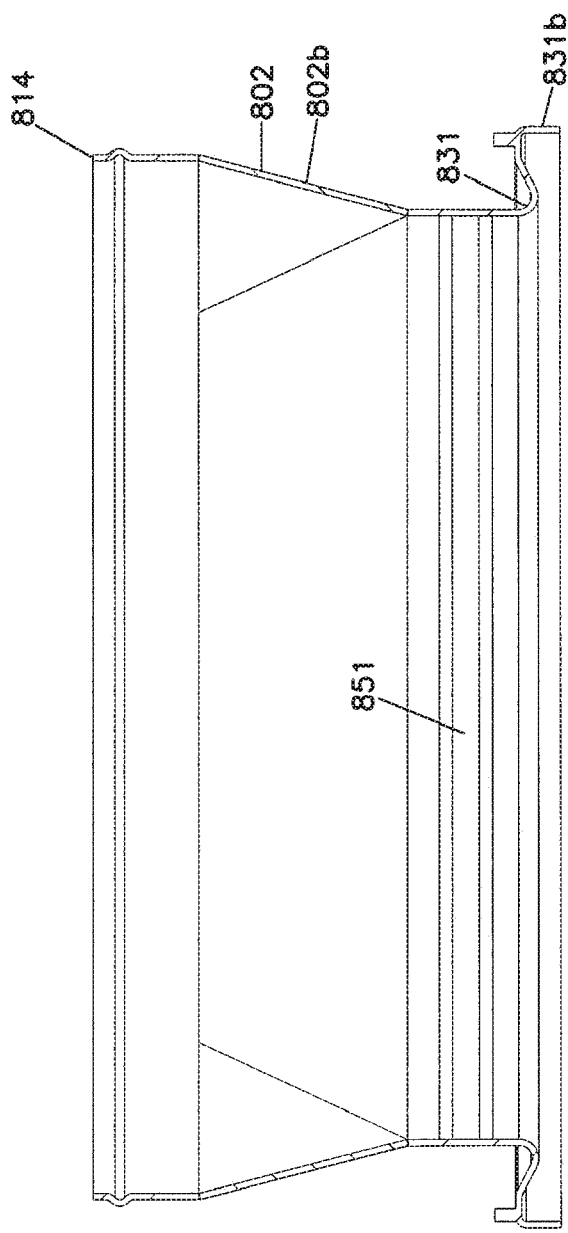
FIG. 44 is a cross-sectional view taken along line 44-44, FIG. 41.

FIG. 44 is a cross-sectional view taken along line 44-44, FIG. 41. Side wall 802b of cover 802 can be viewed, with flange 831 thereon.

Figure 45:
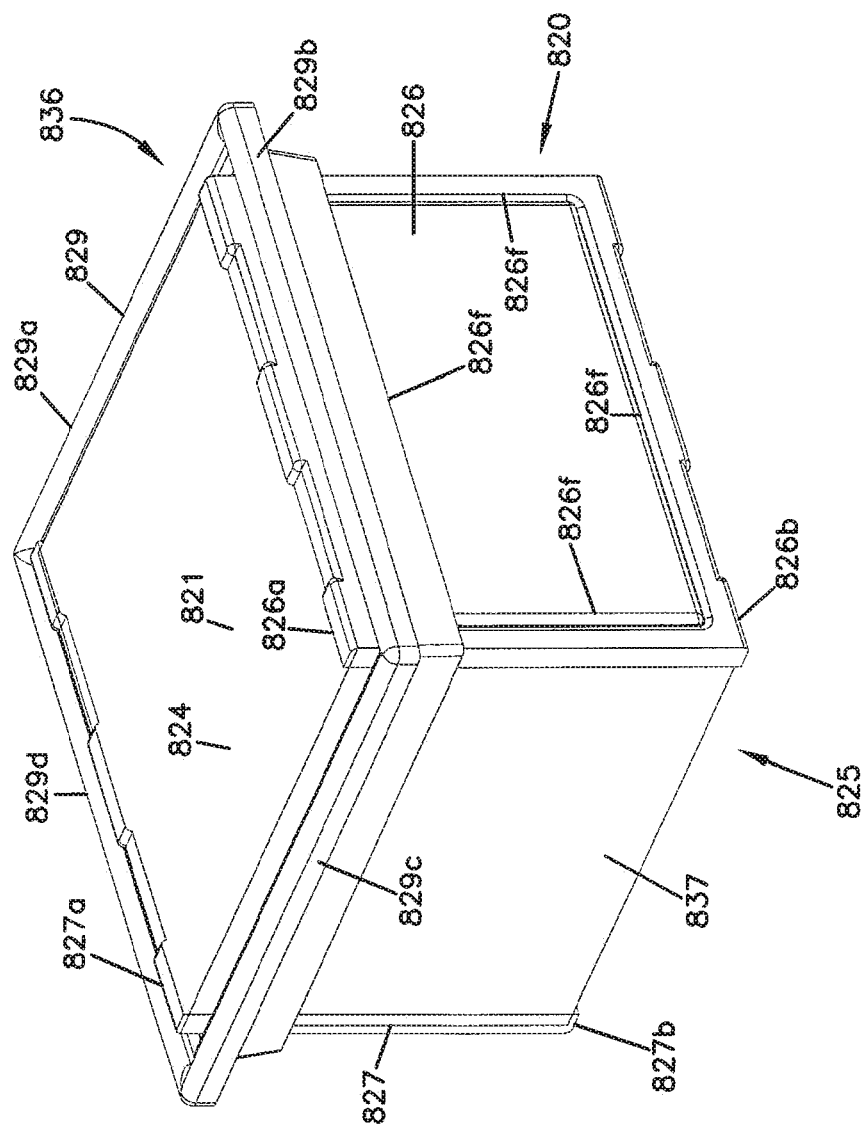
FIG. 45 is a perspective view of a filter cartridge useable in the air cleaner of FIG. 24.
Figure 46:
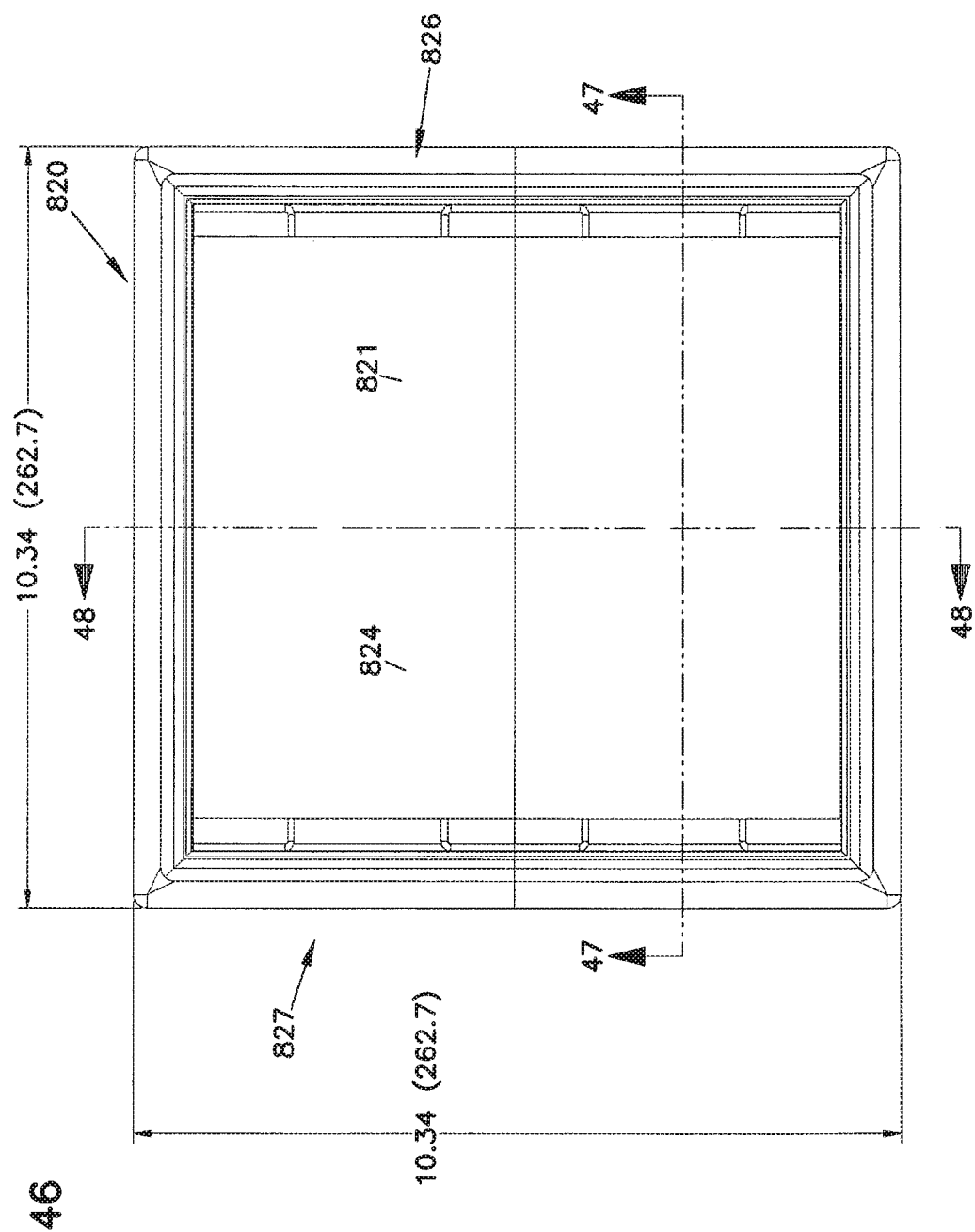
FIG. 46 is a top plan view of the cartridge of FIG. 45.
Figure 47:
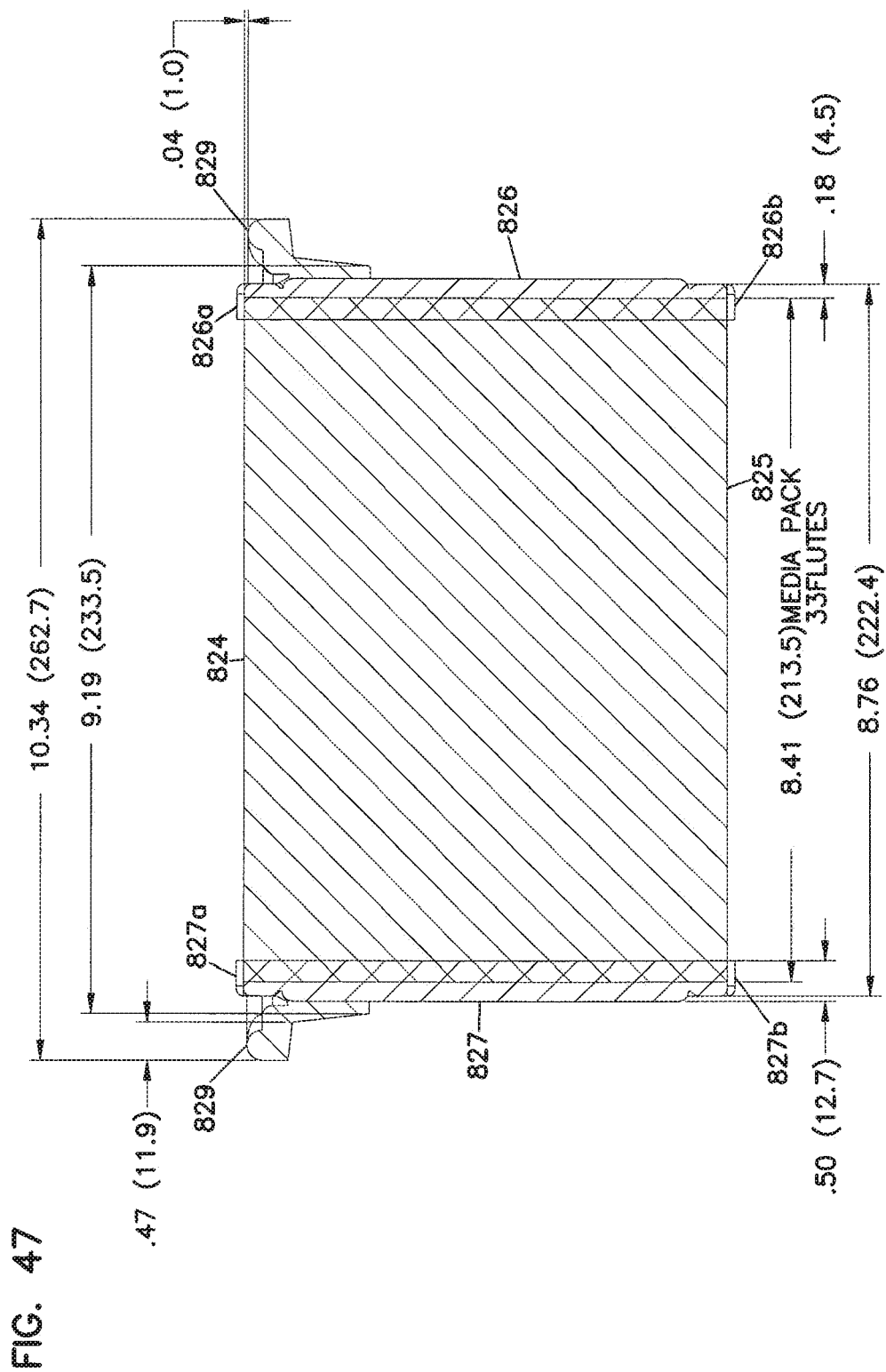
FIG. 47 is a cross-sectional view taken along line 47-47, FIG. 46.
Figure 48:
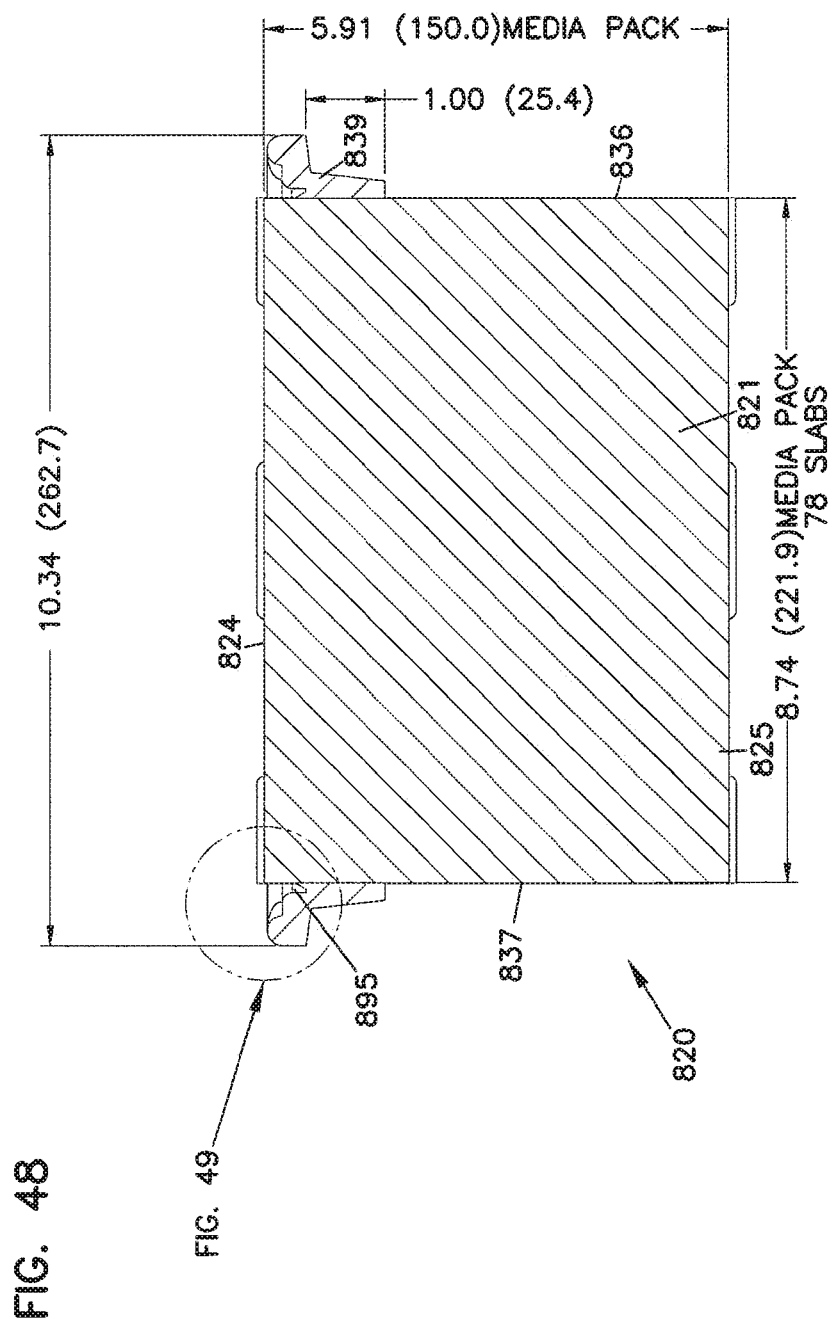
FIG. 48 is a cross-sectional view taken along line 48-48, FIG. 46.
Figure 49:
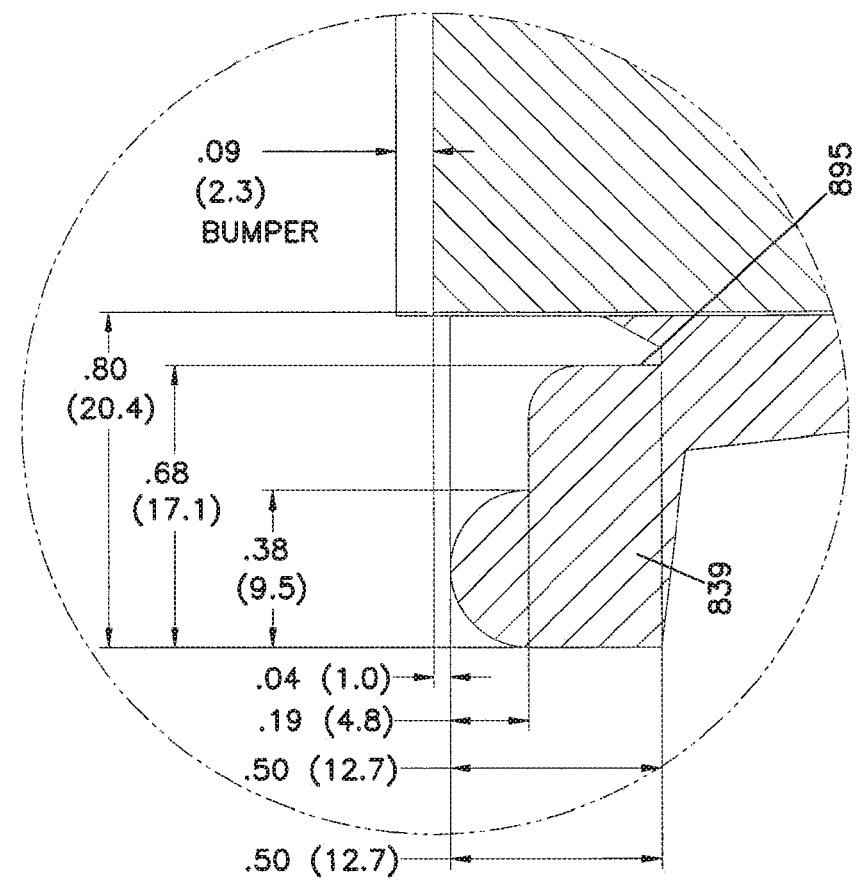
FIG. 49 is an enlarged fragmentary view of a portion of FIG. 48.

In FIGS. 45-49, filter cartridge 820 is depicted. FIG. 45 is a perspective view. FIG. 46 is a top plan view. FIG. 47 is a cross-sectional view taken along line 47-47, FIG. 46. FIG. 48 is a cross-sectional view taken along line 48-48, FIG. 46. FIG. 49 is an enlarged fragmentary view of a portion of FIG. 48. In FIGS. 45-49, dimensions are provided, to indicate an example arrangement useable in an air cleaner according to FIGS. 24-44.

Referring to FIG. 49, it is noted that trough 895 is provided along media pack 821, surrounding the media pack 821. Trough 895 is an artifact from a preferred molding arrangement used to construct gasket 829. The flange 831, FIG. 44, would not typically be configured to project deep into region 895.

Filter cartridge 820 may be generally as described above with respect to cartridge 300, FIGS. 8-10.

Referring to FIG. 45, filter cartridge 820 comprises media pack 821 having opposite molded panels 826, 827 and a molded housing seal arrangement 829. The molded housing seal arrangement 829 has four extensions 829a, 829b, 829c and 829d, to completely surround the media pack 821. The media pack defines opposite flow surfaces 824, 825 and opposite sides 836, 837, which are either uncovered, partially uncovered, or in some examples could be covered by a sheet material such as plastic or cardboard secured within the molded panels 826, 287 to extend therebetween.

It is noted that the particular assembly of FIGS. 24-49 is shown without the utilization of a separate cassette to receive the filter cartridge 820. Of course an alternative arrangement could be constructed, which utilizes such a cassette.

B. A Second Air Cleaner Assembly, FIGS. 50-58.

Figure 50:
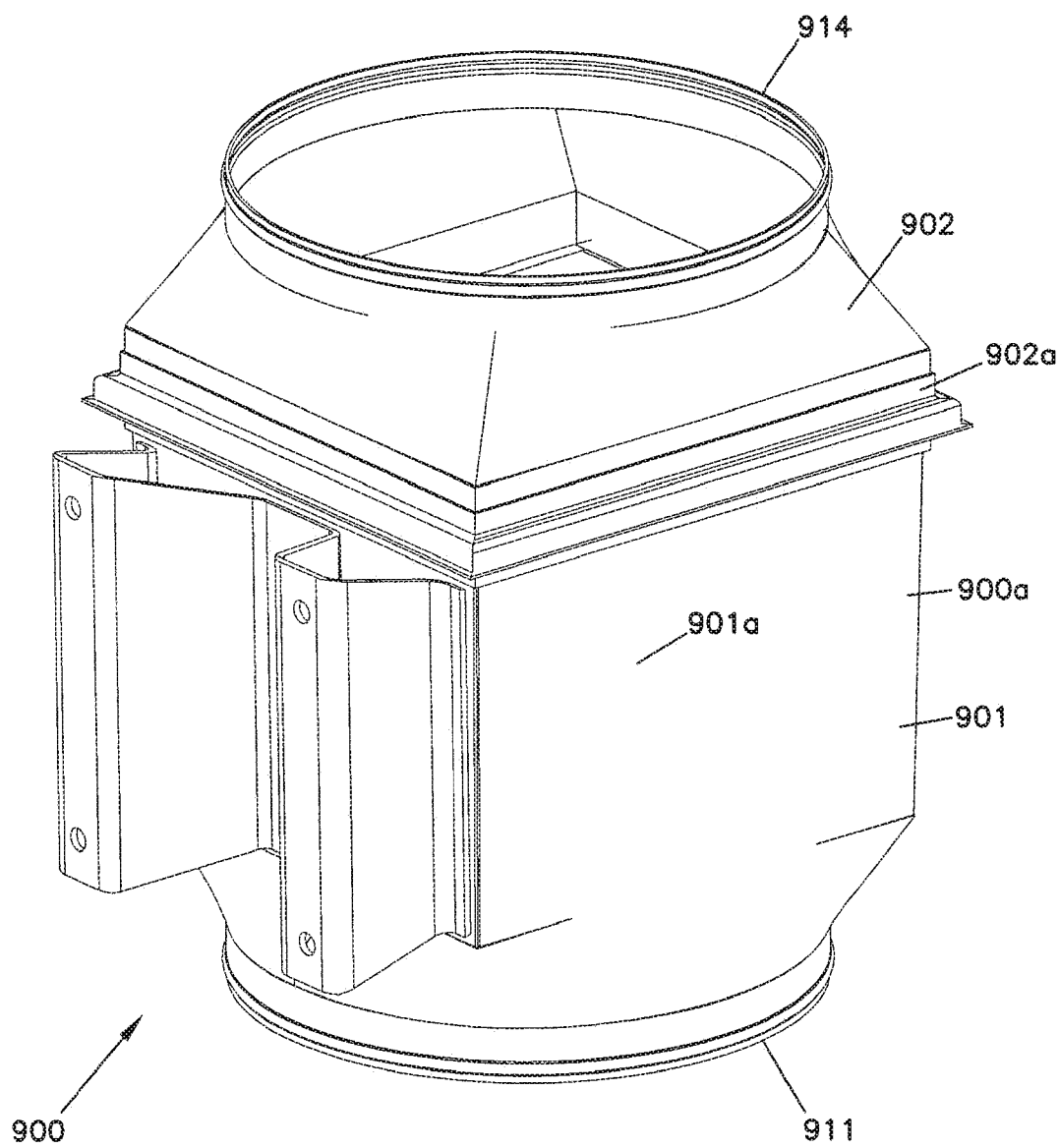
FIG. 50 is a perspective view of a different air cleaner assembly.

Reference numeral 900, FIG. 50, depicts second air cleaner arrangement, comprising a housing 900a. The housing 900a includes a body or base 901 and an access cover 902. Although alternatives are possible, base 901 has a parallelogram shaped portion 901a, in this instance having a square or rectangular cross-section, tapering to a circular air flow end 911, in this instance an outlet. Similarly access cover 902 includes a matching parallelogram section 902a, in this instance square or rectangular, and tapering to a circular air flow passage 914, in this instance an air flow inlet. Cover 902 can be secured to base 901 by latches, not shown, analogously to those shown in FIG. 24.

General external features of air cleaner 900 are similar to air cleaner 800, FIG. 24, and thus less detailed description is presented regarding them.

Figure 51:
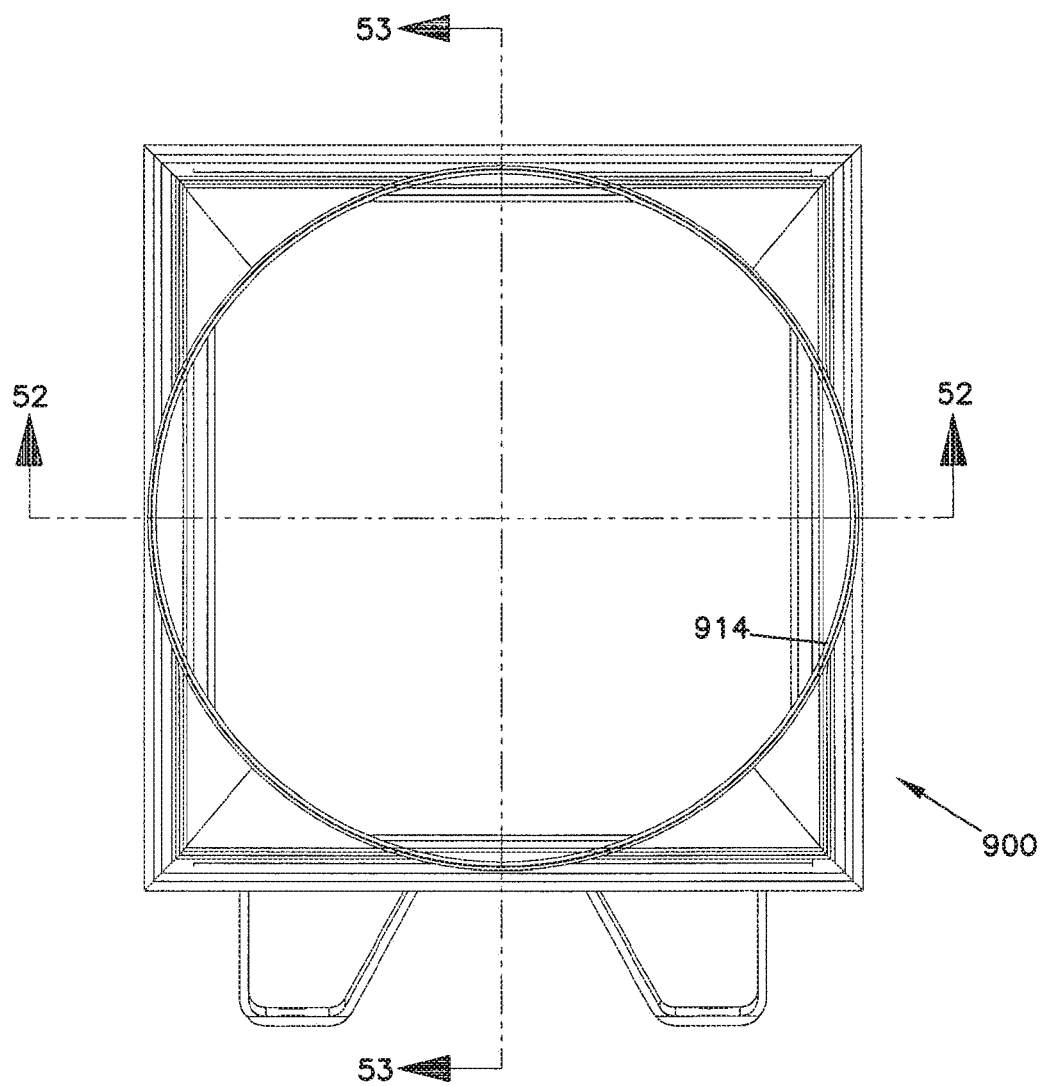
FIG. 51 is a top plan view of the air cleaner assembly of FIG. 50.
Figure 52:
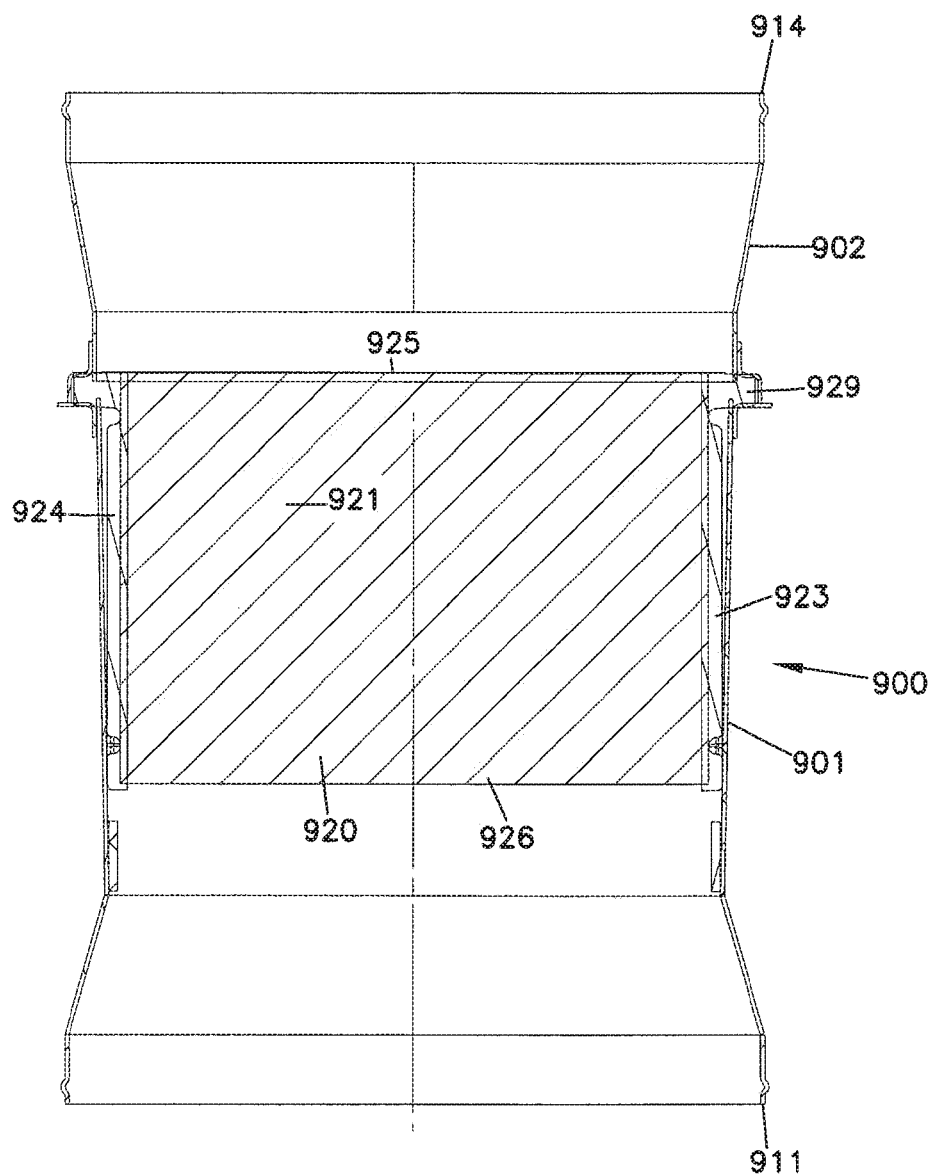
FIG. 52 is a cross-sectional line taken along line 52-52, FIG. 51.

In FIG. 51 a top plan view of air cleaner 900 is shown. In FIG. 52 a cross-sectional view taken along line 52-52, FIG. 51 is shown. In FIG. 52 cartridge 920 comprising a stacked z-filter media pack 921 is shown. The cartridge 920 depicted has opposite molded-on side panels 923, 924 and a gasket arrangement 929. Although alternatives are possible, in this instance gasket arrangement 929 is molded-on at a location flush with flow face 925 of media pack 921.

The media pack includes opposite flow faces 925, 926; for the arrangement shown face 925 being an inlet face and face 926 being an outlet face, although alternatives are possible.

Figure 53:
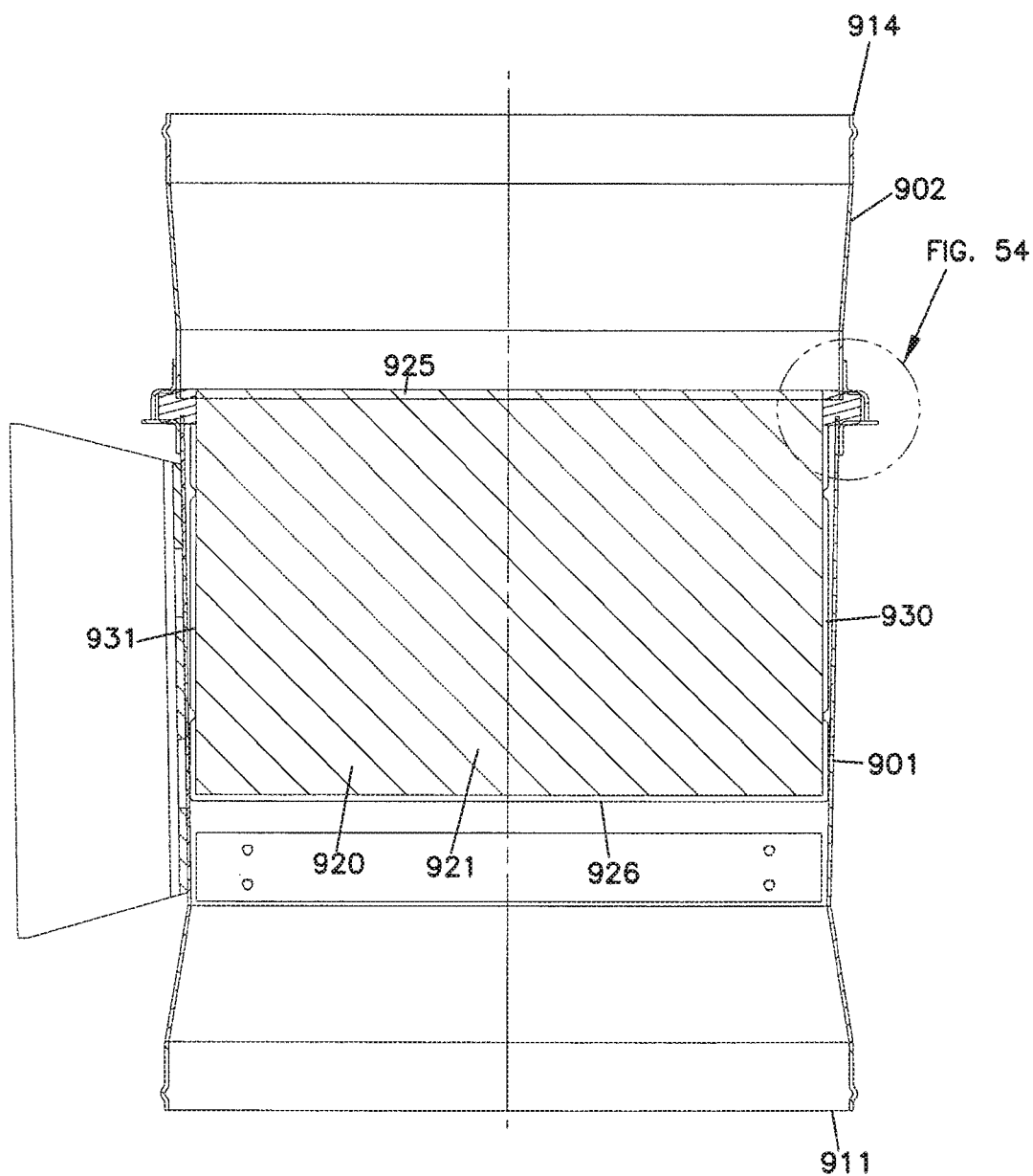
FIG. 53 is a cross-sectional view taken along line 53-53, FIG. 51.
Figure 54:
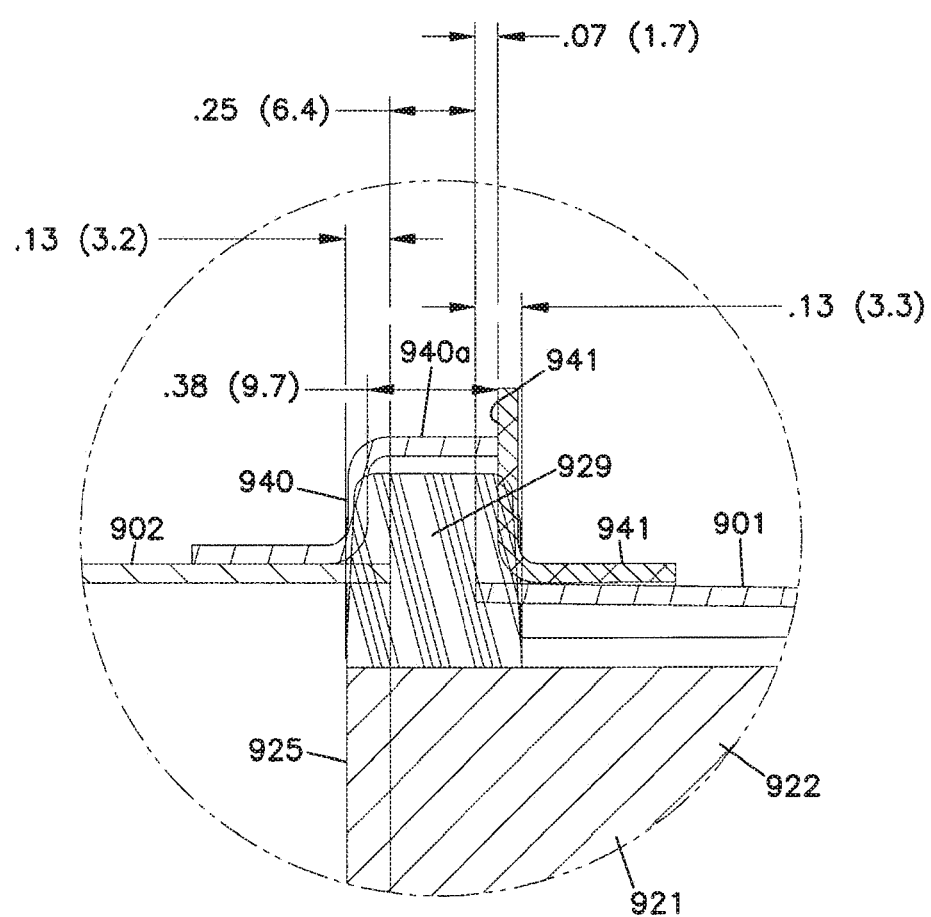
FIG. 54 is an enlarged fragmentary view of a portion of FIG. 53.

FIG. 53 is a cross-sectional view taken along line 53-53, FIG. 51. Here media pack 921 of cartridge 920 is depicted, with opposite side 930, 931 that do not include moldings thereon. Of course moldings could be put at this location, as well as protective panels such as preform panels of cardboard or plastic. However these are not required in some applications. In FIG. 54, an enlarged fragmentary cross-sectional view of a portion of FIG. 53 is shown. Gasket 929 is seen as being pinched between flange 940 on cover 902 and flange 941 on body 901. In FIG. 54 perimeter shape of gasket 929 is shown distorted, to show where the distortion or pinching would occur. It is noted that flange 940 also includes thereon an annular extension 940a positioned to surround the gasket 929, during assembly. When assembled, extension 940a could be sized to bottom out against flange 941, during clamping.

In FIG. 54, an edge or projection of cover 902 is shown projecting into gasket 929 to facilitate sealing. Also an edge or projection of body 901 is shown projecting into gasket 929 to facilitate sealing. The projecting edge of body 901 that projects into the gasket 929 is radially offset from the edge of cover 902 that projects into gasket 929; the projecting edge of body 901 being radially offset toward media pack 929. That is, the edge of body 901 on the downstream or body side, which projects into the gasket 929, is closer to the media pack 922, than the edge on the upstream or cover side 902 that projects into gasket 929, for the example shown.

In FIG. 54, some dimensions are shown, to indicate a workable example. The dimensions in brackets are in millimeters, the other dimensions are in inches.

Figure 55:
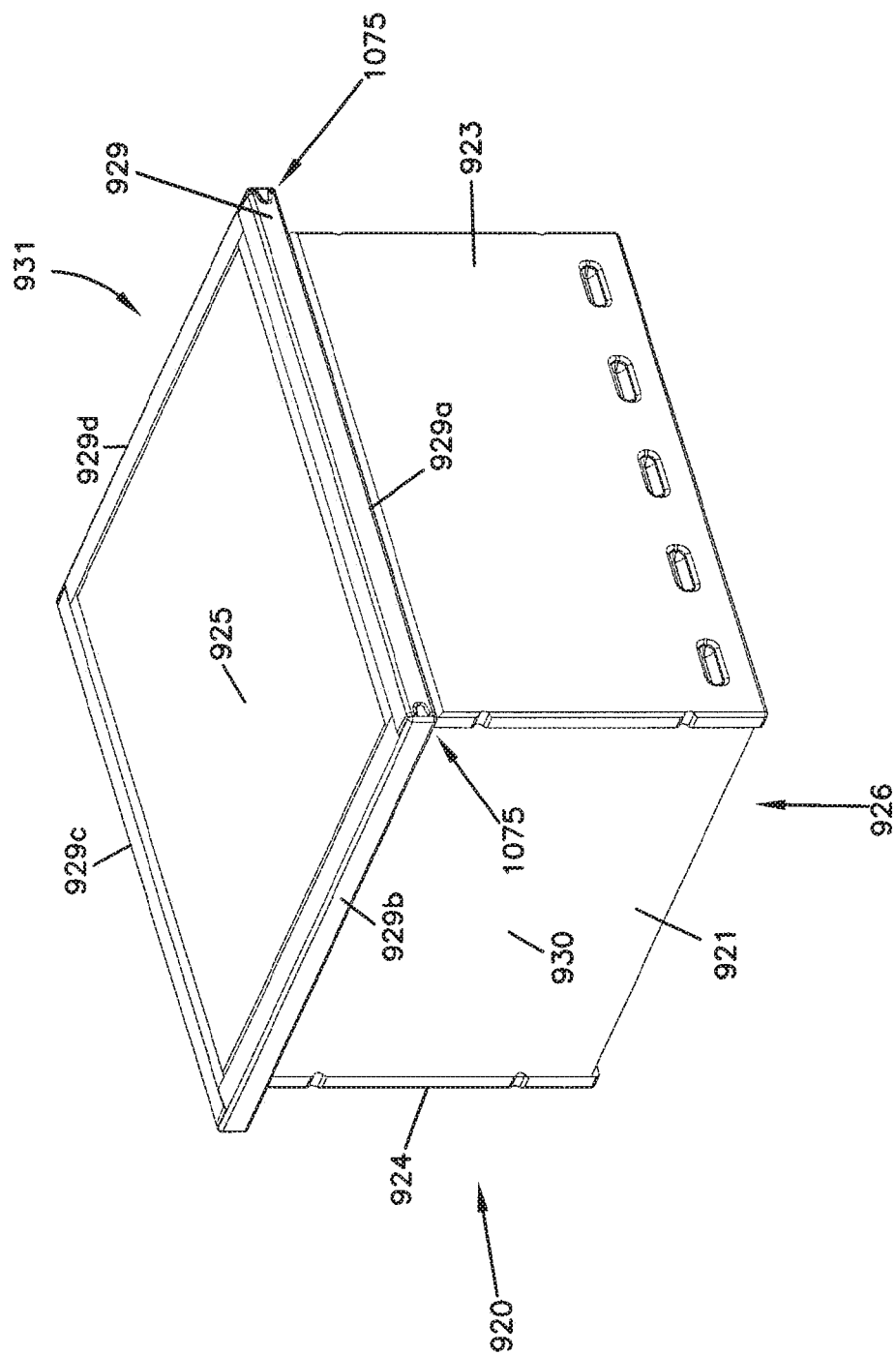
FIG. 55 is a perspective view of a filter cartridge useable in the air cleaner of FIG. 50.
Figure 56:
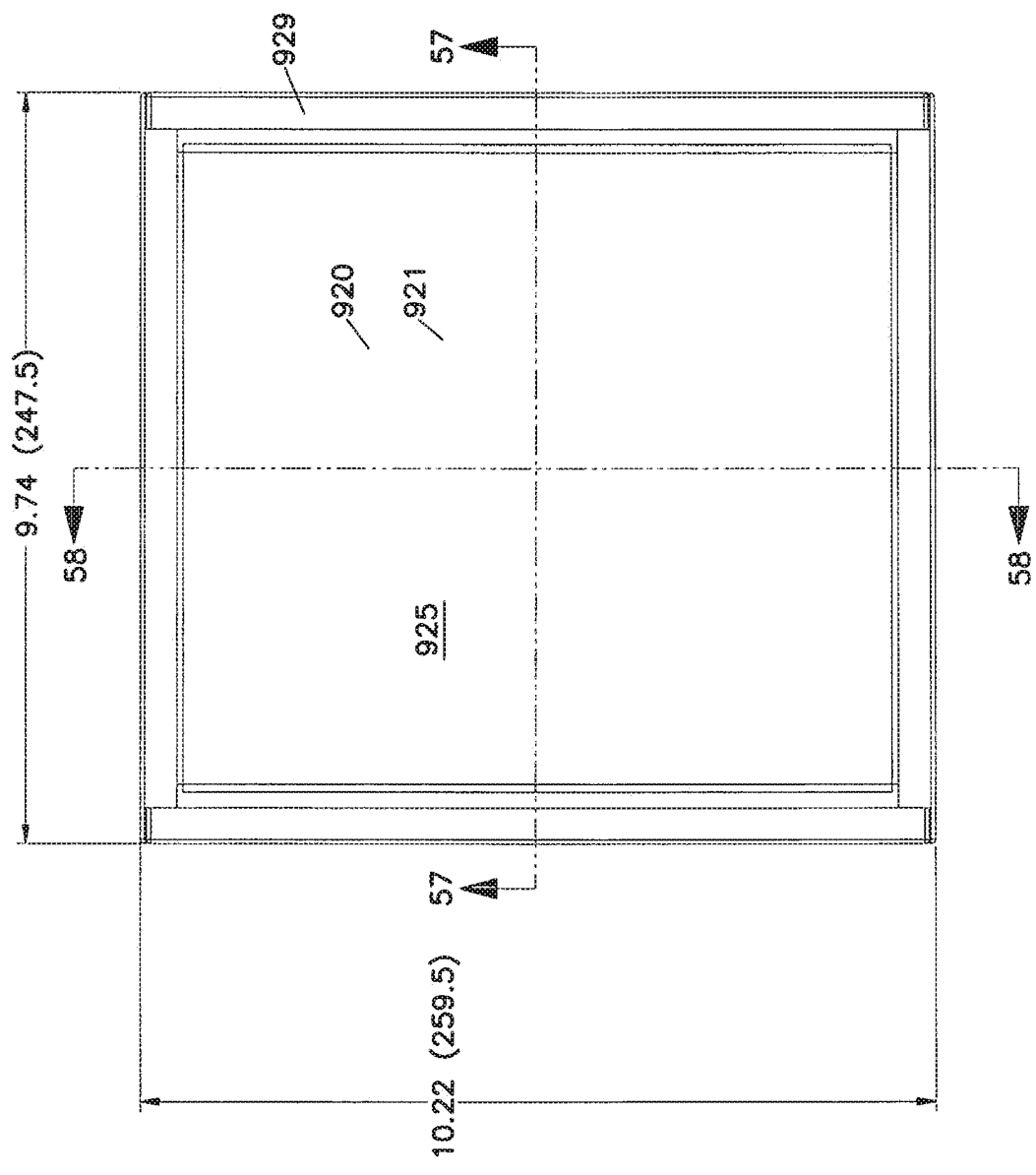
FIG. 56 is a top plan view of the filter cartridge of FIG. 55.
Figure 57:
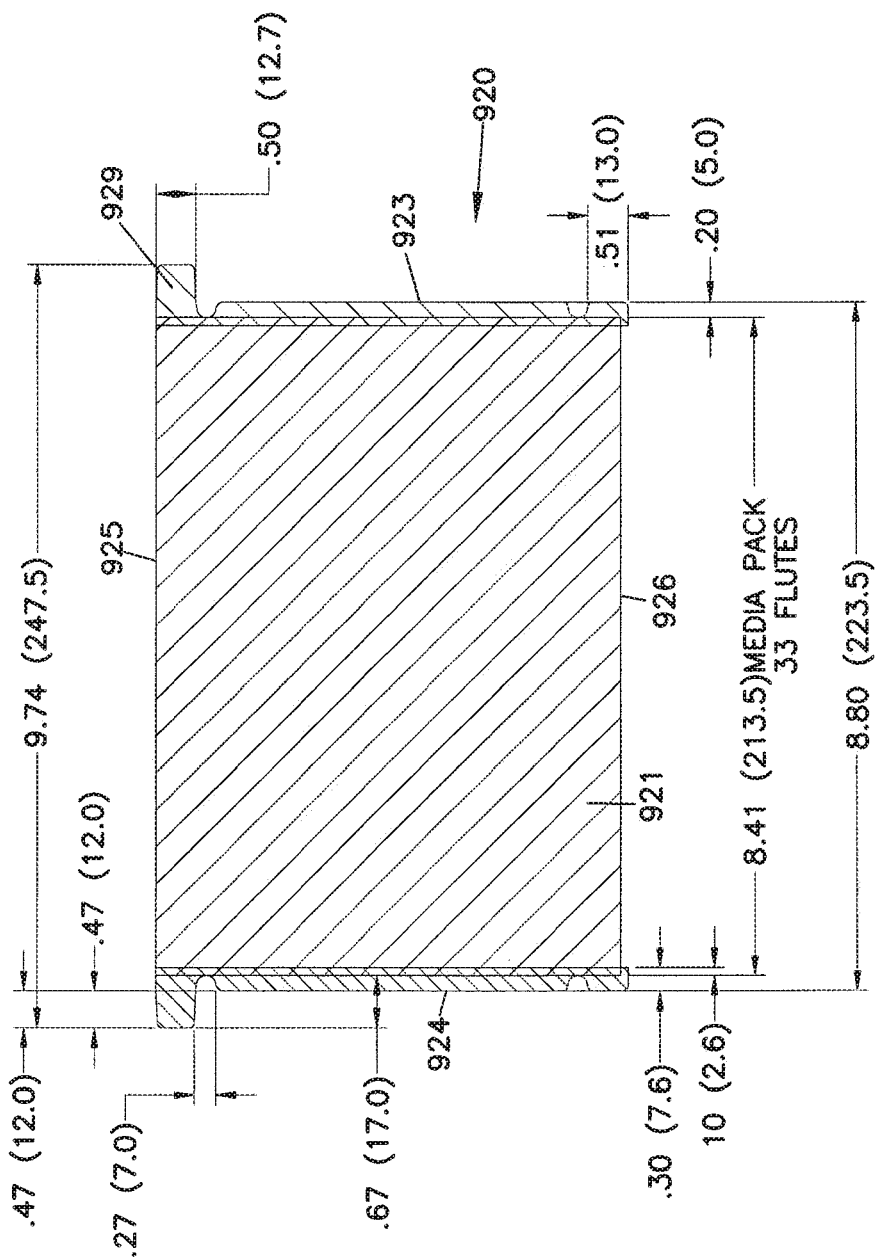
FIG. 57 is a cross-sectional view taken along line 57-57, FIG. 56.
Figure 58:
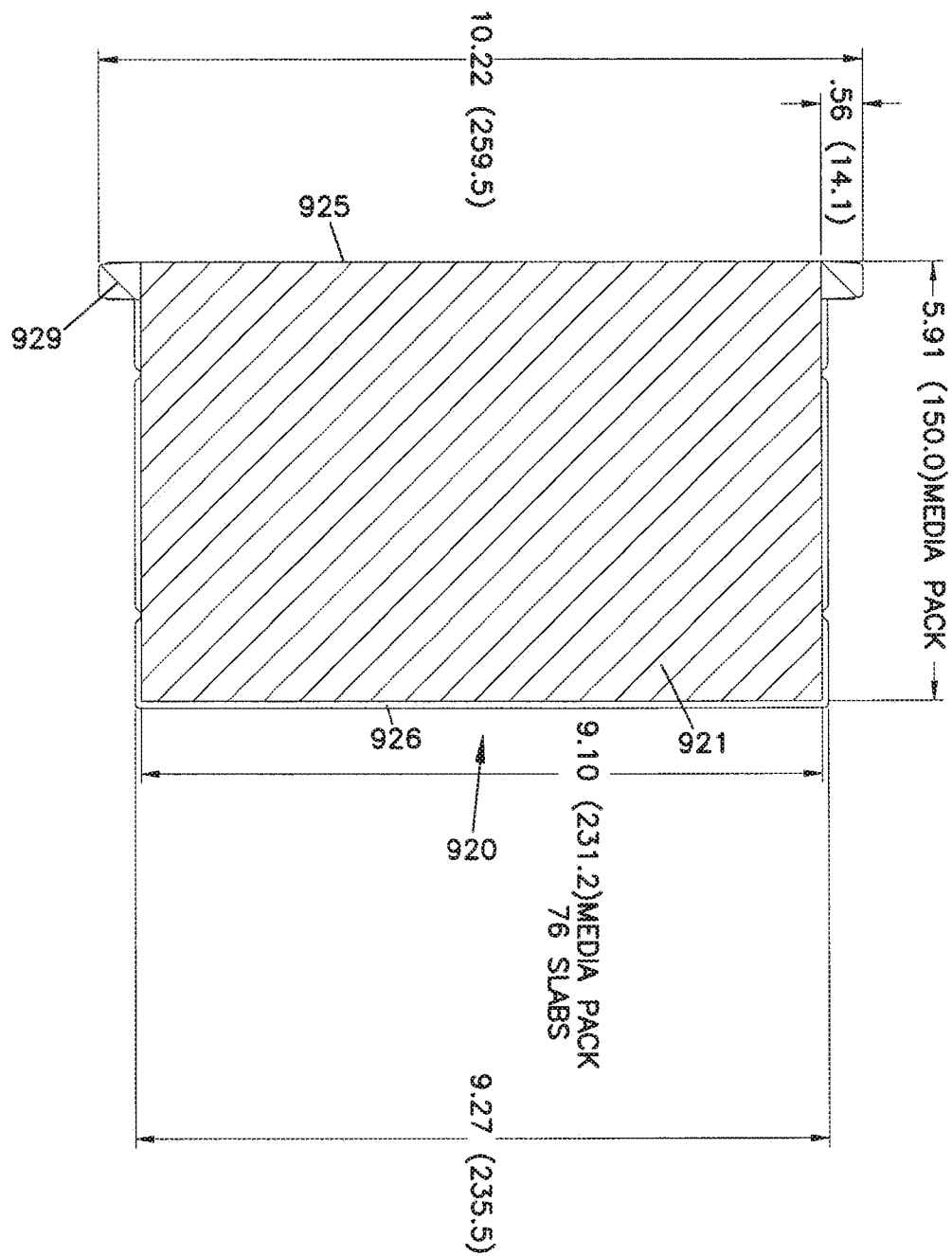
FIG. 58 is a cross-sectional view taken along line 58-58, FIG. 56.

FIGS. 55-58, a filter cartridge 920 useable in air cleaner 900 is depicted. Filter cartridge 920 is analogous to filter cartridge 400, FIGS. 11-14. FIG. 55 is a perspective view, FIG. 56 a top plan view, FIG. 57 a cross-sectional view taken along line 57-57, FIG. 56; and, FIG. 58 a cross-sectional view taken along line 58-58, FIG. 56. In FIGS. 56-58, example dimensions are shown in inches (and in brackets in millimeters) to provide an understanding of a working example. Of course alternatives can be used.

Referring to FIG. 55, filter cartridge 920 comprises media pack 921 having: opposite molded side panels 923, 924; opposite flow surfaces 925, 926; and molded housing seal arrangement 929 thereon, comprising four sections 929a, 929b, 929c and 929d.

The cartridge 920 further defines opposite surfaces 930, 931 as explained above, that do not include moldings thereon. These surfaces extend between molded panels 923, 024. Of course surfaces 930, 931 could be partially covered by molded arrangements, if desired. Further they can be covered or partially covered by protective covering such as cardboard sheets, plastic sheets, etc., if desired.

It is also noted that for the air cleaner assembly of FIGS. 50-58, the arrangement is shown without any support grid extending across the air cleaner, to support flow surface 926 or flow surface 925, in use. One or more such grids could be provided, if desired.

Further, it is noted that in FIGS. 50-58, no cassette arrangement is shown separately supporting the media pack within the air cleaner. Such a cassette arrangement could be used, if desired.

Finally, referring to the cross-section of FIG. 52, no stop arrangement is shown for supporting the media pack 921. A stop arrangement could be utilized in some applications, if desired.

VII. Example Methods of Cartridge Manufacture

General methods of manufacture of filter cartridges as described herein, are mentioned above. In this section example manufacturing processes and mold arrangements are described.

A. An Example Approach to Manufacture of a Filter Cartridge According to FIGS. 7-10 and 45.

As indicated above, the filter cartridge 820 of FIG. 45 can be viewed as comprising three molded sections, namely: panel 826, opposite panel 827 and housing seal ring 829. (The filter cartridge 300 of FIGS. 7-10 is similar.)

One useable approach to manufacturing the filter cartridge of FIG. 45, is to use a three step mold procedure, molding each of these components separately. Such a procedure is illustrated in FIGS. 59-68.

Figure 59:
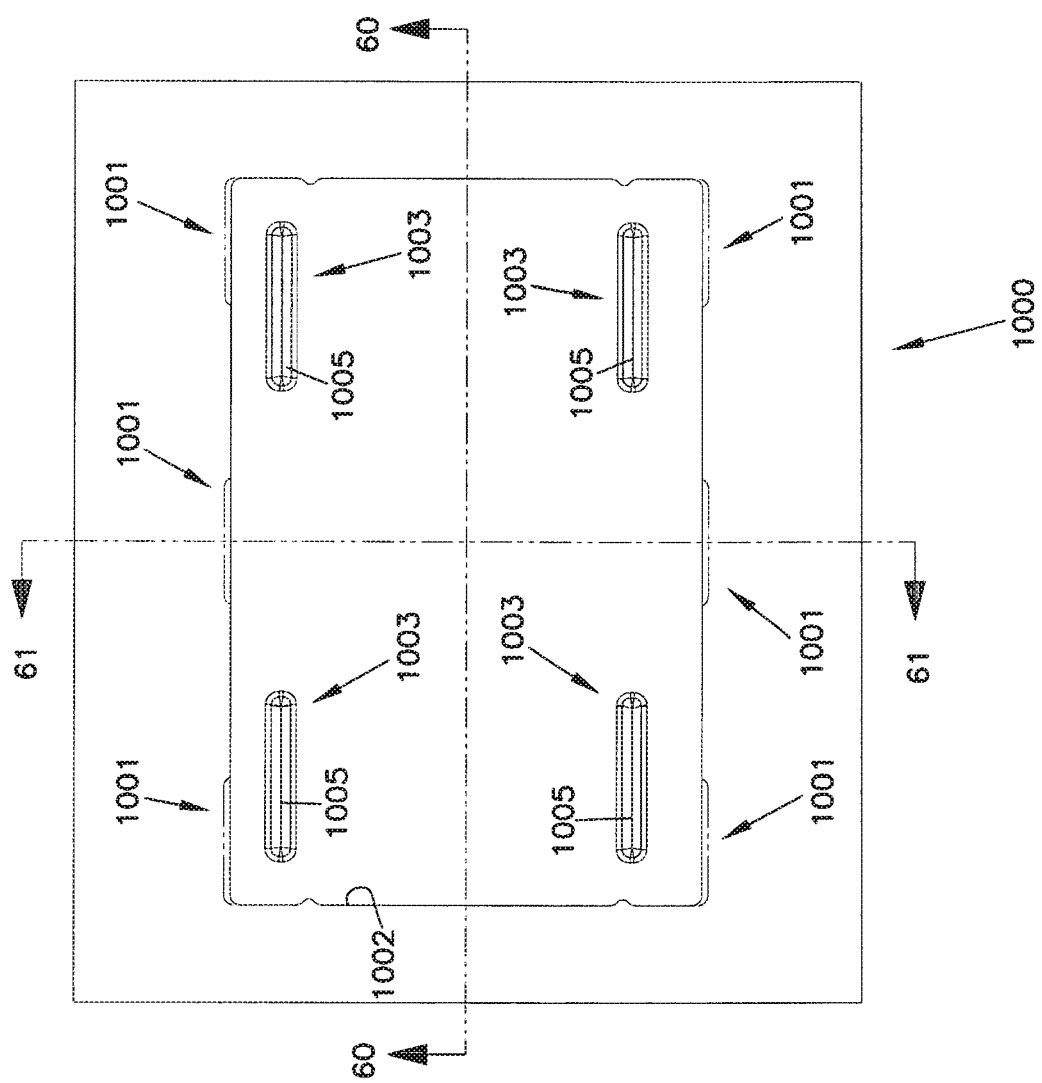
FIG. 59 is a top plan view of a mold arrangement useable to form molded side panels on a media pack, for example a media pack of the general type shown in FIG. 45.

Referring first to FIG. 59, a mold arrangement 1000 is depicted, useable for molding panels generally corresponding to panels 826, 827, FIG. 45. It is noted that the mold 1000 depicted in FIG. 59, is configured for molding panels with a slight modification from panels 826, 827. For example, mold 1000 is not configured to form the projections and recessions observed along edges 826a, 826b, 827a and 827b, FIG. 45. However, phantom lines 1001 in FIG. 59 indicate how the mold could be modified, for forming these features.

Also, mold 1000 utilizes a different media pack stand-off arrangement, than one which would have been used to create panels 826, 827, each with a trough (corresponding to trough 826f, FIG. 45), being the artifact from molding. This will be further understood from the discussions below of a molding process using FIG. 59.

Figure 59A:
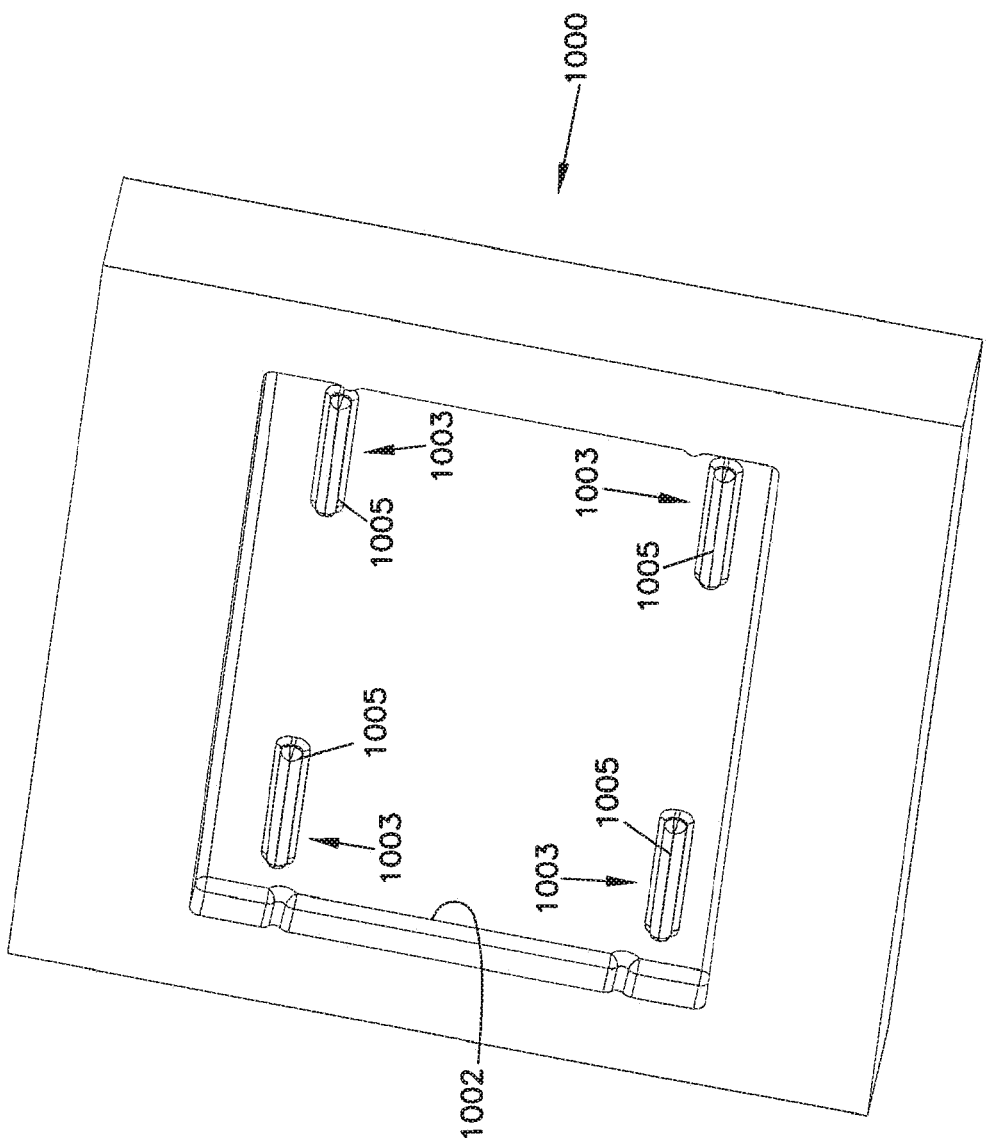
FIG. 59A is a perspective view of the mold arrangement of FIG. 59.

In FIG. 59A, mold arrangement 1000 is shown in perspective view.

Referring to FIG. 59, in general mold arrangement 1000 comprises a mold cavity 1002, with a media pack stand-off projection arrangement 1003 positioned therein. A variety of configurations can be used for the stand-off projection arrangement 1003. The particular configuration shown in FIG. 59, uses four (4) projections 1005. In an alternative, a continuous rib could be used, which would result in a trough similar to that shown at 826f at FIG. 45. In FIGS. 60 and 61, cross-sectional views of mold 1000 are depicted.

In a typical molding operation, a resin would be poured into the mold cavity 1002, and then a media pack would be set into the cavity for molding. Alternatively in some arrangements the media pack could be first positioned, and then the mold filled with the appropriate resin.

Typically a resin will be used, as characterized above, which is a foaming resin (such as a foamed polyurethane) that will increase in volume during molding. However, a wide variety of resin materials can be used.

Figure 62:
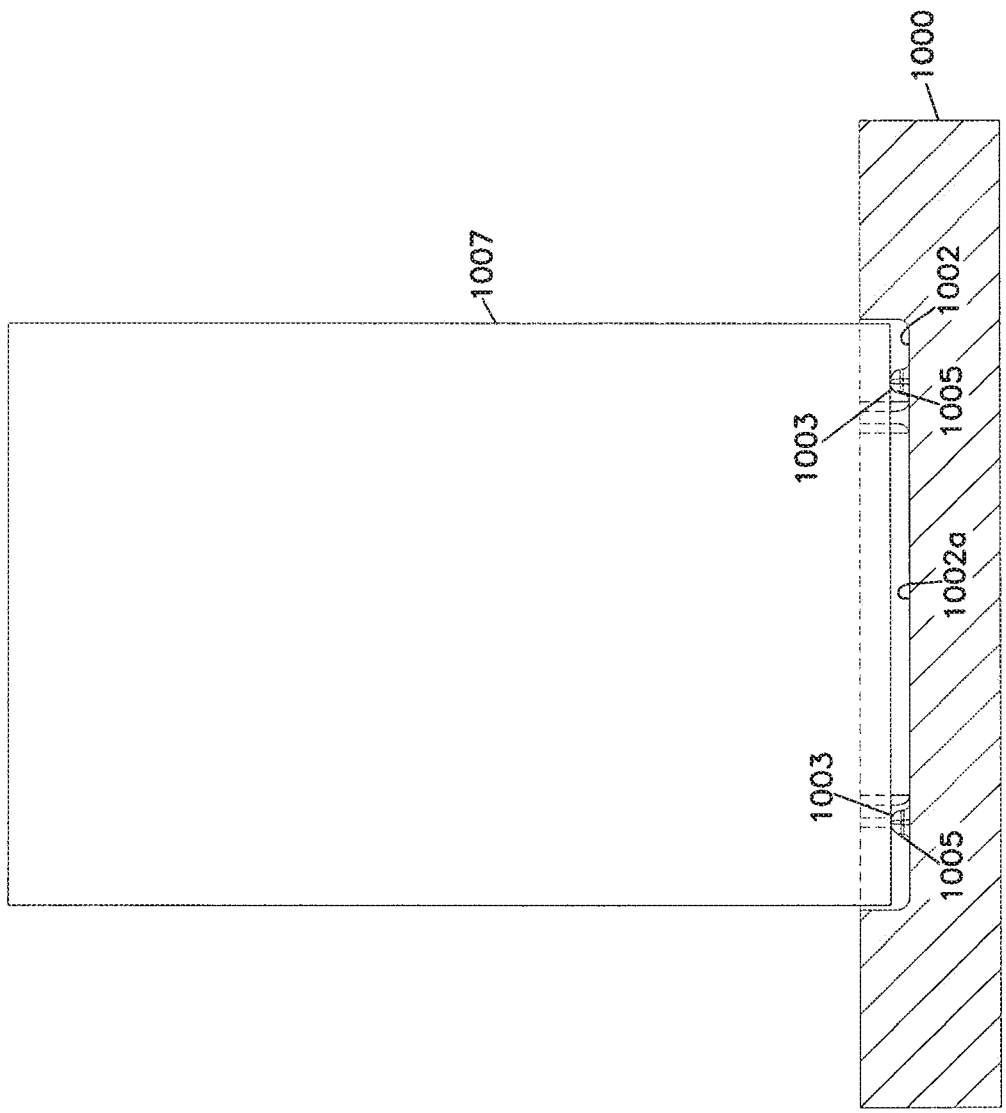
FIG. 62 is a cross-sectional view depicting a media pack positioned in the mold arrangement of FIG. 59; the view of FIG. 62 showing the mold in a view analogous to FIG. 61.

In FIG. 62, mold 1000 is depicted with the media pack 1007 positioned therein, for a molding operation. From FIG. 62, one can see the media pack 1007 which stands above the bottom 1002a of cavity 1002, upon stand-off projection arrangement 1003.

Figure 63:
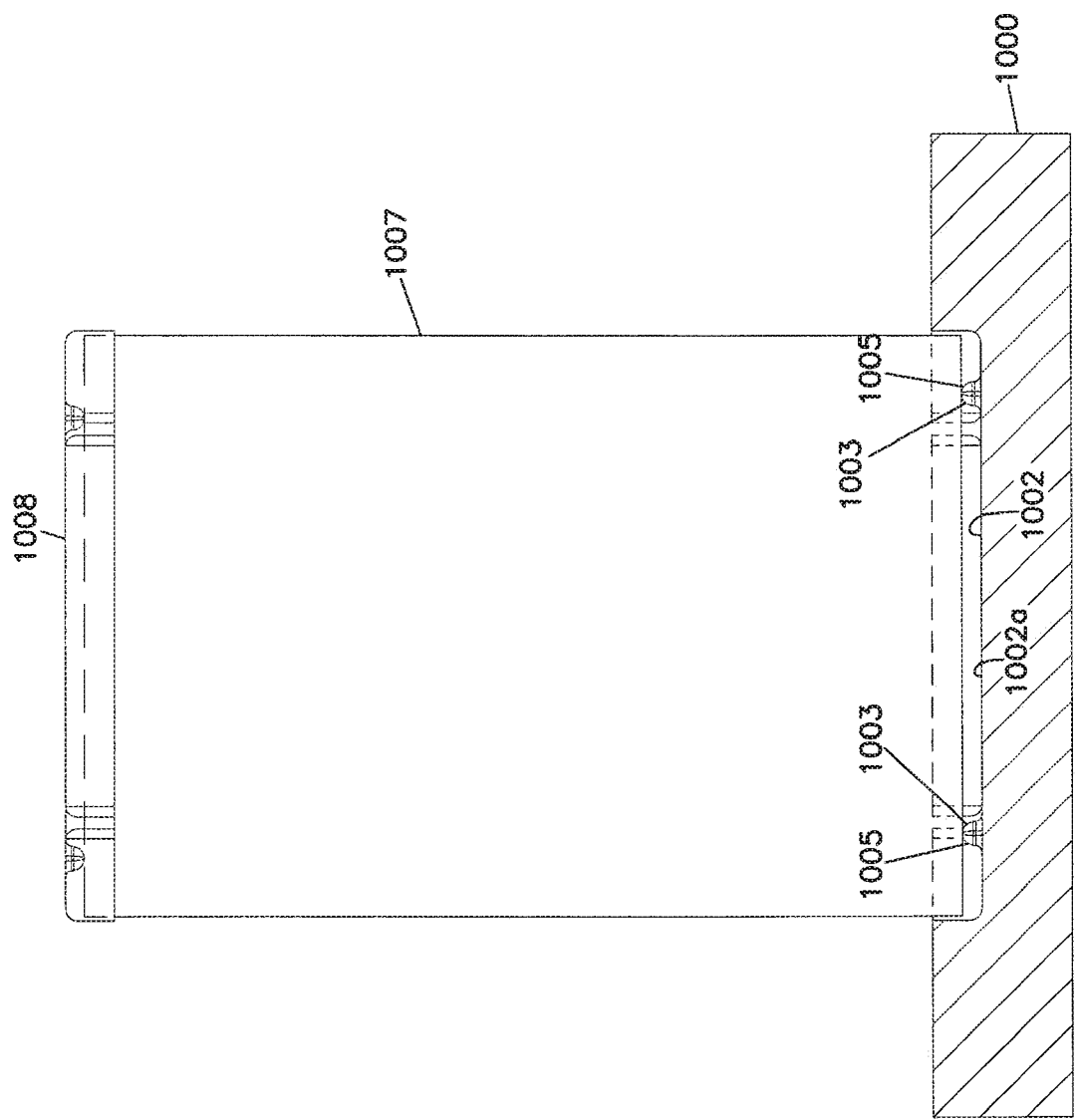
FIG. 63 is a depiction of a media pack resulting from a process step conducted with respect to the arrangement of FIG. 62 shown inverted and placed in a mold arrangement according to FIG. 59, for molding a second, opposite, side panel.

After the molding operation of FIG. 62, the resulting media pack 1007 with one side panel 1008 thereon, would be inverted and reset in the mold for molding the opposite side panel. This process is shown in FIG. 63.

Figure 64:
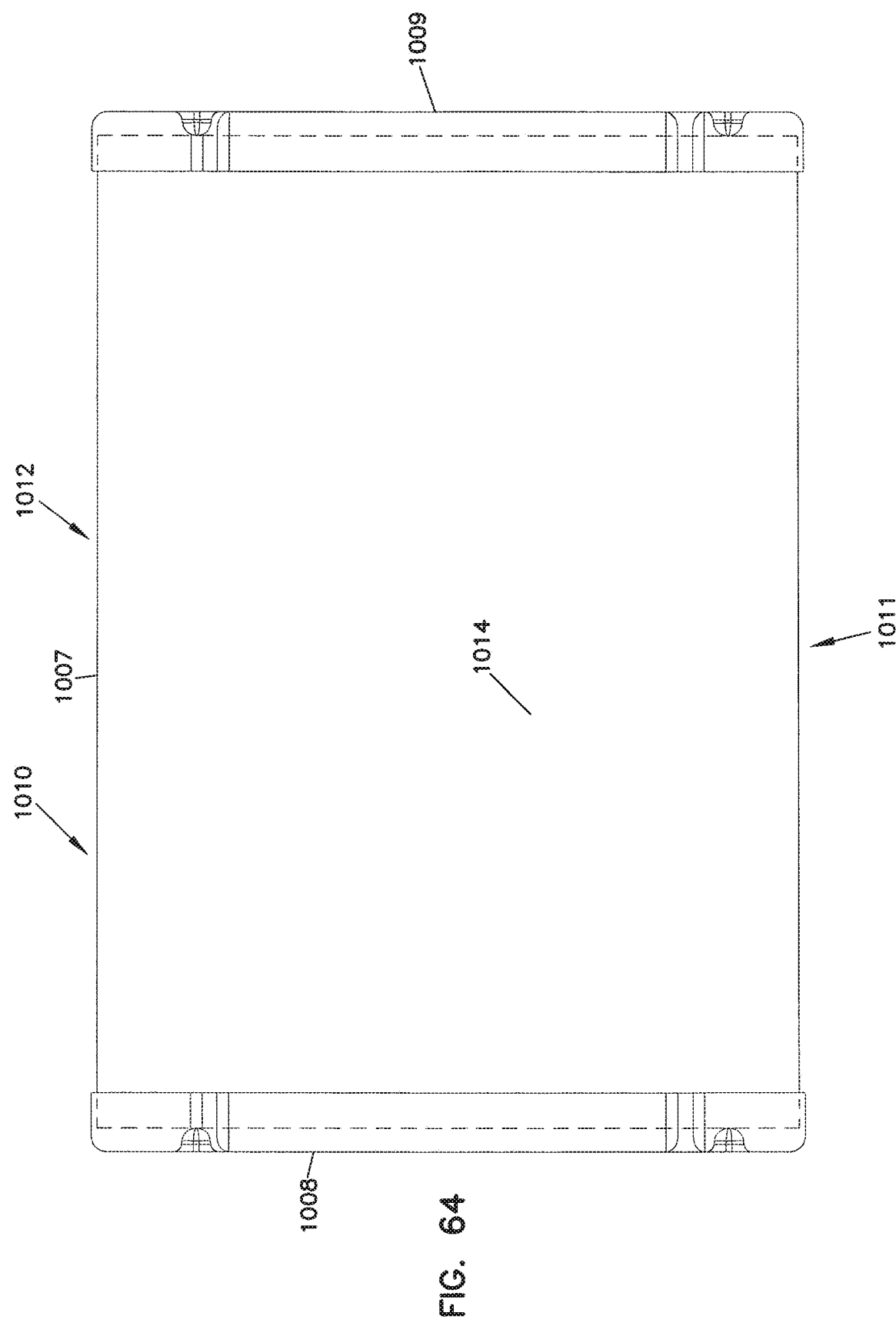
FIG. 64 is a side elevational view of a media pack after a step of manufacture according to FIG. 63.
Figure 65:
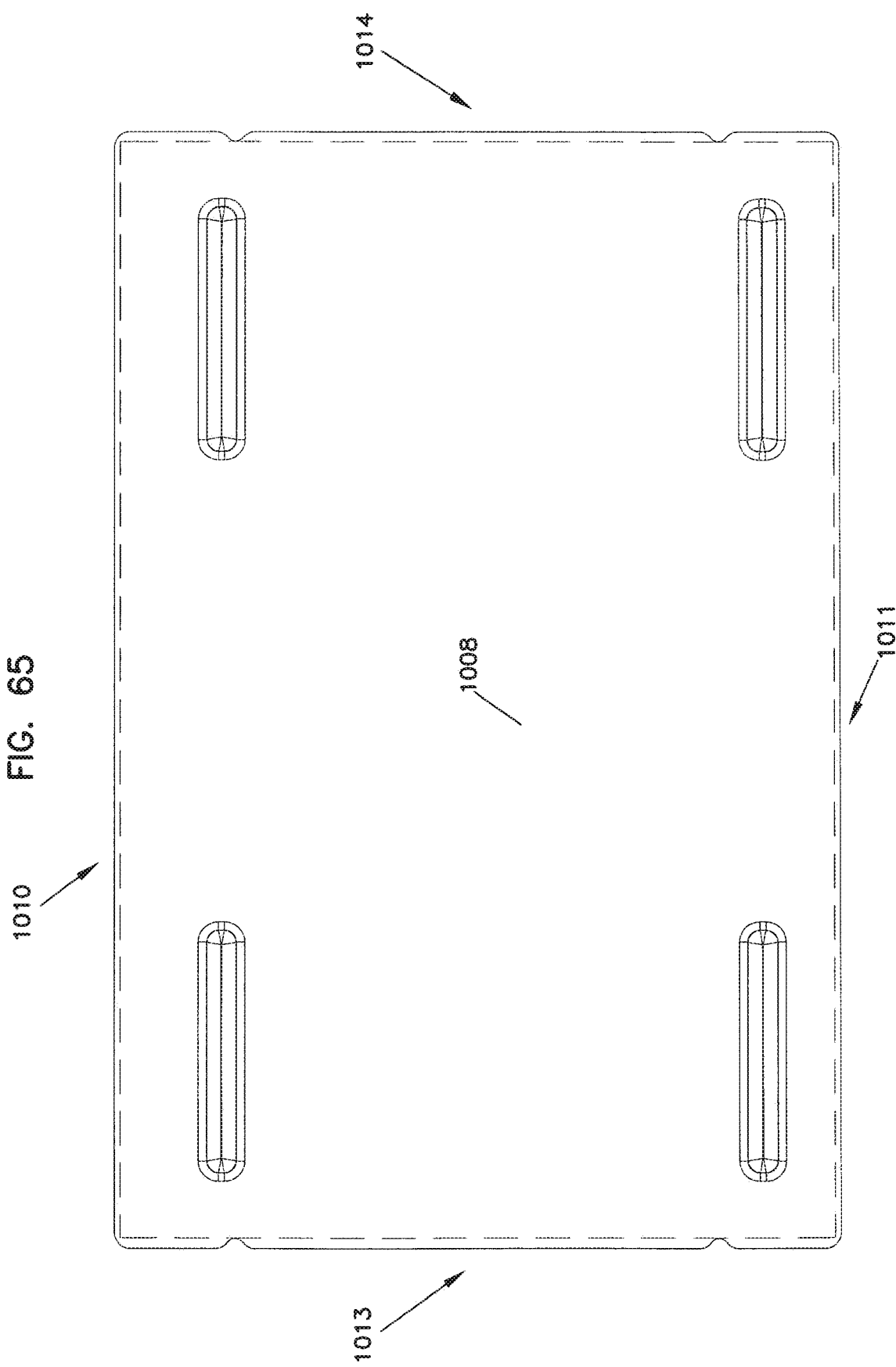
FIG. 65 is a side elevational view of the media pack, FIG. 64, directed toward a side having a molded side panel thereon.

In FIGS. 64 and 65, media pack 1012 resulting from a media pack 1007 having two opposite molded side panels 1008, 1009 thereon, from a molding operation described thus far, is shown. In FIG. 65, the view point is toward side panel 1008. In FIG. 64 the media pack 1007 is viewed toward a side which extends between the molded side panels 1008, 1009. Referring to FIG. 65, in the final construction, air flow through the media pack 1007 will be generally between flow face 1010 and an opposite flow face 1011. In FIG. 65, opposite sides 1013 and 1014 are noted. These would typically not have a molded panel thereon, although they could be formed that way. They also could be left mostly uncovered or be provided with a preformed covering, for example cardboard or plastic.

The arrangement 1012 of FIG. 64, 65, will preferably have added to it, for formation of a filter cartridge, a housing seal arrangement. With respect to this, attention is directed to FIG. 66-68.

Figure 66:
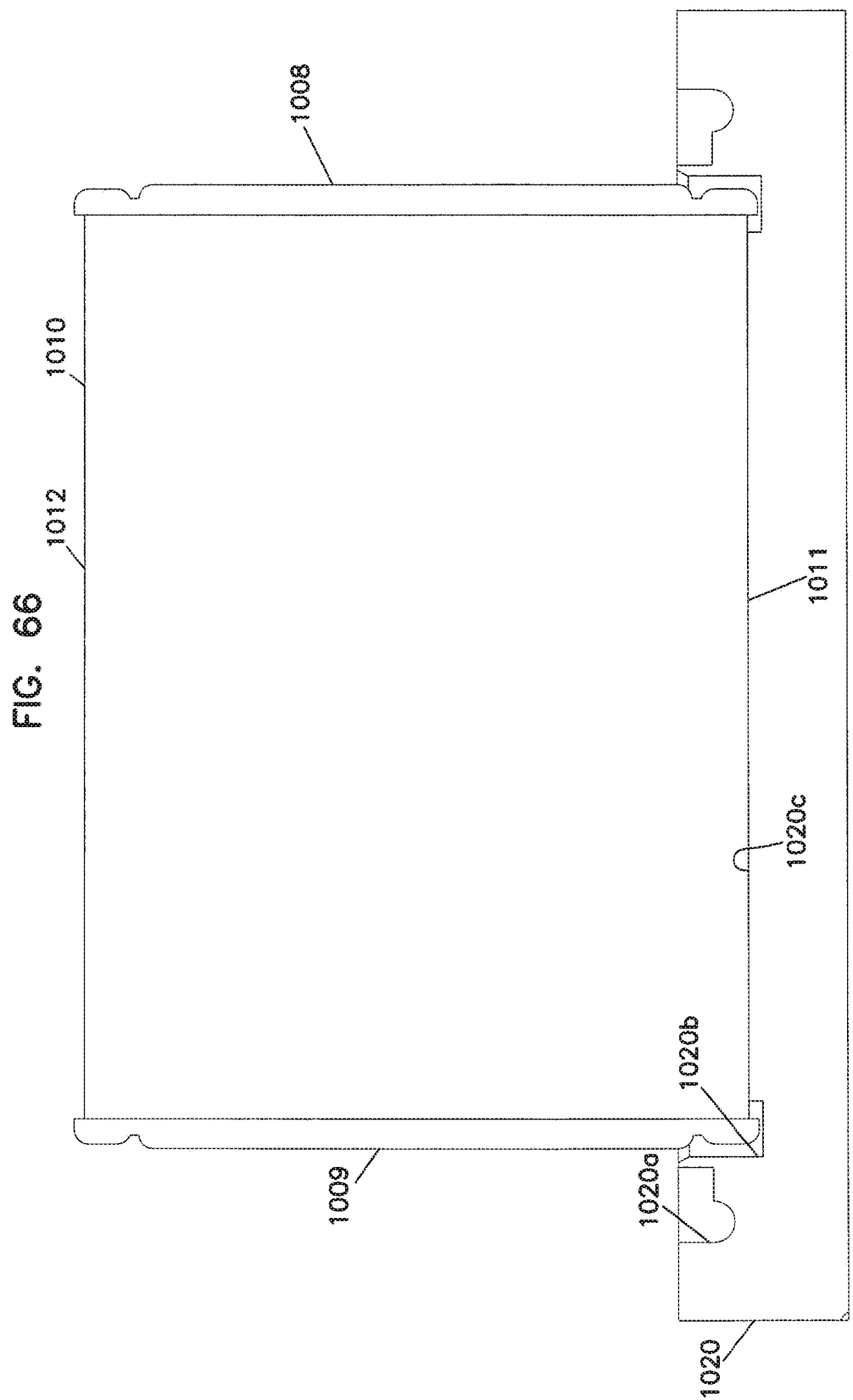
FIG. 66 is a schematic side elevational view of the media pack according to FIGS. 64 and 65 positioned in a first mold section for formation of a housing seal ring on the media pack.
Figure 67:
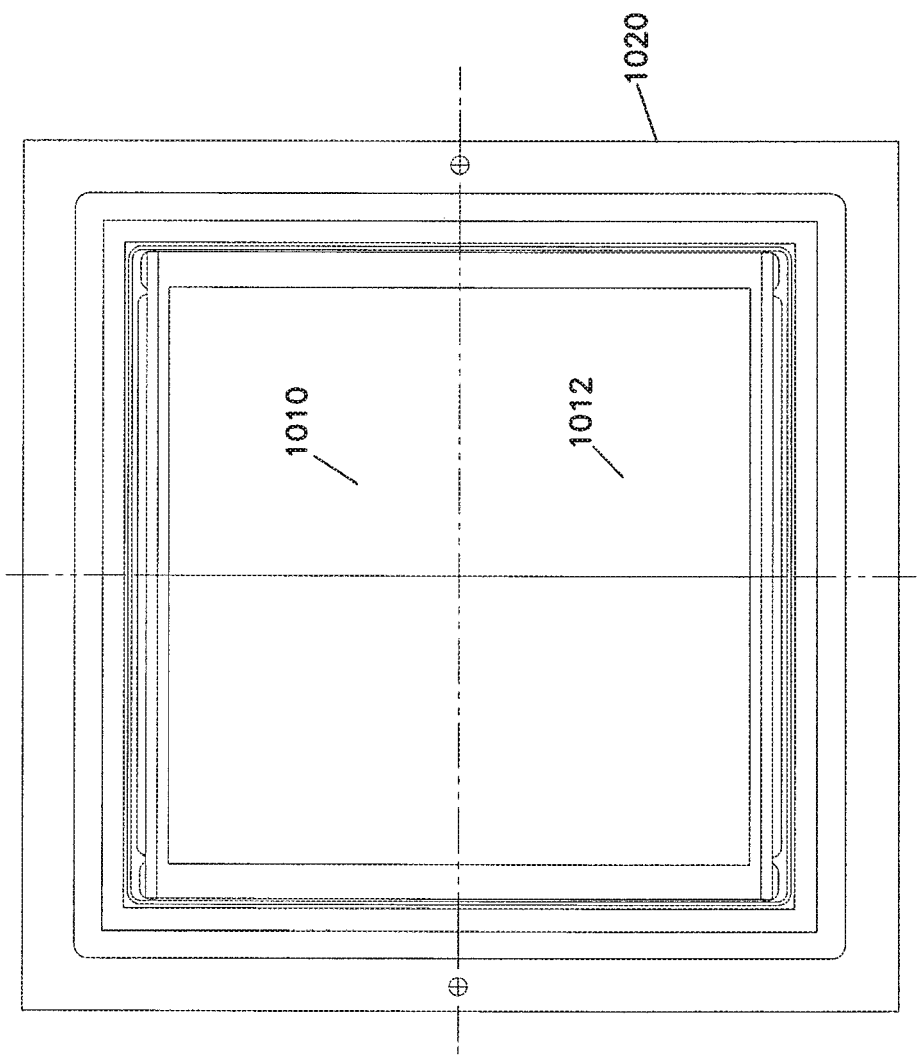
FIG. 67 is a top plan view of the arrangement of FIG. 66.

Referring to FIG. 66, a mold section piece 1020 is shown schematically, with arrangement 1012 positioned therein, for formation of a housing seal. FIG. 67 is a top plan view of the arrangement of FIG. 66. In FIG. 66, arrangement 1012 is positioned with a flow surface 1010 directed up, and opposite flow surface 1011 directed down.

Still referring to FIG. 66, mold section 1020 has three cavity sections therein as indicated at 1020a, 1020b and 1020c. 1020c is a section in which resin will typically not be located, and is positioned for engagement by one of the flow surfaces 1011 (or alternatively 1010) of the arrangement 1012. Mold cavity section 1020a, will form a portion of a housing seal arrangement, as described below, from resin therein. Section 102b is a transition section, which provides for receipt of one of the side panels 1009, 1008.

Figure 68:
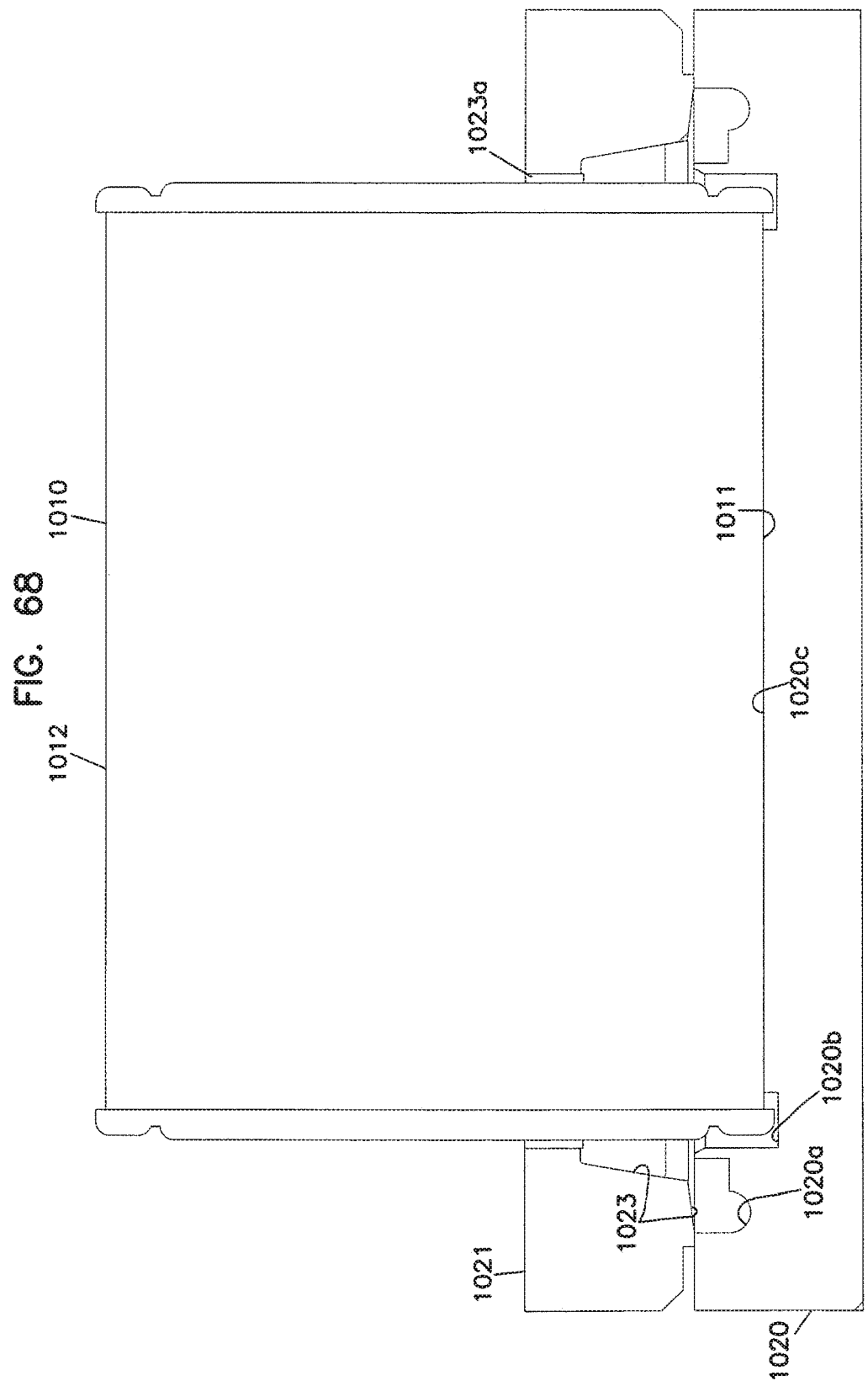
FIG. 68 is a view analogous to FIG. 66, with a second mold section positioned over the first mold section, for a molding operation.

In FIG. 68, the arrangement of FIG. 66 is shown with a second mold piece 1021 positioned over first mold piece 1020, to fully define mold cavity 1023.

In operation, after (or if desired, before) the media pack arrangement 1012 is positioned within mold piece 1020, resin would be positioned in cavity section 1020a. Mold piece 1021 would then be positioned in place, and the resin would rise to fill the cavity 1023, during cure, to mold a resulting housing seal member directly to media pack arrangement 1012. Alternatively, resin could be added through a mold fill, for example at 1023a. The cavity 1023 can be shaped to form a variety of housing seal arrangements, based on preferred selection. The particular cavity 1023 of FIG. 68 is configured to form housing seal generally analogous to seal 829. FIG. 45. Thus, cavity 1023 surrounds the media pack 1007, and the assembly 1012. As described previously, the filter cartridge of FIG. 45 is configured with the seal arrangement 829 recessed away from surface 824. Indeed referring to FIG. 68, mold section 1020 is depicted with central recess 1020c therein, allowing the filter media pack arrangement 1012 to be pushed sufficiently down within the mold piece 1020, so that flow surface 1011 (of the media pack) will project past cavity section 1020a.

Figure 69:
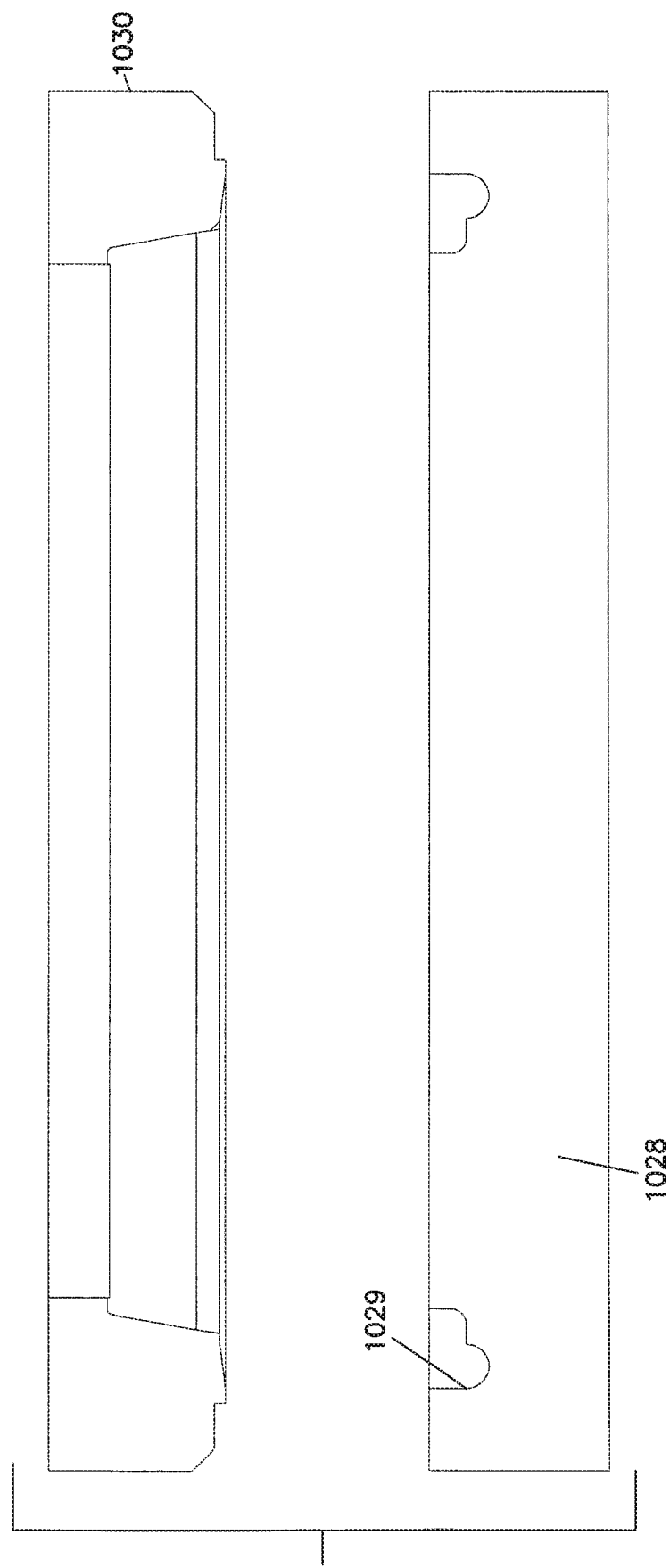
FIG. 69 is a schematic view of an alternate mold operation to that shown in FIG. 68.

Of course the mold piece 1020 could be configured to provide an alternate location (relative to end face 1011, FIG. 68) of the resulting molded housing seal arrangement. An example is provided in FIG. 69 which shows a construction analogous to FIG. 68, except without the media pack and with the mold sections separated. Mold section 1028 which generally corresponds to mold piece 1020, is shown without a central recess but with cavity 1029. Thus as a media pack (not shown) and a second mold piece 1030 are positioned for molding, it can be seen that the resulting housing seal arrangement, formed in cavity 1029 will not be recessed from the corresponding end surface of the media pack.

It is noted that in the various molding operations described in connection with FIGS. 66-69, for formation of a housing seal, in each instance the mold cavity would be configured to provide contact, being the resulting seal and either: another molding molded to the media pack; or, directly to the media pack, completely around the media pack, so as to ensure no leakage between the housing seal arrangement and the media pack, when the filter cartridge resulting from the mold operation is used in an air cleaner. Even if a preform is positioned underneath a portion of the housing seal arrangement along some sides, the mold configuration should be such that at least a portion of the molded housing seal arrangement directly contact the media pack completely across that surface, to ensure an appropriate leak-free seal. As to sides with a sealing mold already in place, the housing seal needs to be selected from material that will sufficiently join with the already in place mold (such as side panels 1008, 1009) to ensure no leakage therebetween. The types of polyurethane materials characterized hereinabove are appropriate and adequate for these purposes.

From the above descriptions, it will be understood that a variety of alternatives are possible, from selection of cavity configurations, for forming a filter cartridge of the general type characterized in FIG. 45 and discussed above. The process characterized in connection with FIGS. 59-64, is generally referred to herein as a "three shot mold process," since three molding steps, with three separate applications of resin, are used. Herein below in connection with the remaining figures, alternate mold approaches are described.

B. An Example Approach for Formation of a Filter Cartridge According to FIGS. 11-14 and 55.

The filter cartridge 920 of FIG. 55 generally comprises a media pack 921 having two opposite side panels 923, 924 and a peripheral seal arrangement 929. (In FIGS. 11-14 a similar filter cartridge is shown.) Such an arrangement could be made with the three-shot mold process previously described with mold piece modified to accommodate the moldings shown. An alternate example approach to formation of such a filter cartridge is described herein, in connection with FIGS. 70-78.

Figure 70:
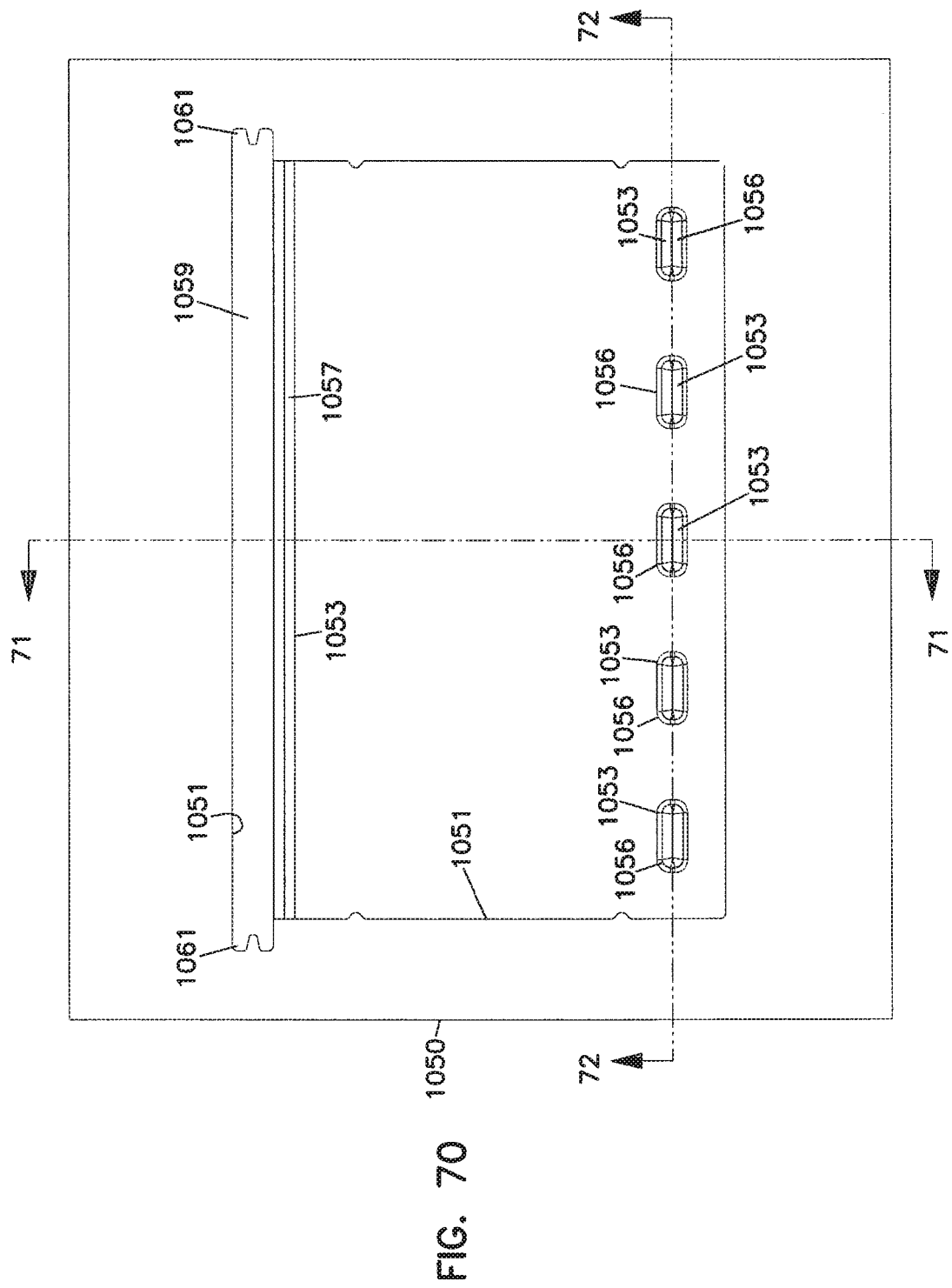
FIG. 70 is a top plan view of a mold arrangement useable to form a side panel and seal section of a filter cartridge in general accord with the filter cartridge FIG. 55.

In FIG. 70, a top plan view of a mold arrangement 1050 useable for formation of panels 923, 924, FIG. 55 is shown. The mold arrangement 1050 is also configured to form sections of housing seal arrangement 929; i.e., sections 929a, 929c, FIG. 55.

Referring to FIG. 70, mold arrangement 1050 defines mold cavity 1051.

Figure 71:
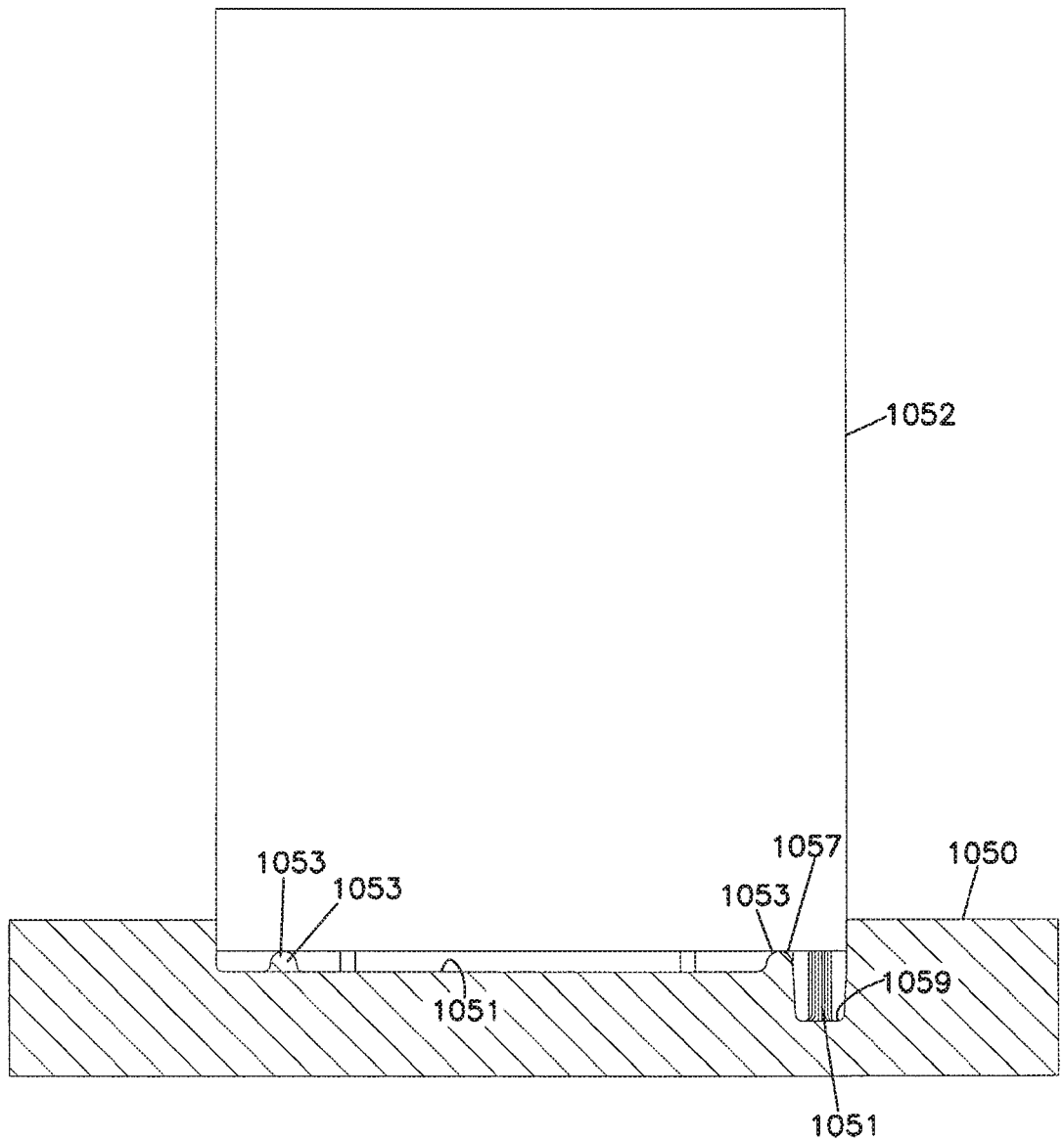
FIG. 71 is a cross-sectional view taken along line 71-71, FIG. 70, in FIG. 71 the mold section being depicted with a media pack positioned therein.
Figure 72:
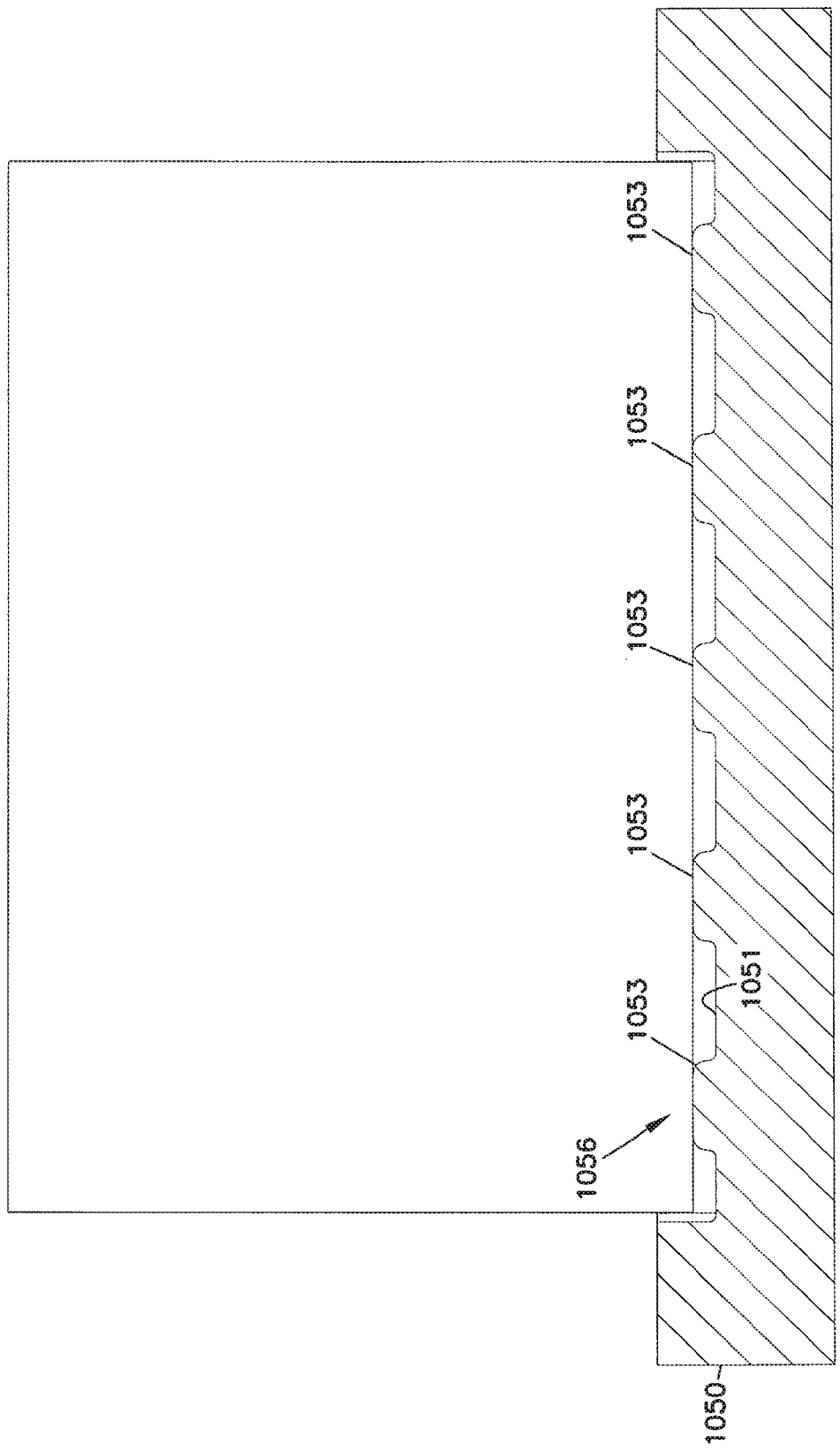
FIG. 72 is a cross-sectional view taken along line 72-72, FIG. 70.

In FIG. 71 generally corresponds to a cross-sectional view of mold piece 1050, taken along line 71-71, FIG. 70. FIG. 72 corresponds to mold arrangement 1050 viewed from the cross-sectional view of line 72-72, FIG. 70. In FIGS. 71 and 72, a media pack 1052 is shown positioned in mold 1050.

From FIGS. 70-72, it will be understood that mold arrangement 1050 defines cavity 1051 and media pack stand-off projection arrangement 1053. A variety of configurations of projection arrangements can be used. The particular projection arrangement 1053 depicted, comprises a segmented line of projections 1056 and a continuous projection 1057. The direction of extension of continuous projection 1057 corresponding to a line parallel to a segmented line defined by projections 1056.

Cavity 1051, FIGS. 70, 71, further defines a housing seal segment forming trough 1059.

In FIGS. 71 and 72, mold arrangement 1050 is schematically depicted with the media pack 1052 therein, for formation of a side panel and housing seal arrangement section. In a typical operation, the liquid resin to be cured to form a side panel and housing seal section will be positioned within the mold cavity 1051, before the media pack 1052 is put into position. The resin would then cure, typically with an increase in volume from foaming, resulting in a panel and a section of housing seal.

Figure 73:
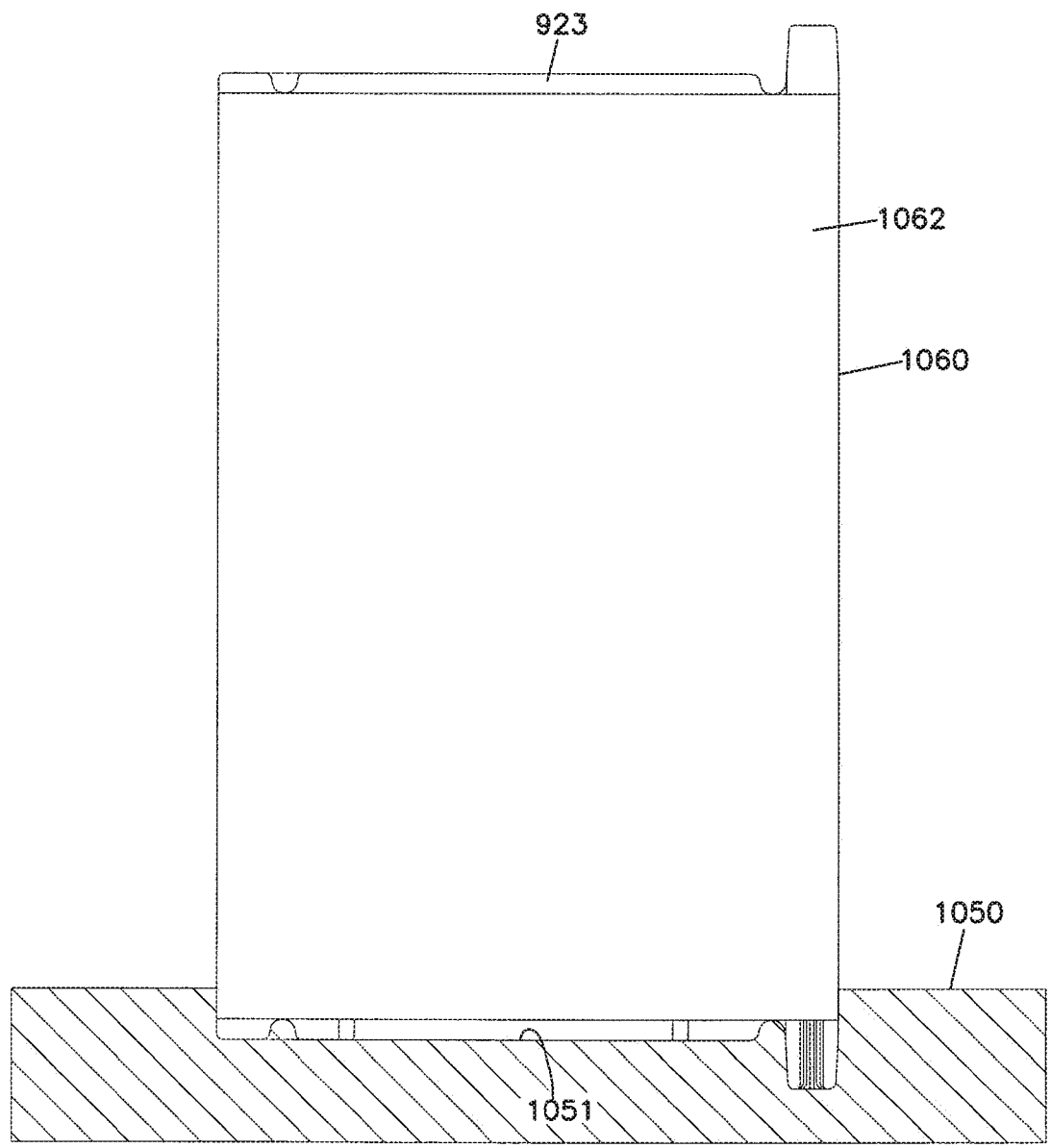
FIG. 73 is a schematic view of a mold arrangement according to FIG. 70 having a media pack resulting from the step of FIGS. 72 and 73 inverted and standing therein for a molding operation, the view of FIG. 73 showing the media pack standing in the mold from the point of view of cross-section of FIG. 71.

The opposite panel will be formed by removing resulting combination 1060, FIG. 73 from the first molding step, inverting it, and replacing it in the mold (after positioning additional resin in the mold).

Referring to FIG. 70, it is noted that trough section 1059 is configured at ends 1061 to form opposite ends of the housing seal arrangement, with a recessed center therein. This will facilitate knitting of side strips in the housing seal arrangement, during the next steps of molding, described below in connection with FIGS. 74-78.

Referring first to FIG. 55, the partially completed cartridge after FIG. 73, i.e., after the molding steps described thus far, would be a media pack 921, having side panels 923, 924 thereon, with housing seal sections 929a and 929c of housing seal arrangement 929. Sections 929b and 929d of housing seal arrangement 929 are yet to be formed.

Figure 74:
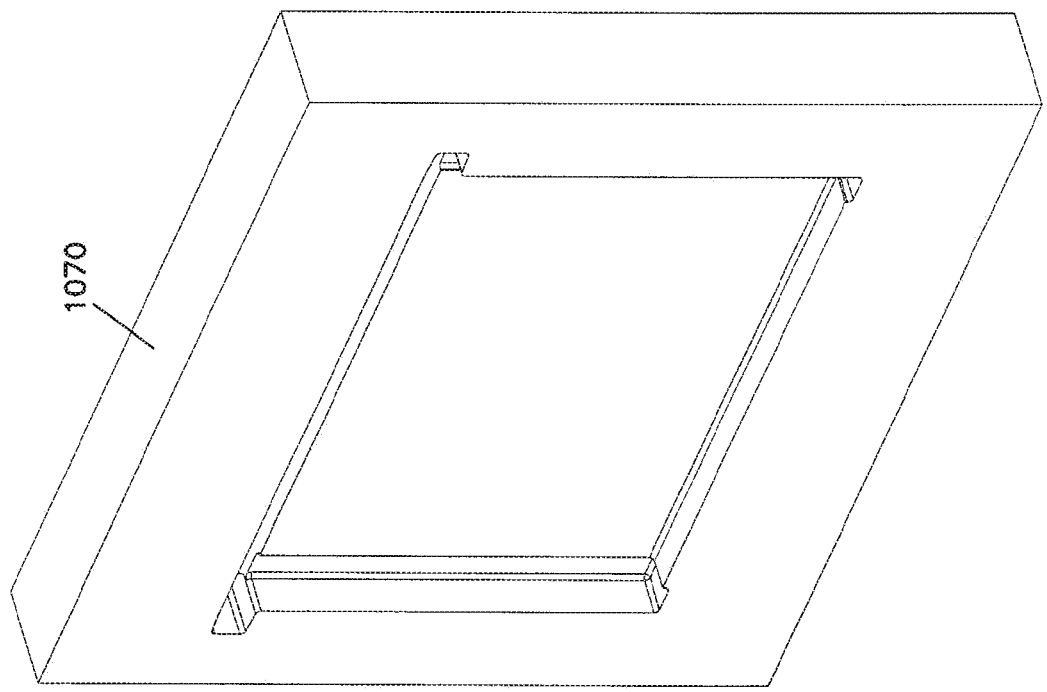
FIG. 74 is a perspective view of a mold component useable to form a section of the filter cartridge of FIG. 55.
Figure 75:
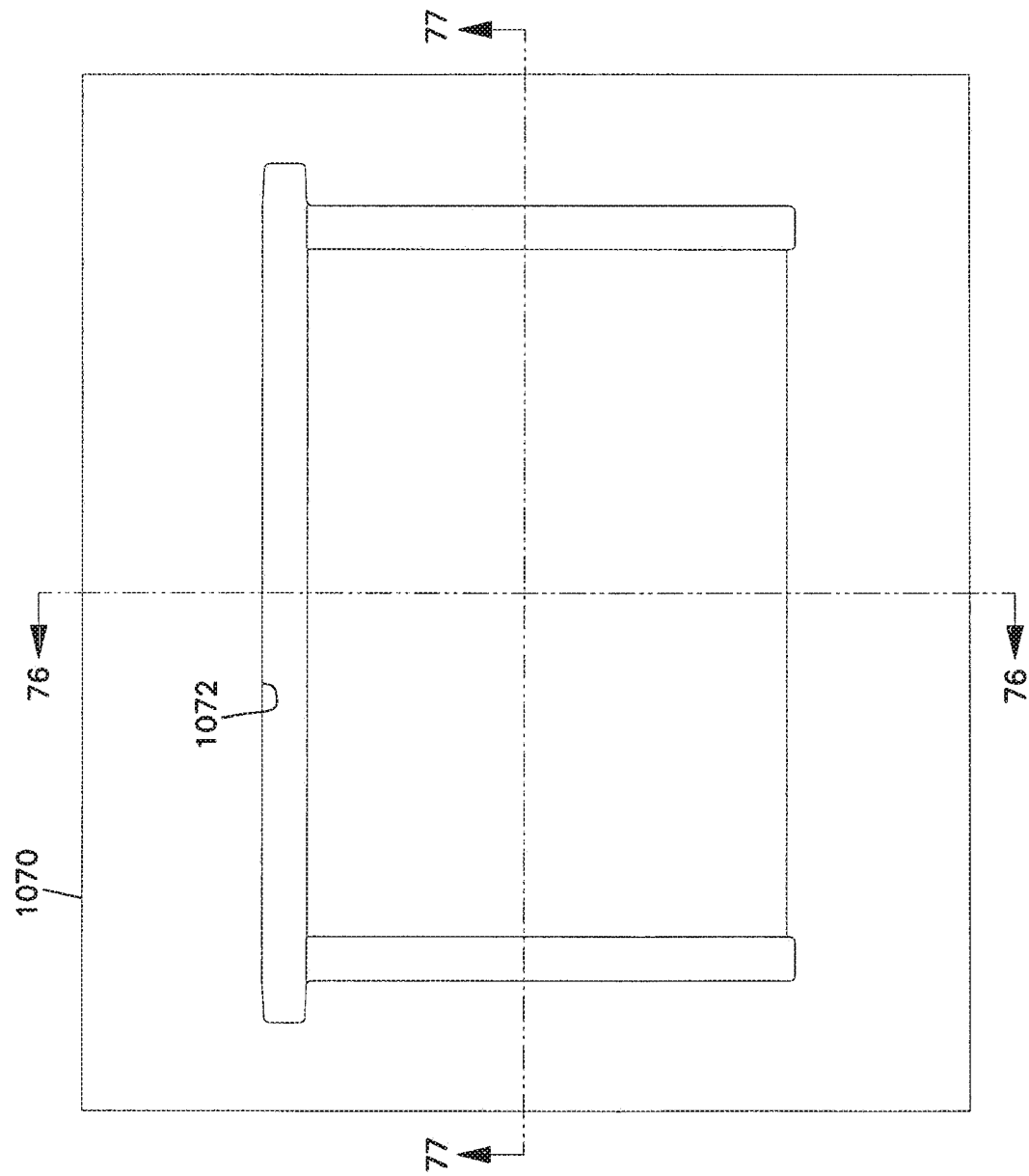
FIG. 75 is a top plan view of the mold component of FIG. 74.
Figure 76:
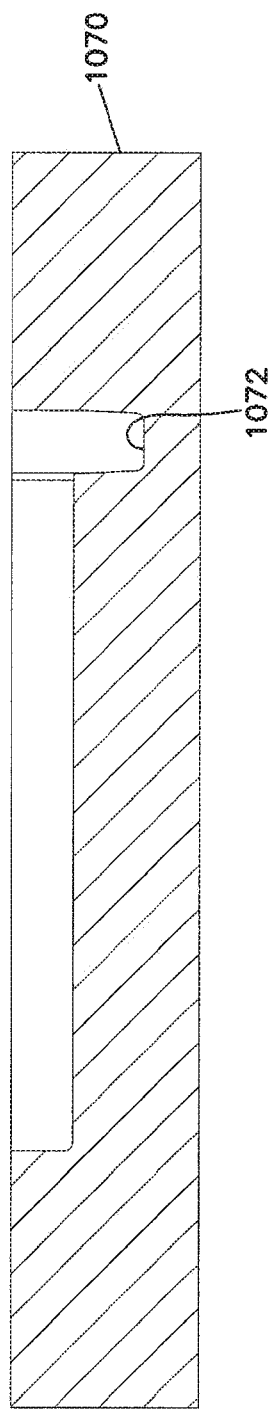
FIG. 76 is a cross-sectional view taken along line 76-76, FIG. 75.
Figure 77:
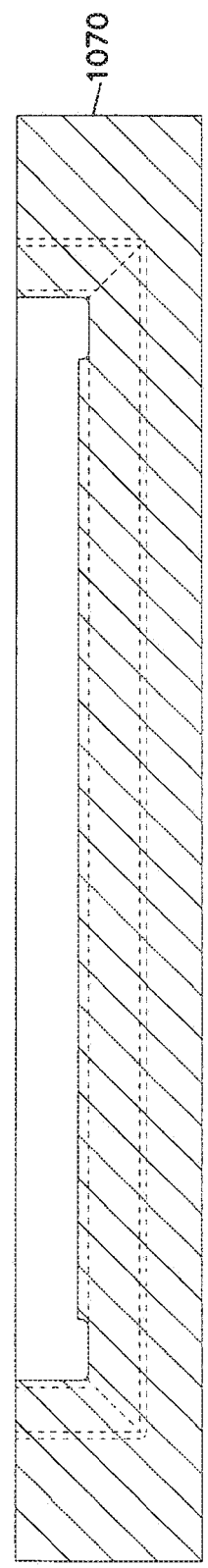
FIG. 77 is a cross-sectional view taken along line 77-77, FIG. 75.

Attention is now directed to FIG. 74, in which a mold arrangement 1070 useable to form housing seal sections 929b and 929d, FIG. 55, is shown. In FIG. 74 mold arrangement 1070 is shown in perspective view. In FIG. 75 mold arrangement 1070 is shown in top plan view. FIG. 76 is a cross-sectional view taken along line 76-76, FIG. 75. In FIGS. 75 and 76 mold cavity 1072 is viewable. FIG. 77 is a cross-sectional view of mold arrangement 1070, taken along line 77-77 thereof.

Figure 78:
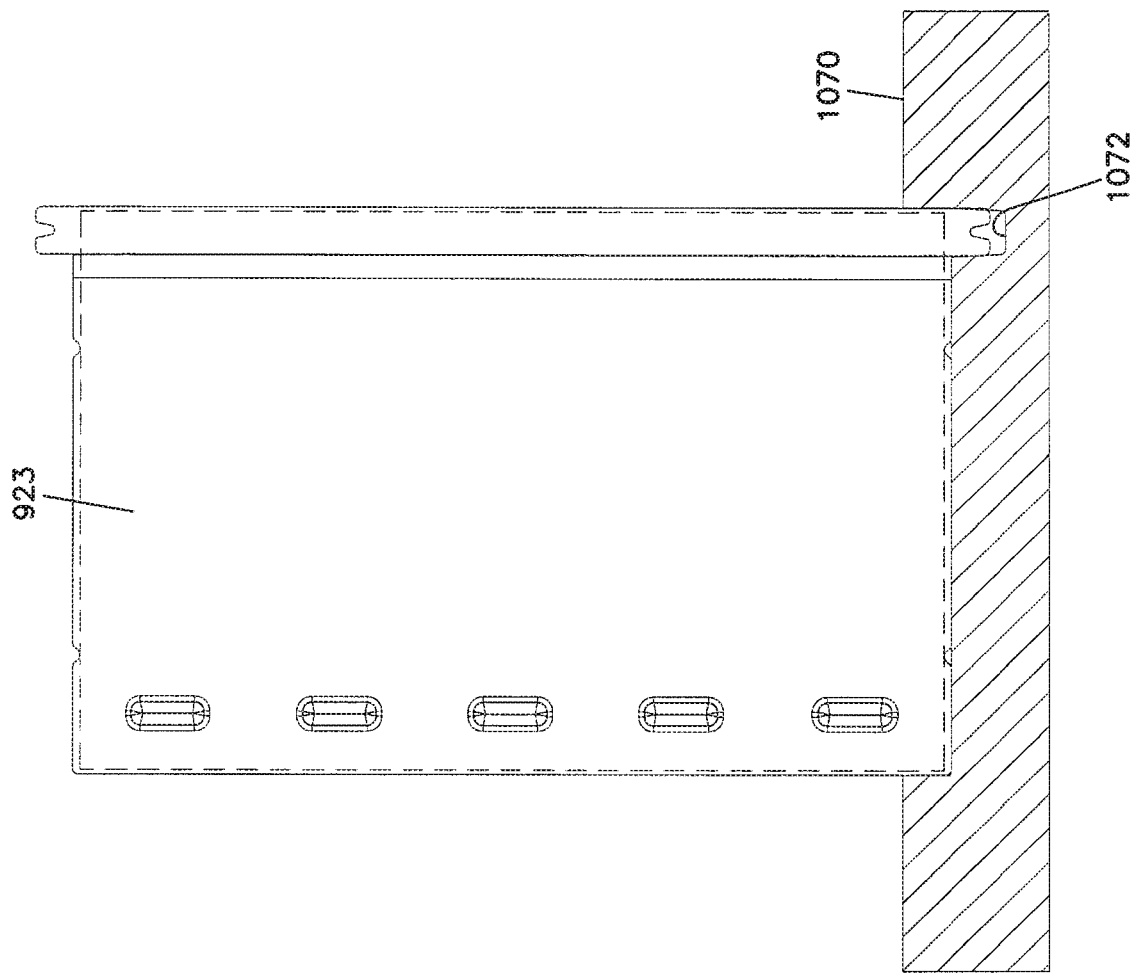
FIG. 78 is a cross-sectional view of the mold arrangement of FIG. 75 shown schematically with the media pack having molded sections thereon positioned in the mold, during a step of manufacture; the view point of FIG. 78 being from an analogous point of view of the cross-section of FIG. 76.

In FIG. 78, mold arrangement 1070 is shown with a media pack (shown schematically) positioned therein. In typical use, resin will be placed in mold cavity section 1072, before the media pack is positioned in the mold. Upon cure, typically with foaming and thus increase in volume, the resin in mold cavity section 1072 will form one of the strips 929b, 929d, FIG. 55, in the resulting product. Of course the resulting partially completed cartridge could then be removed from the mold, inverted and placed in the mold with additional resin, to form the remaining one of the strips 929b, 929d.

The mold cavity is configured to provide the knitting of the resin in the joints 1075, FIG. 55, in the molding process.

The process described with respect to FIGS. 70-78, is a four-shot mold process. That is, four resin additions to mold arrangements are used. Alternate mold processes are possible, for example a three-shot process as described above in connection with FIGS. 59-69, except modified for the appropriate mold cavity, could be used.

In the next section an alternate one-shot mold process is described.

C. An Example Approach for Formation of a Filter Cartridge Using a One-Shot Mold Process, FIGS. 79-80.

Figure 79:
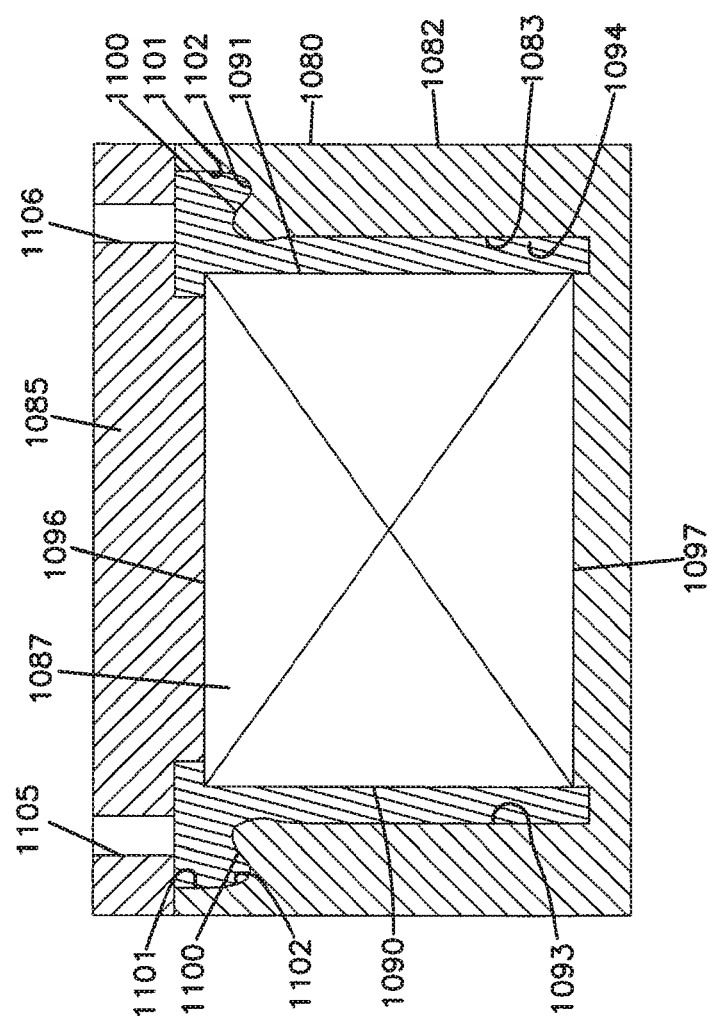
FIG. 79 is a schematic, cross-sectional view of a mold arrangement useable as an alternative arrangement for forming a filter cartridge having features analogous to those shown in FIG. 55.

The reference numeral 1080, FIG. 79, indicates a mold assembly useable to form a filter cartridge comprising a z-filter media pack having: (a) two opposite molded side panels; and, (b) a molded housing seal ring, in a one-shot mold process. Referring to FIG. 79, the mold arrangement 1080, shown schematically, is a two-piece mold having a mold base 1082, defining a mold cavity 1083; and, a mold cover 1085.

Still referring to FIG. 79, positioned within the mold cavity 1083 is a z-filter media pack 1087.

In FIG. 79, the mold arrangement 1080 with a media pack 1087 therein, is depicted in cross-section, to facilitate an understanding of the concept. The media pack 1087 is positioned such that the opposite molded side panels will be formed at opposite sides 1090, 1091, by resin in portions 1093, 1094 of the cavity 1083. Portions 1093 and 1094 would extend along sides 1090, 1091 respectively, but would not extend, in a typical preferred application, completely across ends of the media pack 1087 extending between the sides 1090, 1091.

For orientation, for the particular arrangement depicted, the flow surfaces of the media pack 1087 will be positioned at 1096 and 1097.

Figure 80:
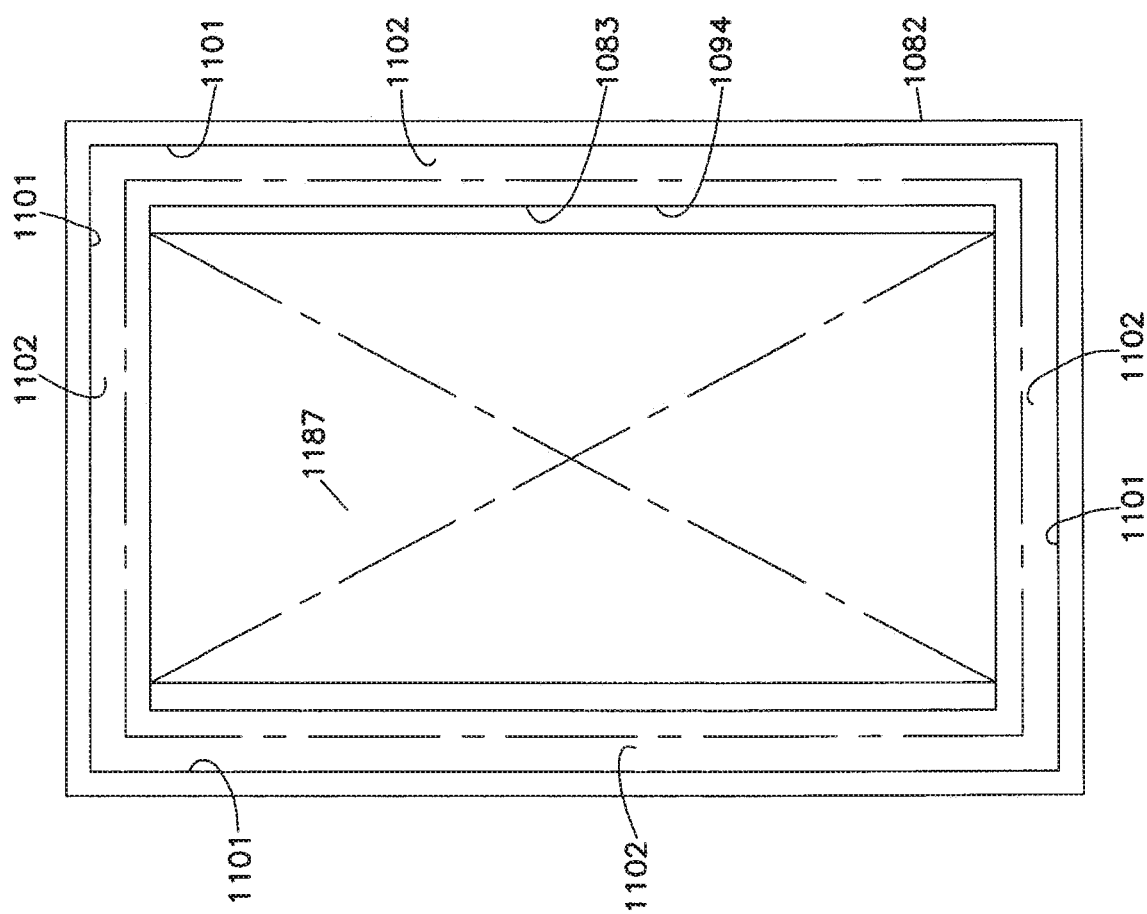
FIG. 80 is a top plan view of a mold bottom section of the mold arrangement of FIG. 79 with a media pack positioned therein.

Of course in filter cartridge arrangements analogous to those described in FIGS. 45 and 55, the housing seal arrangement comprises a ring in a plane extending circumferentially around the media pack. This type of housing seal arrangement can be formed in the same resin shot as the panel sections at 1093, 1094, with the mold arrangement according to mold arrangement 1080. In particular, shelf 1100, and mold volume above that shelf defined by outer mold surface 1101, define cavity portion 1102, of cavity 1083, in which the housing seal ring will be formed. Shelf 1100 and outer surface 1101 would be configured in the mold arrangement 1080, to completely surround the media pack 1087, as shown in FIG. 80. (In FIG. 80, a top plan view of the arrangement of FIG. 79 is shown, with cover 1085 removed.)

Several modes of operation are possible. In one, after the media pack 1087 is positioned in the mold cavity 1083, resin would be poured into cavity portions 1093, 1094 and 1102, in a single resin pour. Cover 1085 could then be put in place, and the resin allowed to rise and cure. In an alternate mode of operation, the mold cover 1085 could be positioned before the resin is inserted, the resin could be inserted through a mold-fill opening and mold cover 1085, as shown at FIG. 79 at 1105 (with venting shown at 1106).

Of course still further possibilities can be used. However, the examples indicate how a filter cartridge having two opposite molded side panels and a molded circumferential housing seal arrangement could be made in a single mold pour, with techniques according to the disclosure.

Of course the shape or contour of shelf 1100 and outer surface 1101, can be modified as desired, to provide selected or preferred housing seal shapes or contours.

In a typical application, the cavity 1083 would be provided with appropriate structure therein for centering the media pack 1087 and inhibiting flash from extending across surfaces of the media pack 1087, any undesired amount.

If desired, with any of the mold approaches described herein above in connection with FIGS. 59-80, extra pieces can be positioned against the media pack on surfaces as desired. Such pieces comprising cardboard, plastic or other sheet material, can simply be positioned on the media pack before an insertion into the molds, or the mold arrangements can be modified to accommodate the pieces being separately added.

D. Variations to Form Filter Cartridges with Molding Completely Peripherally Around the Media Pack, Leaving Only the Opposite Flow Faces Exposed.

Herein above, in general the filter cartridges described or shown each have a pair of opposite molded panels, molded directly to the media packs to seal ends of the single facer strips used to make the media packs. Thus, the resulting filter cartridge only has side panels molded to two opposite sides of the media pack, since only two sides of the media pack have exposed lead and tail ends of the single facer strips used to form the media pack. In the alternative, filter cartridges can be formed which have moldings extending completely peripherally around the media packs; i.e., covering four sides. These could be made with a one-shot process as described in connection with FIGS. 79 and 80, by extending the portion (1094) of the mold cavity (1083) that forms the side panels to run completely around the media pack (as the portion (1102) that forms the seal trough already extends completely peripherally around the media pack). Variations of the four-shot mold process could also be used to make such an arrangement, by having the mold of FIG. 78, which only forms a section of the housing seal, modified to form a complete panel with a housing seal section thereon.

An approach analogous to that described in connection with FIGS. 59-68 could also be used. However instead of the process being a three-shot mold process, it would be a five-shot mold process, since four shots would be required to first form the four panels, before the housing seal is molded.

E. Variations in Housing Seal Position.

The various examples provided herein, the housing seal generally sits in a plane parallel to a plane of the inlet face and the outlet face or both, sometimes in the same plane as the inlet face and the outlet face. Alternatives are possible, using the various techniques described herein, but modifying the molds appropriately.

F. Modifications from Blocked Media Packs.

The examples provided each use a blocked media pack, in which outside surfaces intersect at a right angle. Alternatives are possible, including ones, for example, in which the media pack has been formed from layers in a stack that are off-set sufficiently, to generate a media pack having at least one cross-section which comprises an oblique parallelogram; i.e., a parallelogram in which while opposite sides are parallel, the sides do not intersect at a 90° angle. An example of such a media pack is known in U.S. Provisional Application 60/579,754, filed Jun. 14, 2004 (at FIG. 6A), the complete disclosure of which is incorporated herein by reference. A similarly shaped media pack could be used in molding operations as described herein, for generation of a filter cartridge.

VIII. A General Characterization of the Filter Cartridges and Methods

In general terms, filter cartridges of the types described herein comprise a filter media pack comprising a stacked construction of single facer strips, each single facer strip typically comprising a fluted sheet secured to a facing sheet in position to define inlet and outlet flow channels extending between first and second opposite flow faces. The filter cartridge further includes a molded side panel arrangement comprising at least first and second opposite molded panels molded directly to, and in sealing coverage over, a first set of two opposite sides (or ends) to the media pack defined by lead ends and tail ends of the strips of media. The filter cartridge further includes a housing seal arrangement molded into the filter cartridge arrangement. The housing seal arrangement can be: (a) molded onto the molded side panel arrangement; (b) molded directly onto the media pack; or, (c) it can have portions molded to both. Typical arrangements described herein, have portions either: (a) molded to both; or, (b) arranged such that portions are integral with the molded side panels while other portions are molded directly to the media pack.

Within the filter cartridge including molded side panel arrangements, the molded side panel arrangements can be configured to extend partially across sides which are otherwise partially not covered. Typically, there is at least 50% (by area) exposed media (i.e., media not covered by molding) positioned on these uncovered sides. In some instances these sides can be covered by preform side wall sections, for example cardboard or plastic sheets.

The housing seal arrangement in some instances is an integrally molded portion of the molded side panel arrangement. By "integrally molded portion" in this context, it is meant that the housing seal arrangement is molded from the same resin pool and at the same time, as the molded side panel arrangement. An example of this is described above, in connection with the one-shot molding process. Also, portions (or sections) of the housing seal arrangements are integrally molded with the molded side panel arrangement in the four-shot molded approach described above.

Of course, in some applications the housing seal arrangement is not an integrally molded portion of the molded side panel arrangement. For example, the housing seal arrangement can be molded to the media pack after the molded side panel arrangement has already been formed. An example of this was described above in connection with the three-shot mold approach.

In some examples, the media pack is a blocked, stacked construction. However the media pack, as described, can be a slanted stacked construction defining at least one oblique parallelogram cross section. The term "slanted, stacked construction" in this context, refers to a media pack that is stacked, but stacked such that two opposite parallel sides do not extend perpendicular to the sides they intersect.

In some arrangements the housing seal arrangement comprises a single integrally molded perimeter seal extension. Examples of this were described above in connection with the one-shot mold process description and the three-shot mold process description.

In other examples, the housing seal arrangement comprise a plurality of separately molded sections or extensions. An example of this was described above in connection with the four-shot molded process approach.

In some preferred filter cartridges, the molded side panel arrangement comprises two opposite mold panels each having or defining a first compression edge (or housing engagement edge) adjacent the first flow face and the second compression edge adjacent the second flow face and, the housing seal arrangement comprises a housing seal perimeter extension that is recessed from alignment with each compression edge (or housing engagement edge). An example of this was illustrated herein in connection with the cartridge of FIG. 45. The edges, which form compression edges, can also be characterized as "housing engagement edges," "axial abutment surface;" or by similar terms. Preferred edges, which comprise a non-planar contour, typically a projection/recess contour, are shown in FIG. 45. In this example, each compression edge comprises a plurality of (at least two) projections at least one and typically in a plurality of recesses, although alternate projections/recess arrangements are possible.

Housing seal arrangements described hereinabove in connection with the examples of FIGS. 45 and 55, are axial pinch seals, that is each is configured to be pinched axially between housing components, when the filter cartridge is installed in use. The term "axial" and "axially" in this context, refers to a direction of seal force generally parallel to the direction of air flow through the media pack, as opposed to toward or away from a center line of the media pack extending between the flow faces.

The housing seal arrangement (and the side moldings) can be provided from a variety of materials. When separately molded, it is not required that they all be the same. An example material useable for both the seal and the side moldings described herein is polyurethane. An example polyurethane characterized is a foamed polyurethane which will increase in volume during use. Preferred ones increase by at least 40% in volume, to fill the mold cavities (typically at least 80% in volume) and having an as-molded density of no greater than 30 lbs/cu.ft (0.48 g/cc), typically no greater than 22 lbs/cu.ft. (0.35 g/cc) and usually with in the range of 10 lbs/cu.ft (0.16 g/cc) to 22 lbs/cu.ft (0.35 g/cc); and, a hardness (Shore A) typically of not greater than 30, preferably not greater than 25 and typically within the range of 12 to 22. Of course polyurethanes outside of this range can be used, but the characterized ones are advantageous for manufacturing and handling.

Also described herein are air cleaner arrangements comprising a housing having an inlet section and an outlet section, and a filter cartridge typically as characterized herein, positioned therein. An example air cleaner in which an outlet section is selectively rotatably pivotable relative to the inlet section to release sealing pressure in the housing seal arrangement is described hereinabove, in connection with FIG. 23. This arrangement can be further characterized as having an access cover, with a housing body section forming a three-sided receiver for the seal and media pack, of the filter cartridge.

An air cleaner arrangement in which the housing further includes a removable cassette therein, the cassette being configured to receive the filter cartridge therein during use, as shown.

Methods (processes) of forming a filter cartridge arrangement are described, which generally involve molding a molded side panel arrangement and a housing seal arrangement to a filter media pack. The term "molding . . . to" in this context and variants thereof, is to refer to a process in which the molding is generated on a portion of the filter media pack, as opposed to preformed and then attached to the media pack for example by potting. A one-shot mold process, a three-shot mold process and a four-shot mold process are described, as examples.

What is claimed:

1. An air filter cartridge arrangement comprising:
   (a) filter media having first and second, opposite, flow faces; and,
   (b) a housing seal arrangement positioned in extension around the media;
      (i) the housing seal arrangement including a pinch seal member with a seal surface oriented to be pressed against a surface of an air cleaner, in use;
   (c) the housing seal arrangement including: a molded portion positioned on, and extending around, the cartridge and supporting the pinch seal member, the molded portion that extends around the media including a taper portion shaped to taper downwardly in thickness, in a direction of extension away from the pinch seal member and toward one of the flow faces; and, a receiver positioned between at least a portion of the seal surface and the filter media;
      (A) the receiver being open in a direction toward a selected one of the opposite flow faces; and,
      (B) the receiver being configured to receive a portion of an air cleaner assembly projecting therein, during use.

2. An air cleaner cartridge arrangement according to claim 1 wherein:
   (a) the filter media comprises a media pack of fluted media secured to facing media and defining inlet and outlet flow channels extending between the opposite flow faces;
      (i) the filter media being closed to airflow therethrough, from the first flow face to the opposite second flow face, without filtering flow through the media.

3. An air cleaner cartridge arrangement according to claim 2 wherein:
   (a) the filter media comprises a stacked construction of individual strips of media comprising fluted media secured to facing media and defining the inlet and outlet flow channels extending between the opposite flow faces.

4. An air filter cartridge arrangement according to claim 3 wherein:
   (a) the first and second flow faces are planar.

5. An air filter cartridge arrangement according to claim 4 wherein:
   (a) the media has a first set of two opposite sides; and,
   (b) the cartridge arrangement comprises a molded side panel arrangement including first and second molded panels molded directly to, and in sealing arrangement over, the first set of two opposite sides.

6. An air filter cartridge arrangement according to claim 5 wherein:
(a) the media comprises a media pack having a parallelogram shape.

7. An air filter cartridge arrangement according to claim 6 wherein:
(a) the media comprises a blocked, stacked, media pack.

8. An air filter cartridge arrangement according to claim 7 wherein:
(a) the media has a second pair of opposite sides extending between the first pair of opposite sides; and, the cartridge arrangement includes:
  (i) a first protective sheet positioned over a first one of the second pair of opposite sides; and,
  (ii) a second protective sheet positioned over a second one of the second pair of opposite sides.

9. An air filter cartridge arrangement according to claim 8 wherein:
(a) each one of the first and second protective sheets is secured in place by the molded side panel arrangement.

10. An air filter cartridge arrangement according to claim 9 wherein:
(a) each one of the first and second protective sheets is a plastic sheet.

11. An air filter cartridge arrangement according to claim 8 wherein:
(a) the pinch seal member is in plane parallel to the inlet flow face.

12. An air filter cartridge arrangement according to claim 1 wherein:
(a) the housing seal surface includes a portion molded to the media.

13. An air filter cartridge arrangement according to claim 1 wherein:
(a) the receiver comprises a trough extending completely around the media.

14. An air filter cartridge arrangement comprising:
(a) filter media having first and second, opposite, flow faces; and,
  (i) the filter media comprising a blocked, stacked, media pack of fluted media secured to facing media and defining inlet and outlet flow channels extending between the opposite flow faces;
    (A) the filter media being closed to airflow therethrough, from the first flow face to the opposite second flow face, without filtering flow through the media; and
  (ii) the blocked, stacked, media pack having a first set of two opposite sides; and
(b) the cartridge arrangement comprises a molded side panel arrangement including first and second molded panels molded directly to, and in sealing arrangement over, the first set of two opposite sides;
(c) a housing seal arrangement positioned in extension around the media;
  (i) the housing seal arrangement including a pinch seal member with a seal surface oriented to be pressed against a surface of an air cleaner, in use;
(d) the housing seal arrangement including:
  (i) a portion molded in place on, and extending around, the cartridge and supporting the pinch seal member;
  (ii) a receiver positioned between at least a portion of the seal surface and the filter media;
    (A) the receiver being open in a direction toward a selected one of the opposite flow faces; and,
    (B) the receiver being configured to receive a portion of an air cleaner assembly projecting therein, during use.

15. An air filter cartridge arrangement according to claim 14 wherein:
(a) the pinch seal member is in plane parallel to the inlet flow face.

16. An air filter cartridge arrangement according to claim 14 wherein:
(a) the media has a second pair of opposite sides extending between the first pair of opposite sides; and,
(b) the cartridge arrangement including:
  (i) a first protective sheet positioned over a first one of the second pair of opposite sides; and,
  (ii) a second protective sheet positioned over a second one of the second pair of opposite sides.

17. An air filter cartridge arrangement according to claim 14 wherein:
(a) the pinch seal member and the portion molded in place on, and extending around, the cartridge and supporting the pinch seal member are molded at the same time.

18. An air filter cartridge arrangement comprising:
(a) a filter media pack: comprising a combination of fluted media and facing media defining first and second, opposite, planar flow surfaces; and, having an outer perimeter; and,
(b) a housing seal arrangement extending around the outer perimeter of the filter media pack; the housing seal arrangement comprising:
  (i) a pinch seal member configured to be pinched between seal flanges on a housing, when the air filter cartridge is installed for use;
  (ii) an attachment portion extending from the pinch seal member toward the media pack; and,
  (iii) the pinch seal member and attachment portion being molded integral with one another; and,
(c) a portion molded to the media pack that: comprises the same material as the pinch seal member and that includes an edge having at least first and second, spaced, projections thereon extending in a direction generally corresponding to a flow direction between the first and second flow surfaces.

19. An air filter cartridge arrangement according to claim 18 wherein:
(a) the pinch seal member is in a plane parallel to the inlet flow face.

* * * * *